(12) United States Patent
Inoue et al.

(10) Patent No.: US 11,942,787 B2
(45) Date of Patent: Mar. 26, 2024

(54) POWER CONVERSION DEVICE

(71) Applicant: Mitsubishi Electric Corporation, Tokyo (JP)

(72) Inventors: Sadayuki Inoue, Tokyo (JP); Tomihiro Takano, Tokyo (JP); Keishi Matsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 323 days.

(21) Appl. No.: 17/619,249

(22) PCT Filed: Jul. 23, 2019

(86) PCT No.: PCT/JP2019/028880
§ 371 (c)(1),
(2) Date: Dec. 15, 2021

(87) PCT Pub. No.: WO2021/014577
PCT Pub. Date: Jan. 28, 2021

(65) Prior Publication Data
US 2022/0285943 A1 Sep. 8, 2022

(51) Int. Cl.
*H02J 3/16* (2006.01)
*H02J 3/32* (2006.01)
*H02J 3/38* (2006.01)

(52) U.S. Cl.
CPC *H02J 3/16* (2013.01); *H02J 3/32* (2013.01); *H02J 3/381* (2013.01); *H02J 2300/22* (2020.01)

(58) Field of Classification Search
None
See application file for complete search history.

(56) References Cited

U.S. PATENT DOCUMENTS

2016/0233681 A1* 8/2016 Itaya ................. H02J 13/00034
2017/0294875 A1* 10/2017 Xu ............................ H02J 3/46
(Continued)

FOREIGN PATENT DOCUMENTS

JP    2001-211551 A    8/2001
JP    2002-165366 A    6/2002
(Continued)

OTHER PUBLICATIONS

International Search Report and Written Opinion dated Oct. 21, 2019, received for PCT Application PCT/JP2019/028880, Filed on Jul. 23, 2019, 8 pages including English Translation.

*Primary Examiner* — Jared Fureman
*Assistant Examiner* — Joel Barnett
(74) *Attorney, Agent, or Firm* — XSENSUS LLP

(57) ABSTRACT

A solar cell power conversion device is disposed between a solar cell and a distribution system. A storage battery power conversion device is disposed between a storage battery and the distribution system. An effective voltage calculation circuit calculates an effective voltage of an AC voltage in the distribution system. Based on the effective voltage, a second control circuit and a fourth control circuit control active power and reactive power output from a first DC/AC conversion circuit and a second DC/AC conversion circuit, respectively. When a change in the effective voltage is caused by an operation of an SVR provided in the distribution system, the second and fourth control circuits control operations of the first and second DC/AC conversion circuits to suppress a change in the reactive power caused by the change in the effective voltage.

8 Claims, 37 Drawing Sheets

(56) References Cited

U.S. PATENT DOCUMENTS

2017/0317915 A1* 11/2017 Ritmanich .............. H02J 3/381
2019/0181639 A1* 6/2019 Scott ......................... H02J 3/50

FOREIGN PATENT DOCUMENTS

| JP | 2006-81285 A | 3/2006 |
| JP | 2013-121305 A | 6/2013 |

* cited by examiner

POWER CONVERSION DEVICE

CROSS-REFERENCE TO RELATED APPLICATION

The present application is based on PCT filing PCT/JP2019/028880, filed Jul. 23, 2019, the entire contents of which is incorporated herein by reference.

TECHNICAL FIELD

The present invention relates to a power conversion device.

BACKGROUND ART

In recent years, for reducing environmental burdens, a power generation system that harnesses natural energy, such as a solar cell not emitting carbon dioxide, has come into widespread use in houses. Further, in order to address power shortage and the like since the Great East Japan Earthquake, product commercialization has been underway for a system including a storage battery, a system utilizing an electric vehicle as a storage battery, a system formed of a combination of a solar cell and a storage battery, and the like. Further, in order to significantly reduce emission of carbon dioxide, widespread use of a zero-emission house (hereinafter also referred to as a "ZEH house (net Zero Energy House)" or simply as "ZEH") has been promoted as a house that is improved in heat insulation performance, equipped with an energy creating device (hereinafter also referred to as an "energy creation device") such as a solar cell that harnesses renewable energy, and allows zero balance of power consumption and generation in one year.

When renewable energy of a solar cell and the like as described above is supplied in large quantity, there occurs a problem in the case of a solar cell that the voltage in a distribution system rises in a time zone of daytime with a large amount of solar radiation. This problem has been addressed by solutions, for example, by suppressing reverse power flow by suppressing power generation from a solar cell, or by power compensation by a Static Var Compensator (SVC) and system stabilization facilities represented by storage battery facilities. However, these solutions also cause problems that the electric power that can be generated by a solar cell cannot be utilized as much as possible or the system stabilization facilities such as SVC are expensive.

As part of the similar solutions, for example, the Japanese government started subsidiary enterprises for increasing in-house consumption of generated power (local production for local consumption) in 2016, and plans to promote the enterprises in the future. As to the enterprises for promoting the above-mentioned ZEH house, in order to promote local production for local consumption, the Japanese government started subsidization in 2016 for widespread use of an energy storing device (hereinafter also referred to as an "energy storage device") such as storage batteries unrelated to the ZEH conditions.

In recent years, a large-scale town development called vacant lot development has been underway, which utilizes the sites of factories and schools. Such developments include also the case where a solar cell is installed in each house. Further, according to the guidelines of the government as mentioned above, the future town development is expected to proceed on the precondition that ZEH houses each are equipped with an energy creation device (such as a solar cell) of several kW. In this case, installation of a solar cell of 4 kW in each house will lead to formation of a so-called mega-solar system in a town scale including about 300 houses. In such a case, in order to stabilize a distribution system (in other words, to suppress a rise in system voltage), system stabilization facilities such as expensive SVC and storage batteries need to be installed in a town. Introduction of such facilities into a smart town may require consumers to bear part of the cost.

Further, it is known as a solution for each house to control suppression of the system voltage by outputting reactive power from a power conversion device connected to a solar cell in response to a voltage rises in a distribution system. When such control is performed, however, suppression of electric power generated by the solar cell may be required as apparent power rises due to the reactive power.

From the above-described viewpoints, Japanese Patent Laying-Open No. 2002-165366 (PTL 1) discloses a method of controlling a voltage controller (SVC) for stabilizing a voltage in a distribution system and a controller for the voltage controller. The voltage controller is connected to a low-voltage distribution line. According to this controlling method (the controller), when the voltage gradually changes on the distribution line and the voltage on the distribution line falls within a dead zone of a control target voltage of the voltage controller, a control operation is performed to reset the reactive power output to a target value. When the voltage gradually changes on the distribution line and the voltage is out of the dead zone, a control operation is performed to change the control target voltage in line with the voltage change on the distribution line, and output reactive power so as to set the system voltage back to the control target voltage. When the voltage abruptly changes on the distribution line, voltage constant control is performed without changing the control target voltage (see PTL 1).

CITATION LIST

Patent Literature

PTL 1: Japanese Patent Laying-Open No. 2002-165366

SUMMARY OF INVENTION

Technical Problem

In order to stabilize the voltage in a distribution system, a plurality of system stabilization facilities (for example, a Step Voltage Regulator (SVR)) may be installed in such a distribution system (in the following description, the system stabilization facilities provided in a distribution system will be referred to as SVR). In such a configuration, when one SVR operates (tap changing) due to a gradual voltage change in the distribution system, the distribution system voltage abruptly changes in response to the operation of the SVR, and thereby, another SVC disposed in the stage subsequent to this one SVR starts voltage constant control, with the result that the reactive power that flows through the distribution system abruptly changes. Under the influence of such a change, the distribution system voltage of the SVR disposed in the preceding stage may not be able to be controlled to fall within an appropriate range even by using the SVC, and thus, an SVR that does not essentially need to operate may unnecessarily operate. Further, when the constant voltage control is cancelled after an elapse of a certain time period, the SVR that has unnecessarily operated as described above returns to its original state (the original tap position), which may also lead to a further unnecessary operation of an SVR.

The present invention has been made to solve the above-described problems, and an object of the present invention is to provide a power conversion device capable of suppressing an unnecessary operation of a system stabilization facility (such as an SVR) provided in a distribution system.

Solution to Problem

A power conversion device of the present disclosure is a power conversion device disposed between a distributed power supply and an alternating-current (AC) distribution system, and includes: an inverter to convert power output from the distributed power supply into AC power; an effective voltage calculator to calculate an effective voltage of an AC voltage in the AC distribution system; and a controller to control active power and reactive power output from the inverter based on the effective voltage. When a change in the effective voltage is caused by an operation of a system stabilization facility provided in the AC distribution system, the controller controls an operation of the inverter to suppress a change in the reactive power caused by the change in the effective voltage.

Advantageous Effects of Invention

In the above-described power conversion device, when the change in effective voltage in the AC distribution system is caused by the operation of the system stabilization facility provided in the AC distribution system, the operation of the inverter is controlled to suppress the change in reactive power caused by the change in effective voltage. This can suppress the operation of one system stabilization facility that is triggered by an abrupt change in reactive power that occurs in response to the change in effective voltage caused by the operation of another system stabilization facility. Therefore, according to the power conversion device, an unnecessary operation of the system stabilization facility provided in the distribution system can be suppressed.

DESCRIPTION OF EMBODIMENTS

Figure 1:
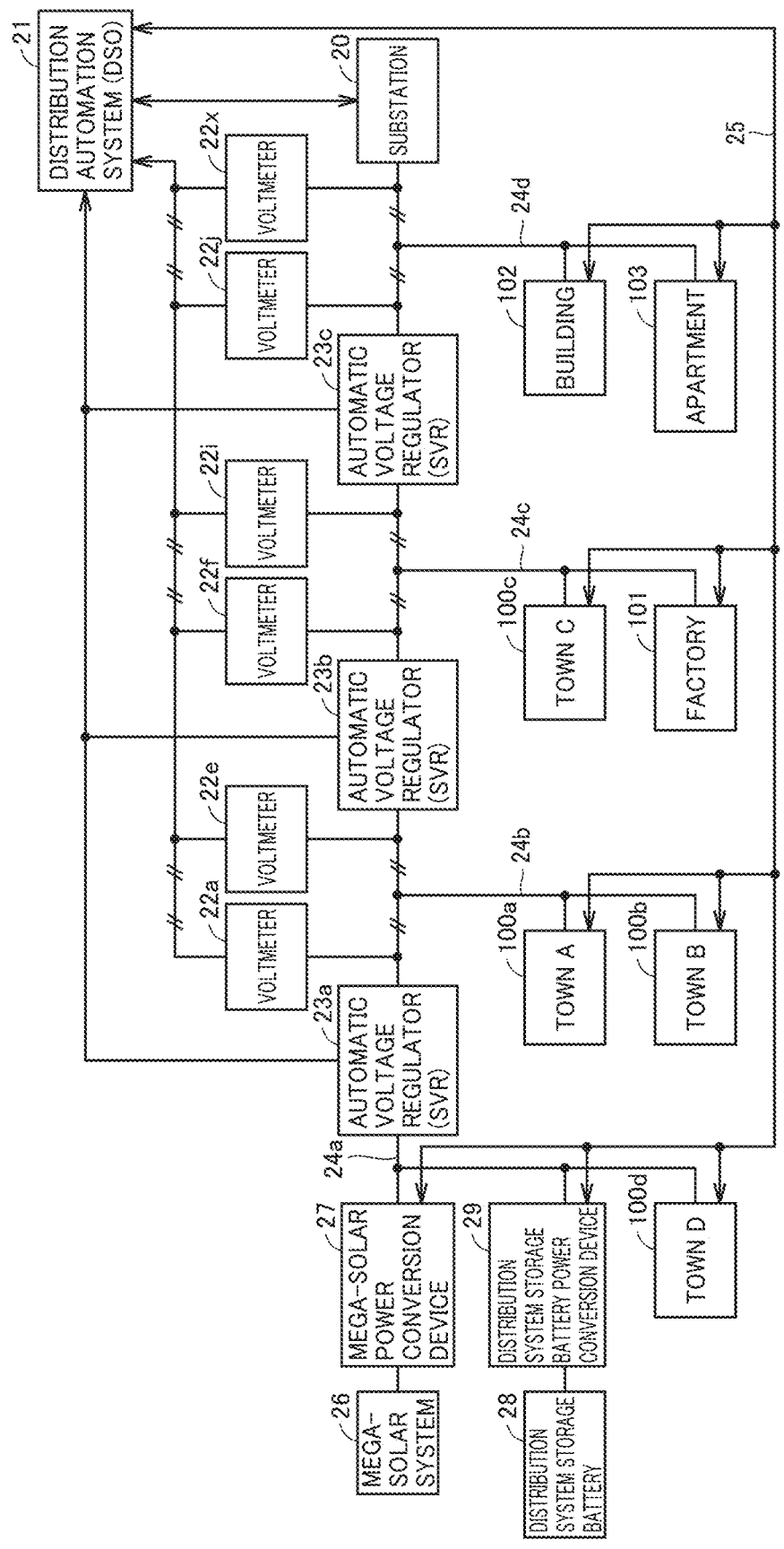
FIG. 1 is a block diagram showing an overall configuration example of a distribution system to which a power conversion device according to a first embodiment of the present invention is connected.

Hereinafter, embodiments of the present invention will be described in detail with reference to the accompanying drawings. While a plurality of embodiments will be described below, it has been originally intended at the time of filing of the present application to appropriately combine the configurations described in the embodiments unless technically contradicted. In the accompanying drawings, the same or corresponding components are denoted by the same reference characters, and the description thereof will not be repeated.

First Embodiment

<Overall Configuration of Distribution System>

FIG. 1 is a block diagram showing an overall configuration example of a distribution system to which a power conversion device according to the first embodiment of the present invention is connected.

Referring to FIG. 1, distribution systems 24 (24a to 24d) are connected to a substation 20, and a plurality of automatic voltage regulators 23 (23a to 23c) are provided in series in each distribution system 24. In the present first embodiment, each automatic voltage regulator 23 is formed of an SVR, and will be hereinafter referred to as an SVR 23. Further, distribution system 24 is connected to a town 100 (a town A 100a, a town B 100b, a town C 100c, a town D 100d), a factory 101, a building 102, an apartment 103, a mega-solar power conversion device 27, and a distribution system storage battery power conversion device 29 (each of which may be hereinafter referred to as a "consumer").

Further, distribution system 24 is equipped with a plurality of voltmeters 22 (22a, 22e, 22f, 22i, 22j, and 22x), and the measurement results of the voltmeters are periodically transmitted to a distribution automation system 21 (which will be hereinafter referred to as "DSO" (Distribution System Operator)). Further, DSO 21 is also notified of the tap position information, the primary-side voltage information, and the secondary-side voltage information of each SVR 23. In the present first embodiment, in each SVR 23, DSO 21 is periodically notified of the tap position information, the primary-side voltage information, and the secondary-side voltage information. Also at the time of tap changing (irregularly), DSO 21 is notified of each pieces of the above-mentioned information.

Although FIG. 1 shows SVR 23a to SVR 23c, any number of SVRs may be disposed. Although town A 100a to town D 100d are shown, any number of towns may also be disposed. Although voltmeters 22a, 22e, 22f, 22i, 22j, and 22x are shown, any number of voltmeters may be disposed.

From each consumer, DSO 21 periodically collects information such as various measurement results obtained at each consumer. Further, for each distributed power supply in each consumer, DSO 21 calculates various pieces of control command information used for system voltage stabilization control using a distributed power supply installed on the consumer side, and then gives a notification about the calculation result. A panel of a mega-solar system 26 is connected to mega-solar power conversion device 27, and a distribution system storage battery 28 is connected to distribution system storage battery power conversion device 29.

<Configuration of Town>

Figure 2:
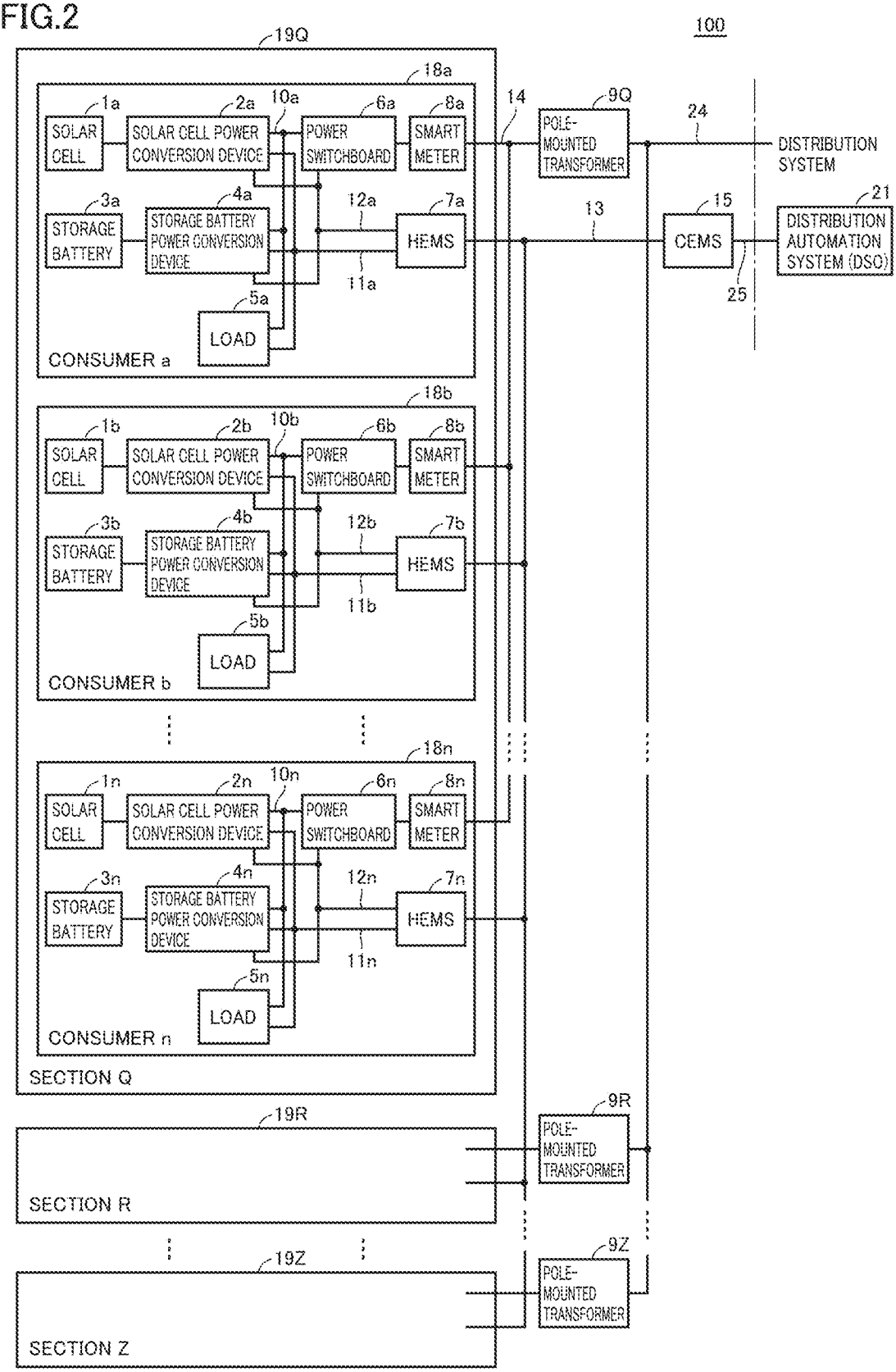
FIG. 2 is a block diagram showing a configuration example of a town to which the power conversion device according to the first embodiment is applied.

FIG. 2 is a block diagram showing a configuration example of a town 100 to which the power conversion device according to the first embodiment is applied.

Referring to FIG. 2, town 100 is formed of a collection of a plurality of sections (e.g., about 30 sections). Each section is constituted of a plurality of consumer houses (e.g., about ten houses) connected to a common pole-mounted transformer. FIG. 2 shows sections 19Q, 19R, ..., and 19Z, and pole-mounted transformers 9Q, 9R, ..., and 9Z that correspond to their respective sections 19Q, 19R, ..., and 19Z, but any number of sections may be provided. Further, consumer houses 18a, 18b, ..., and 18n are shown in section 19Q, but any number of consumer houses may also be provided in each section.

FIG. 2 shows the configurations of consumer houses 18a, 18b, ..., and 18n in section 19Q with suffixes "a", "b", ..., and "n" added to reference numerals of the respective elements. However, since the configurations of the consumer houses are the same, the elements are denoted by reference numerals without suffixes "a", "b", ..., and "n" when the description is common to the consumer houses. Similarly, the pole-mounted transformers will be also denoted simply as a pole-mounted transformer 9 without suffixes "Q", "R", ..., and "Z" when the description is common to the sections.

Each consumer house 18 includes a solar cell 1, a solar cell power conversion device 2, a storage battery 3, a storage battery power conversion device 4, a load 5 in consumer house 18, a power switchboard 6, a home energy management system (HEMS) 7, a smart meter 8, a consumer premises distribution system 10, a consumer premises communication network 11, and a signal line 12. Consumer premises communication network 11 connects HEMS 7 to devices installed in each house. Signal line 12 serves as a signal line through which consumed power and the like of each device measured by power switchboard 6 are transmitted to HEMS 7.

The primary side of each pole-mounted transformer 9 is connected to distribution system 24. The secondary side of each pole-mounted transformer 9 is connected to a distribution system 14 in the corresponding section 19. Each town 100 is provided with an outside premises communication network 13 and a community energy management system (CEMS) 15.

CEMS 15 manages demand and supply of electric power in a city section constituted of sections 19Q, 19R, . . . , and 19Z. Outside premises communication network 13 connects communication between HEMS 7 in each consumer house 18 and CEMS 15.

In the following description of the present first embodiment, solar cell 1 and storage battery 3 are installed as distributed power supplies in each consumer house 18. Solar cell 1 corresponds to one example of an "energy creation device". Storage battery 3 corresponds to one example of an "energy storage device". All of the consumer houses do not need to have both solar cell 1 (energy creation device) and storage battery 3 (energy storage device), but each consumer house may have only one of solar cell 1 and storage battery 3.

<Configuration of Consumer House>

Figure 3:
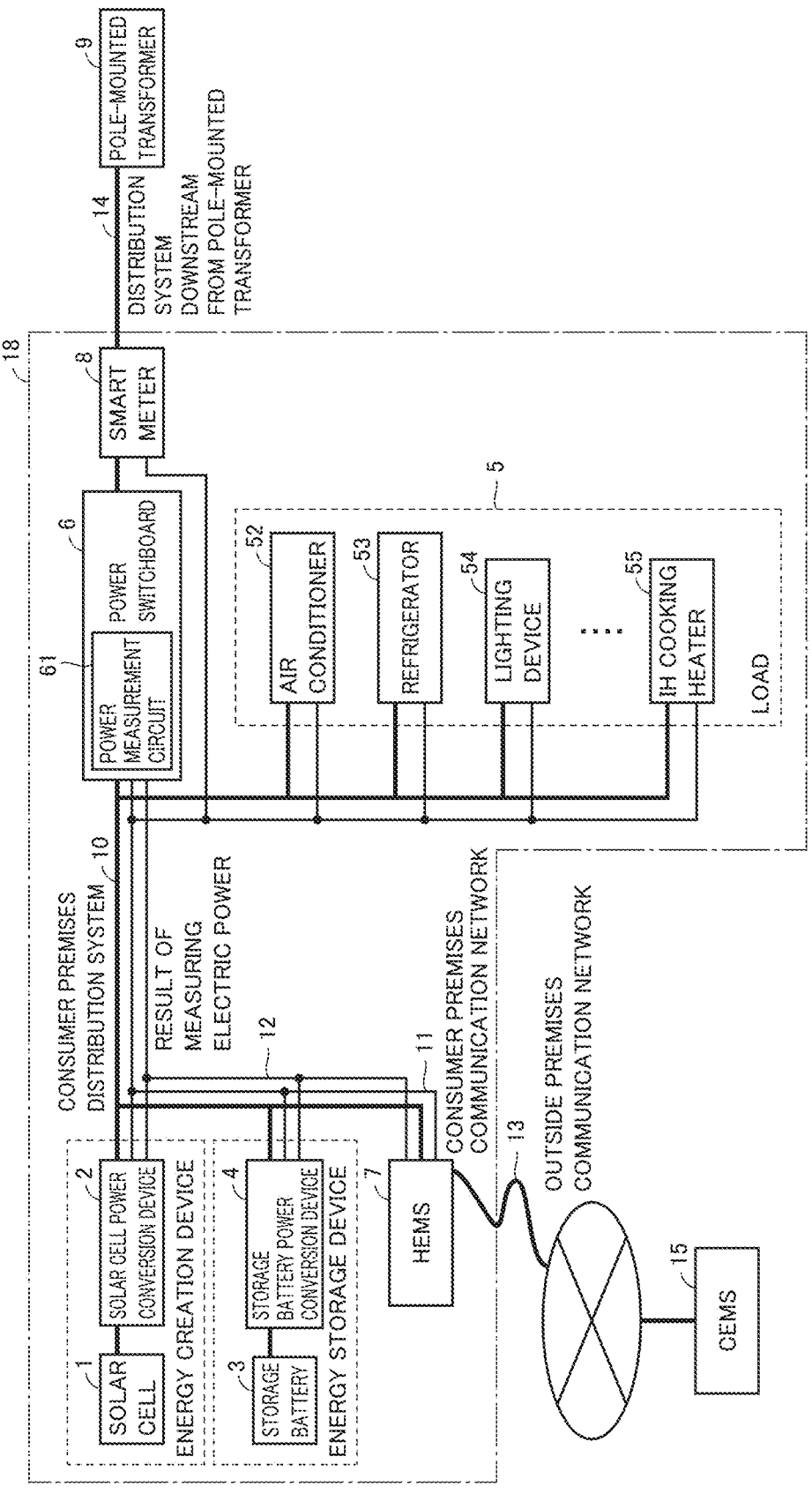
FIG. 3 is a block diagram for further illustrating configurations of various facilities in a consumer house shown in FIG. 2.

FIG. 3 is a block diagram for further illustrating configurations of various devices in consumer house 18 shown in FIG. 2.

Referring to FIG. 3, solar cell 1 and solar cell power conversion device 2 constitute an energy creation device while storage battery 3 and storage battery power conversion device 4 constitute an energy storage device. As described above, each consumer house may be provided with only one of a distributed power supply configured by an energy creation device and a distributed power supply configured by an energy storage device.

Load 5 includes an air conditioner 52, a refrigerator 53, a lighting device 54, and an IH cooking heater 55, for example. Load 5 operates with electric power supplied from consumer premises distribution system 10. Inside power switchboard 6, a power measurement circuit 61 is provided for measuring power consumption per breaker. The value measured by power measurement circuit 61 is transmitted to HEMS 7 through signal line 12. HEMS 7 is capable of transmitting and receiving data to and from each device of load 5 and smart meter 8 through consumer premises communication network 11. Further, HEMS 7 is capable of transmitting and receiving data to and from CEMS 15 through outside premises communication network 13.

Figure 4:
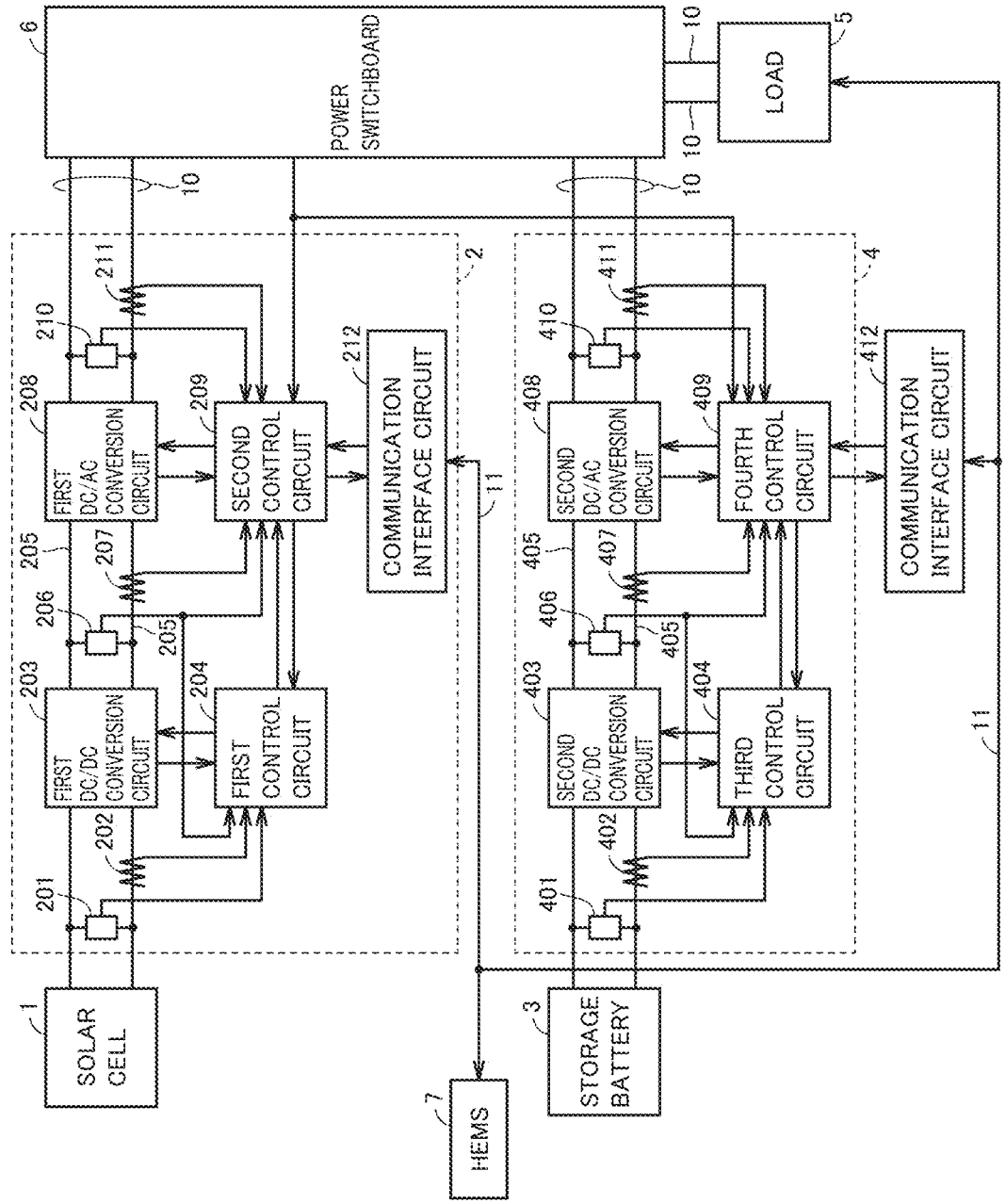
FIG. 4 is a block diagram showing a configuration example of a solar cell power conversion device and a storage battery power conversion device.

FIG. 4 is a block diagram showing a configuration example of solar cell power conversion device 2 and storage battery power conversion device 4.

Referring to FIG. 4, solar cell power conversion device 2 includes a voltmeter 201, an ammeter 202, a first DC/DC conversion circuit 203, a first control circuit 204, a DC bus 205, a voltmeter 206, an ammeter 207, a first DC/AC conversion circuit 208, a second control circuit 209, a voltmeter 210, an ammeter 211, and a communication interface circuit 212.

Voltmeter 201 measures the voltage (DC) output from solar cell 1. Ammeter 202 measures the current (DC) output from solar cell 1. First DC/DC conversion circuit 203 converts the DC power of the first DC voltage output from solar cell 1 into DC power of the second DC voltage. First control circuit 204 controls first DC/DC conversion circuit 203. Through DC bus 205, the second DC voltage output from first DC/DC conversion circuit 203 is supplied to first DC/AC conversion circuit 208. Voltmeter 206 measures the voltage on DC bus 205. Ammeter 207 measures the current (DC) output from first DC/DC conversion circuit 203.

First DC/AC conversion circuit 208 converts the DC power output from first DC/DC conversion circuit 203 into AC power. Second control circuit 209 controls first DC/AC conversion circuit 208. Voltmeter 210 measures the voltage (AC) output from first DC/AC conversion circuit 208. Ammeter 211 measures the current (AC) output from first DC/AC conversion circuit 208. Communication interface circuit 212 establishes communication between solar cell power conversion device 2 and HEMS 7.

Storage battery power conversion device 4 includes a voltmeter 401, an ammeter 402, a second DC/DC conversion circuit 403, a third control circuit 404, a DC bus 405, a voltmeter 406, an ammeter 407, a second DC/AC conversion circuit 408, a fourth control circuit 409, a voltmeter 410, an ammeter 411, and a communication interface circuit 412.

Voltmeter 401 measures the voltage (DC) output from storage battery 3. Ammeter 402 measures the current (DC) output from storage battery 3. Second DC/DC conversion circuit 403 converts the DC power of the third DC voltage output from storage battery 3 into DC power of the fourth DC voltage. Third control circuit 404 controls second DC/DC conversion circuit 403. Through DC bus 405, the fourth DC voltage output from second DC/DC conversion circuit 403 is supplied to second DC/AC conversion circuit 408.

Voltmeter 406 measures the voltage on DC bus 405. Ammeter 407 measures the direct current output from second DC/DC conversion circuit 403. Second DC/AC conversion circuit 408 converts the DC power output from second DC/DC conversion circuit 403 into AC power. Fourth control circuit 409 controls second DC/AC conversion circuit 408. Voltmeter 410 measures the voltage (AC) output from second DC/AC conversion circuit 408. Ammeter 411 measures the current (AC) output from second DC/AC conversion circuit 408. Communication interface circuit 412 establishes communication between storage battery power conversion device 4 and HEMS 7.

First DC/DC conversion circuit 203, second DC/DC conversion circuit 403, first DC/AC conversion circuit 208, and second DC/AC conversion circuit 408 can be formed in configurations of a known DC/DC converter and inverter as appropriate. In the configuration in FIG. 4, each of first DC/AC conversion circuit 208 and second DC/AC conversion circuit 408 corresponds to one example of an "inverter", and each of second control circuit 209 and fourth control circuit 409 corresponds to one example of a "controller".

Figure 5:
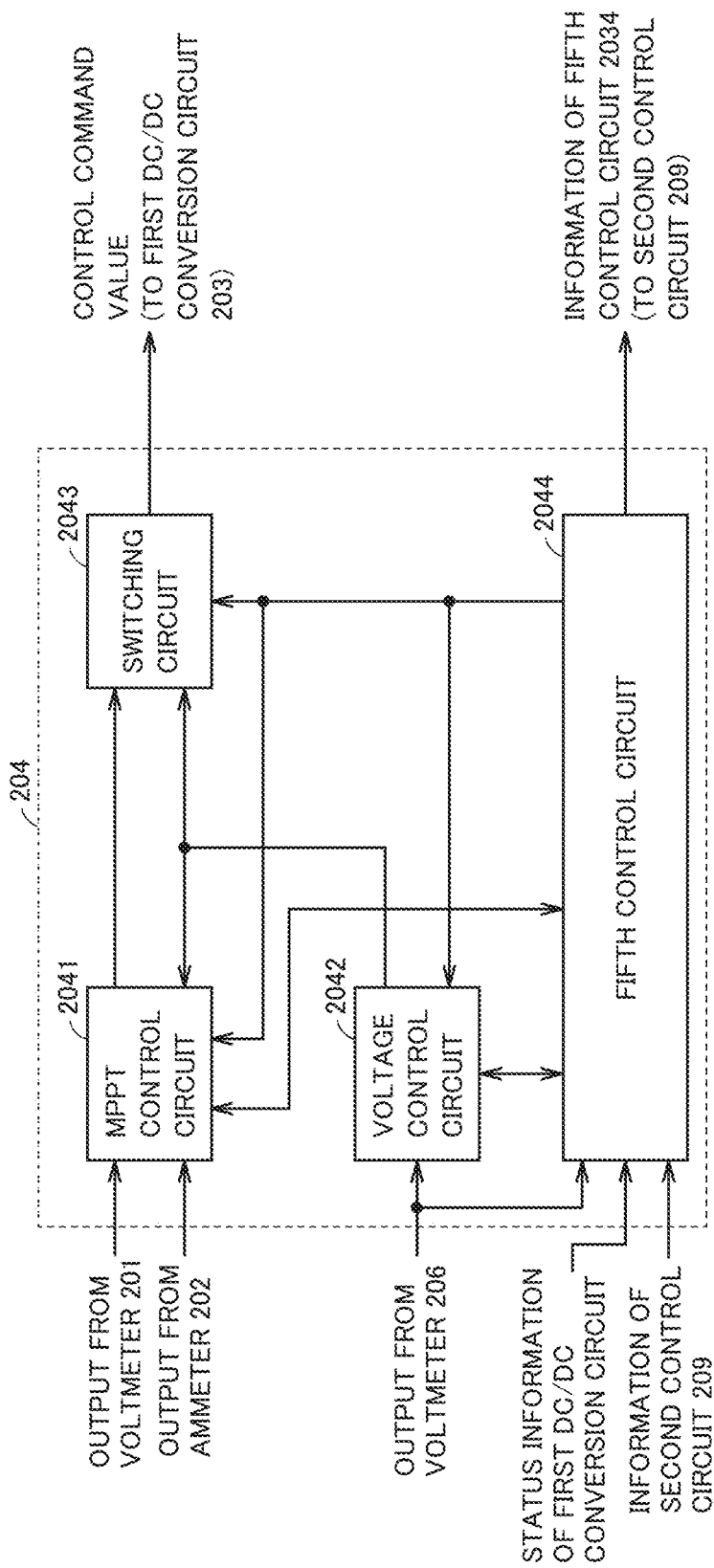
FIG. 5 is a block diagram showing a configuration example of a first control circuit that controls a first direct-current (DC)/DC conversion circuit in the solar cell power conversion device shown in FIG. 4.

FIG. 5 is a block diagram showing a configuration example of first control circuit 204 that controls first DC/DC conversion circuit 203 in solar cell power conversion device 2, as shown in FIG. 4.

Referring to FIG. 5, first control circuit 204 includes a maximum power point tracking (MPPT) control circuit 2041, a voltage control circuit 2042, a switching circuit 2043, and a fifth control circuit 2044. Based on the values measured by voltmeter 201 and ammeter 202, MPPT control circuit 2041 searches for the maximum power point of solar cell 1 in order to extract electric power, as much as possible, generated by solar cell 1 for, what is called, maximum power point tracking control. Specifically, MPPT control circuit 2041 generates a control command value of first DC/DC conversion circuit 203 for controlling the DC voltage measured by voltmeter 201 to be set at a voltage corresponding to the above-mentioned maximum power point.

Based on the value measured by voltmeter 206, voltage control circuit 2042 generates a control command value of first DC/DC conversion circuit 203 for maintaining the DC voltage (the second DC voltage) on DC bus 205 at a predetermined target voltage (for example, 350V).

Fifth control circuit 2044 outputs a control parameter, a control target value and the like to MPPT control circuit 2041 and voltage control circuit 2042, and also manages the power generation state of solar cell 1, and the like. Fifth control circuit 2044 further outputs a control signal for switching circuit 2043.

According to the control signal from fifth control circuit 2044, switching circuit 2043 selectively outputs one of the outputs from MPPT control circuit 2041 and voltage control circuit 2042 as a control command value for first DC/DC conversion circuit 203.

As described below, first DC/DC conversion circuit 203 (FIG. 4) is controlled in an MPPT mode or a voltage control mode. In the MPPT mode, switching circuit 2043 is controlled to output the control command value generated by MPPT control circuit 2041. In the voltage control mode, switching circuit 2043 is controlled to output the control command value generated by voltage control circuit 2042.

Figure 6:
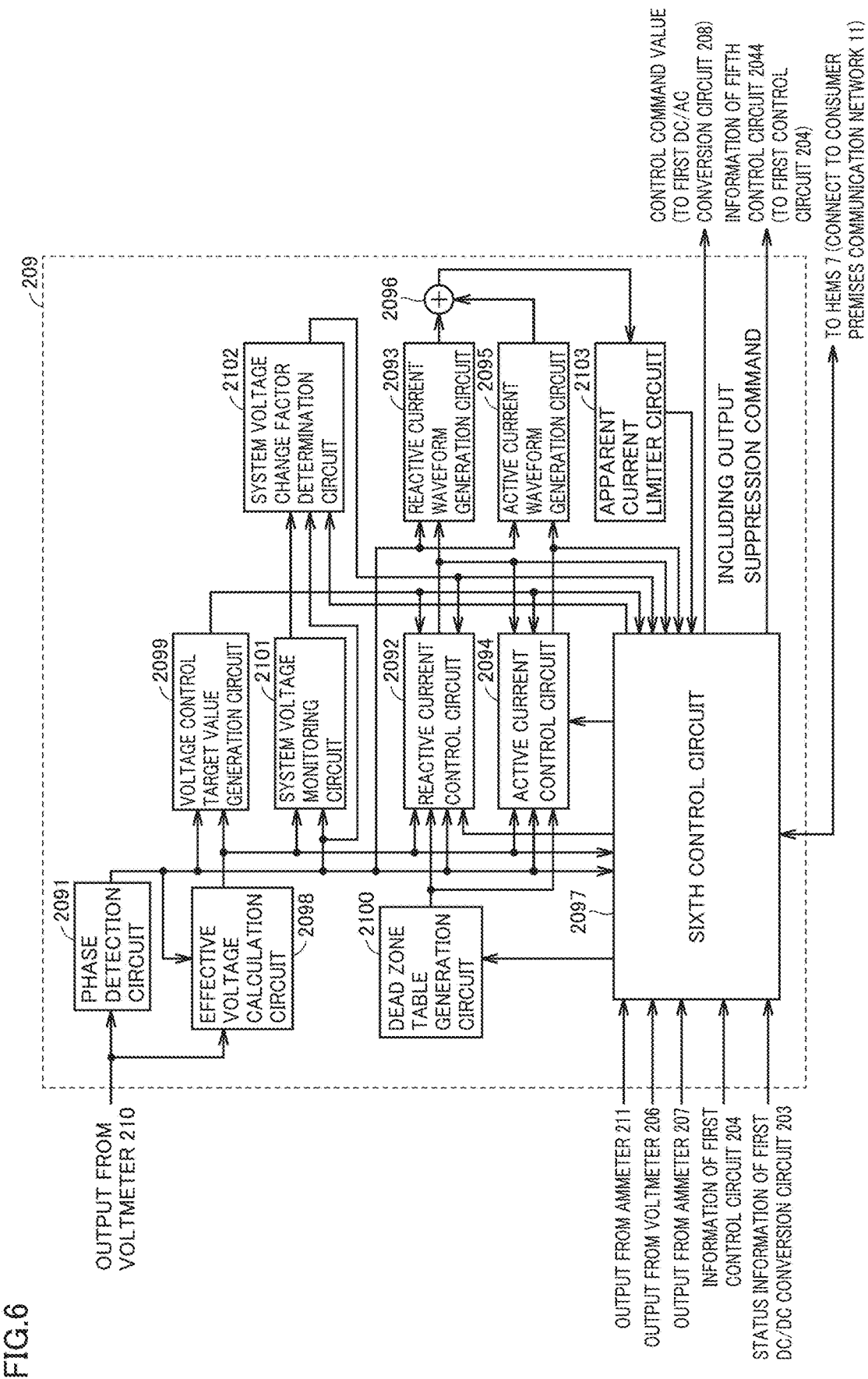
FIG. 6 is a block diagram showing a configuration example of a second control circuit that controls a first DC/AC conversion circuit in the solar cell power conversion device shown in FIG. 4.

FIG. 6 is a block diagram showing a configuration example of second control circuit 209 that controls first DC/AC conversion circuit 208 in solar cell power conversion device 2, as shown in FIG. 4.

Referring to FIG. 6, second control circuit 209 includes a phase detection circuit 2091, a reactive current control circuit 2092, a reactive current waveform generation circuit 2093, an active current control circuit 2094, an active current waveform generation circuit 2095, an adder 2096, a sixth control circuit 2097, an effective voltage calculation circuit 2098, a voltage control target value generation circuit 2099, a dead zone table generation circuit 2100, a system voltage monitoring circuit 2101, a system voltage change factor determination circuit 2102, and an apparent current limiter circuit 2103.

Phase detection circuit 2091 detects a phase from the voltage waveform of the alternating current measured by voltmeter 210. Reactive current control circuit 2092 generates an amplitude command of the reactive current output from first DC/AC conversion circuit 208 (FIG. 4) based on the effective voltage of the AC voltage in the distribution system that is output from effective voltage calculation circuit 2098, the voltage control target value generated by voltage control target value generation circuit 2099, the dead zone width information generated by dead zone table generation circuit 2100, and the output from system voltage change factor determination circuit 2102. The details of reactive current control circuit 2092 will be described later.

In the present first embodiment, reactive current control circuit 2092 starts calculation of the amplitude command of the reactive current based on the zero-cross point information of the AC voltage phase detected by phase detection circuit 2091 (the reactive current command value is calculated in the cycle of the AC voltage).

Reactive current waveform generation circuit 2093 generates a reactive current waveform output from first DC/AC conversion circuit 208 based on the phase detection information (zero-cross point detection information) about the AC voltage output from phase detection circuit 2091 and the amplitude command value generated by reactive current control circuit 2092.

Active current control circuit 2094 generates an amplitude command value of the active current to be output from first DC/AC conversion circuit 208 based on the voltage on DC bus 205 measured by voltmeter 206, the current flowing through DC bus 205 and measured by ammeter 207, the AC effective voltage in consumer premises distribution system 10 that is output from effective voltage calculation circuit 2098, the voltage control target value generated by voltage control target value generation circuit 2099, the reactive current amplitude information output from reactive current control circuit 2092, and the dead zone width information generated by dead zone table generation circuit 2100, each of which is given through sixth control circuit 2097.

In the present first embodiment, active current control circuit 2094 starts calculation of the amplitude command of the active current based on the zero-cross point information of the AC voltage phase detected by phase detection circuit 2091 (the active current command value is calculated in the cycle of the AC voltage). Then, active current control circuit 2094 calculates the current amplitude value of the active current by proportional-integral (PI) control for bringing the voltage on DC bus 205 to be close to a predetermined target voltage (for example, 350V).

Active current waveform generation circuit 2095 generates an active current waveform output from first DC/AC conversion circuit 208 based on the phase detection information (zero-cross point detection information) of the AC voltage output from phase detection circuit 2091 and the amplitude command value generated by active current control circuit 2094.

Adder 2096 adds the reactive current waveform output from reactive current waveform generation circuit 2093 and the active current waveform output from active current waveform generation circuit 2095 to thereby generate an AC current target value to be output from first DC/AC conversion circuit 208. The output from adder 2096 is subjected to a limiter process in apparent current limiter circuit 2103 so as to prevent the output current from exceeding the rated current of first DC/AC conversion circuit 208.

Based on the AC current target value output from apparent current limiter circuit 2103 and the result of measuring the AC current output from ammeter 211, sixth control circuit 2097 generates a control command value of first DC/AC conversion circuit 208 for controlling the output current from first DC/AC conversion circuit 208 to be set at an AC current target value.

Effective voltage calculation circuit 2098 calculates an AC effective voltage from the AC voltage in consumer premises distribution system 10 that is output from voltmeter 210. Voltage control target value generation circuit 2099 generates a control target value of the AC voltage (AC effective voltage) from the AC effective voltage output from effective voltage calculation circuit 2098. Dead zone table generation circuit 2100 generates dead zone width information. The dead zone width information will be described later.

At the time of generation of reactive power, sixth control circuit 2097 calculates apparent power. When the calculated apparent power exceeds the capacity of first DC/AC conversion circuit 208, sixth control circuit 2097 corrects the AC current target value output from apparent current limiter circuit 2103 to thereby control the output power (output current) from first DC/AC conversion circuit 208 to become equal to or less than the capacity of first DC/AC conversion circuit 208.

System voltage monitoring circuit 2101 captures the effective voltage information calculated by effective voltage calculation circuit 2098 based on the phase detection information (zero-cross point detection information) output from phase detection circuit 2091. Effective voltage calculation circuit 2098 calculates the effective voltage for one cycle of an alternating current based on the phase detection information output from phase detection circuit 2091, and then, outputs the calculation result to voltage control target value generation circuit 2099, system voltage monitoring circuit 2101, reactive current control circuit 2092, active current control circuit 2094, and sixth control circuit 2097. Then, system voltage monitoring circuit 2101 calculates a difference value between the effective voltage information captured based on the zero-cross point detection information and the effective voltage information captured one cycle before, and then, outputs the difference value to system voltage change factor determination circuit 2102.

When system voltage change factor determination circuit 2102 receives the difference value of the effective voltage from system voltage monitoring circuit 2101, it determines based on the received effective voltage difference value whether the change in effective voltage is caused by the tap changing in SVR 23 or caused by the change in electric power generated by the load or the energy creation device, and then, outputs the determination result to reactive current control circuit 2092 and sixth control circuit 2097.

Figure 7:
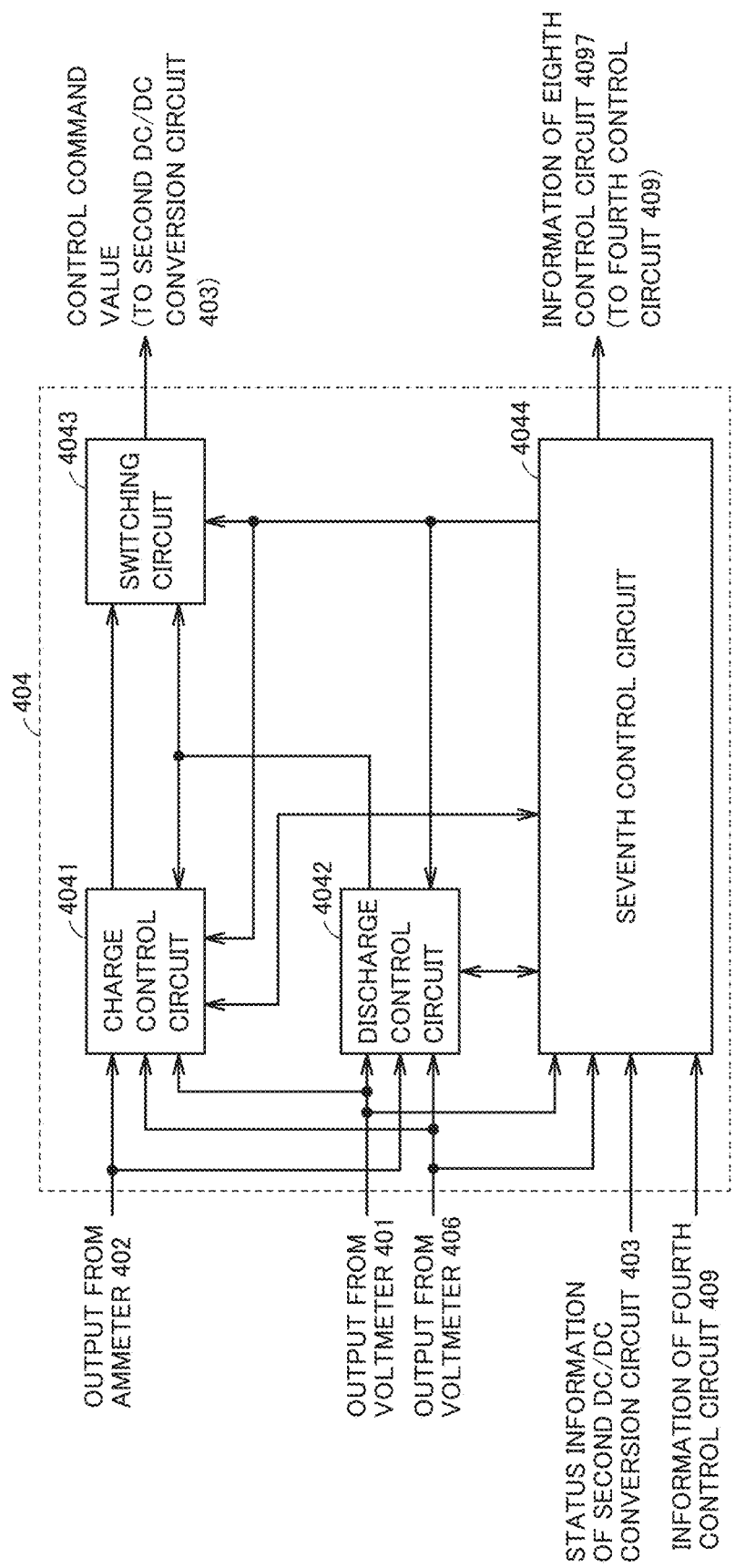
FIG. 7 is a block diagram showing a configuration example of a third control circuit that controls a second DC/DC conversion circuit in the storage battery power conversion device shown in FIG. 4.

FIG. 7 is a block diagram showing a configuration example of third control circuit 404 that controls second DC/DC conversion circuit 403 in storage battery power conversion device 4, as shown in FIG. 4.

Referring to FIG. 7, third control circuit 404 includes a charge control circuit 4041, a discharge control circuit 4042, a switching circuit 4043, and a seventh control circuit 4044.

Charge control circuit 4041 generates a control command value of second DC/DC conversion circuit 403 that is used when performing charging control for storage battery 3. Discharge control circuit 4042 generates a control command value of second DC/DC conversion circuit 403 that is used when performing discharging control for storage battery 3. Seventh control circuit 4044 outputs a control parameter, a control target value and the like to charge control circuit 4041 and discharge control circuit 4042, and also, manages the charge amount, the charge current, the discharge power amount and the like of storage battery 3. Seventh control circuit 4044 further outputs a control signal for switching circuit 4043.

According to the control signal from seventh control circuit 4044, switching circuit 4043 selectively outputs one of the outputs from charge control circuit 4041 and discharge control circuit 4042 as a control command value of second DC/DC conversion circuit 403.

Switching circuit 4043 is controlled to output the control command value generated by charge control circuit 4041 when it receives an instruction to charge storage battery 3, and also controlled to output the control command value generated by discharge control circuit 4042 when it receives an instruction to discharge storage battery 3.

Figure 8:
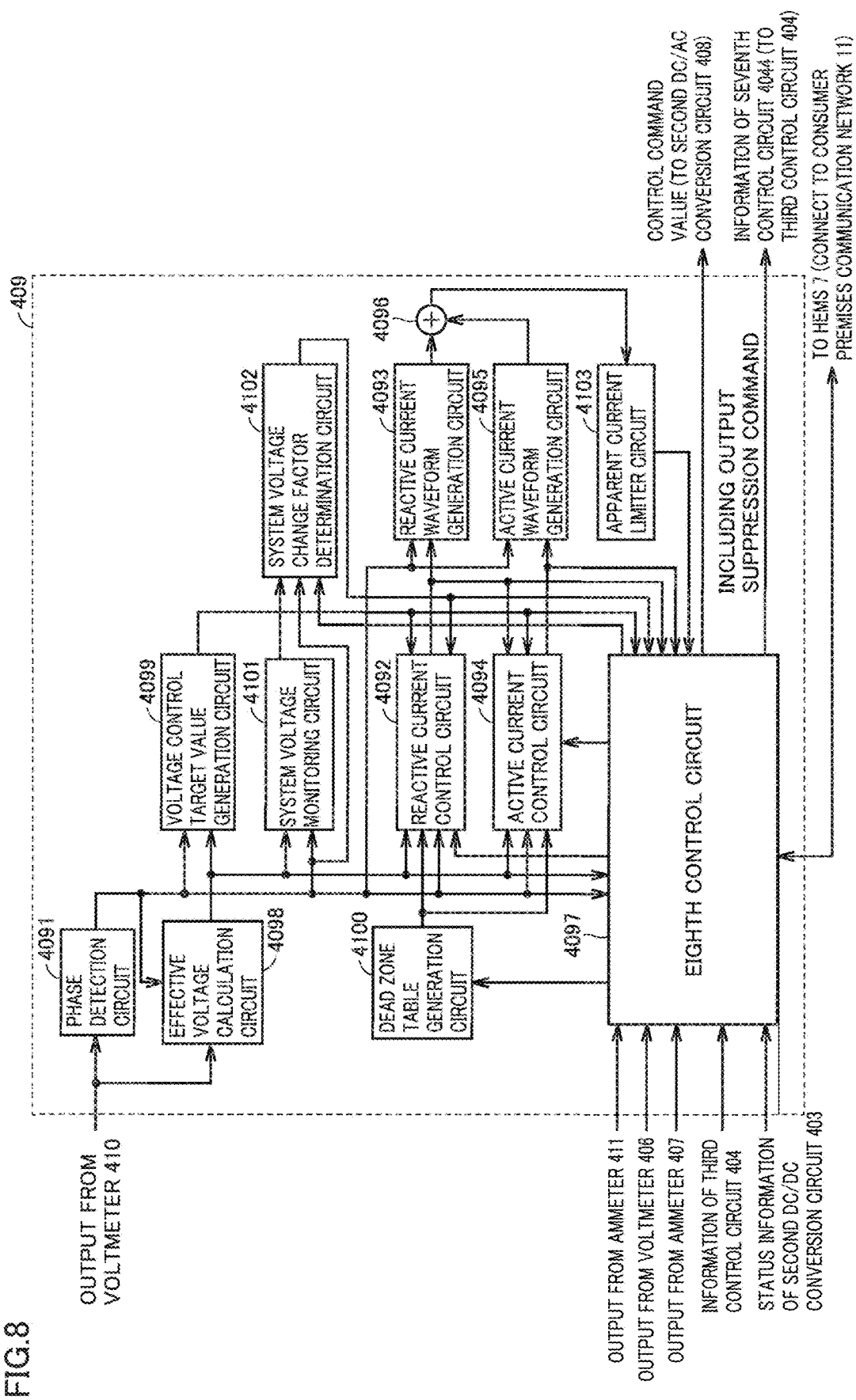
FIG. 8 is a block diagram showing a configuration example of a fourth control circuit that controls a second DC/AC conversion circuit in the storage battery power conversion device shown in FIG. 4.

FIG. 8 is a block diagram showing a configuration example of fourth control circuit 409 that controls second DC/AC conversion circuit 408 in storage battery power conversion device 4 shown in FIG. 4.

Referring to FIG. 8, fourth control circuit 409 includes a phase detection circuit 4091, a reactive current control circuit 4092, a reactive current waveform generation circuit 4093, an active current control circuit 4094, an active current waveform generation circuit 4095, an adder 4096, an eighth control circuit 4097, an effective voltage calculation circuit 4098, a voltage control target value generation circuit 4099, a dead zone table generation circuit 4100, a system voltage monitoring circuit 4101, a system voltage change factor determination circuit 4102, and an apparent current limiter circuit 4103.

Phase detection circuit 4091 detects a phase from the AC voltage waveform measured by voltmeter 410. Reactive current control circuit 4092 generates an amplitude command of the reactive current output from second DC/AC conversion circuit 408 (FIG. 4) based on the effective voltage of the AC voltage in the distribution system that is output from effective voltage calculation circuit 4098, the voltage control target value generated by voltage control target value generation circuit 4099 (consumer premises distribution system 10), the dead zone width information generated by dead zone table generation circuit 4100, and the output from system voltage change factor determination circuit 4102. The details of reactive current control circuit 4092 will be described later.

In the present first embodiment, reactive current control circuit 4092 starts calculation of the amplitude command of the reactive current based on the zero-cross point information of the AC voltage phase detected by phase detection circuit 4091 (the reactive current command value is calculated in the cycle of the AC voltage).

Reactive current waveform generation circuit 4093 generates a reactive current waveform to be output from second DC/AC conversion circuit 408, based on the phase detection information (zero-cross point detection information) about the AC voltage output from phase detection circuit 4091 and the amplitude command value generated by reactive current control circuit 4092.

Active current control circuit 4094 generates an amplitude command value of the active current to be output from second DC/AC conversion circuit 408, based on the voltage on DC bus 405 that is measured by voltmeter 406, the current flowing through DC bus 405 and measured by ammeter 407, the AC effective voltage in consumer premises distribution system 10 that is output from effective voltage calculation circuit 4098, the voltage control target value generated by voltage control target value generation circuit 4099 (consumer premises distribution system 10), the reactive current amplitude information output from reactive current control circuit 4092, and the dead zone width information generated by dead zone table generation circuit 4100, each of which is given through eighth control circuit 4097.

In the present first embodiment, active current control circuit 4094 starts calculation of the amplitude command of the active current based on the zero-cross point information of the AC voltage phase detected by phase detection circuit 4091 (the active current command value is calculated in the cycle of the AC voltage).

Active current waveform generation circuit 4095 generates an active current waveform to be output from second DC/AC conversion circuit 408, based on the phase detection information (zero-cross point detection information) about the AC voltage output from phase detection circuit 4091 and the amplitude command value generated by active current control circuit 4094.

Adder 4096 adds the reactive current waveform output from reactive current waveform generation circuit 4093 and the active current waveform output from active current waveform generation circuit 4095, to thereby generate an AC current target value to be output from second DC/AC conversion circuit 408. The output from adder 4096 is subjected to a limiter process in apparent current limiter circuit 4103 so as to prevent the output current from exceeding the rated current of second DC/AC conversion circuit 408.

Based on the AC current target value output from apparent current limiter circuit 4103 and the result of measuring the AC current output from ammeter 411, eighth control circuit 4097 generates a control command value of second DC/AC conversion circuit 408 for controlling the output current from second DC/AC conversion circuit 408 to be set at an AC current target value.

Effective voltage calculation circuit 4098 calculates an AC effective voltage from the AC voltage in consumer premises distribution system 10 that is output from voltmeter 410. Voltage control target value generation circuit 4099 generates a control target value of the AC voltage (AC effective voltage) based on the AC effective voltage output from effective voltage calculation circuit 4098. Dead zone table generation circuit 4100 generates dead zone width information.

At the time of generation of reactive power, eighth control circuit 4097 calculates apparent power. When the calculated apparent power exceeds the capacity of second DC/AC conversion circuit 408, eighth control circuit 4097 corrects the AC current target value output from apparent current limiter circuit 4103 to thereby control the output power (output current) from second DC/AC conversion circuit 408 to become equal to or less than the capacity of second DC/AC conversion circuit 408.

System voltage monitoring circuit 4101 captures the effective voltage information calculated by effective voltage calculation circuit 4098 based on the phase detection information (zero-cross point detection information) output from phase detection circuit 4091. Effective voltage calculation circuit 4098 calculates an effective voltage for one cycle of an alternating current based on the phase detection information output from phase detection circuit 4091, and then, outputs the calculation result to voltage control target value generation circuit 4099, system voltage monitoring circuit 4101, reactive current control circuit 4092, active current control circuit 4094, and eighth control circuit 4097. Then, system voltage monitoring circuit 4101 calculates a difference value between the effective voltage information captured based on the zero-cross point detection information and the effective voltage information captured one cycle before, and then, outputs the difference value to system voltage change factor determination circuit 4102.

When system voltage change factor determination circuit 4102 receives the difference value of the effective voltage from system voltage monitoring circuit 4101, it determines based on the received effective voltage difference value whether the change in effective voltage is caused by the tap changing in SVR 23 or caused by the change in electric power generated by the load or the energy creation device, and then, outputs the determination result to reactive current control circuit 4092 and eighth control circuit 4097.

Then, the details of main blocks in FIGS. 6 and 8 will be further described.

Figure 9:
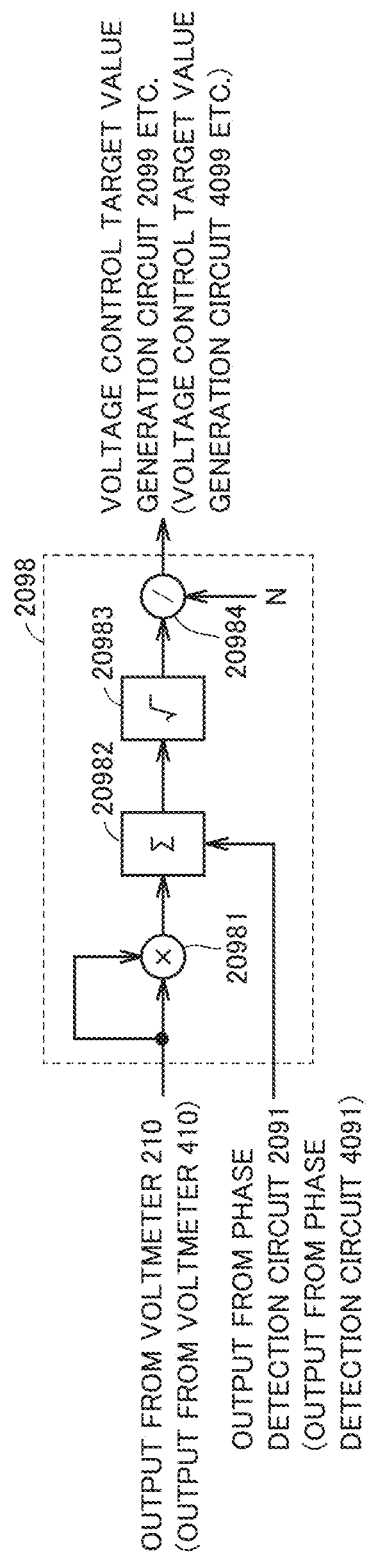
FIG. 9 is a block diagram showing a configuration example of an effective voltage calculation circuit shown in FIGS. 6 and 8.

FIG. 9 is a block diagram showing a configuration example of effective voltage calculation circuit 2098 and 4098 shown in FIGS. 6 and 8, respectively. Since effective voltage calculation circuit 4098 has the same configuration as that of effective voltage calculation circuit 2098, effective voltage calculation circuit 2098 will be representatively described below.

Referring to FIG. 9, effective voltage calculation circuit 2098 includes a multiplier 20981, an integrator 20982, a square root calculator 20983, and a divider 20984.

Multiplier 20981 multiplies the values of the AC voltages in the consumer premises distribution system that are measured by voltmeter 210 to thereby calculate a voltage square value. The output from multiplier 20981 is input into integrator 20982. Thereby, a total sum of the voltage square values is calculated. Specifically, based on the phase detection information output from phase detection circuit 2091, for example, in each one cycle of the distribution AC system, the total sum calculated by integrator 20982 is latched into a register (not shown) and the integrated value is reset to zero.

The output from integrator 20982 (i.e., the register output (not shown)) is input into square root calculator 20983 to calculate the square root of the total sum of the voltage square values. Further, divider 20984 divides the output value from square root calculator 20983 by an integration sample number N (N: natural number) obtained by integrator 20982 and corresponding to one cycle period in the distribution AC system. As a result, the output value from divider 20984 corresponds to the AC effective voltage in consumer premises distribution system 10.

Figure 10:
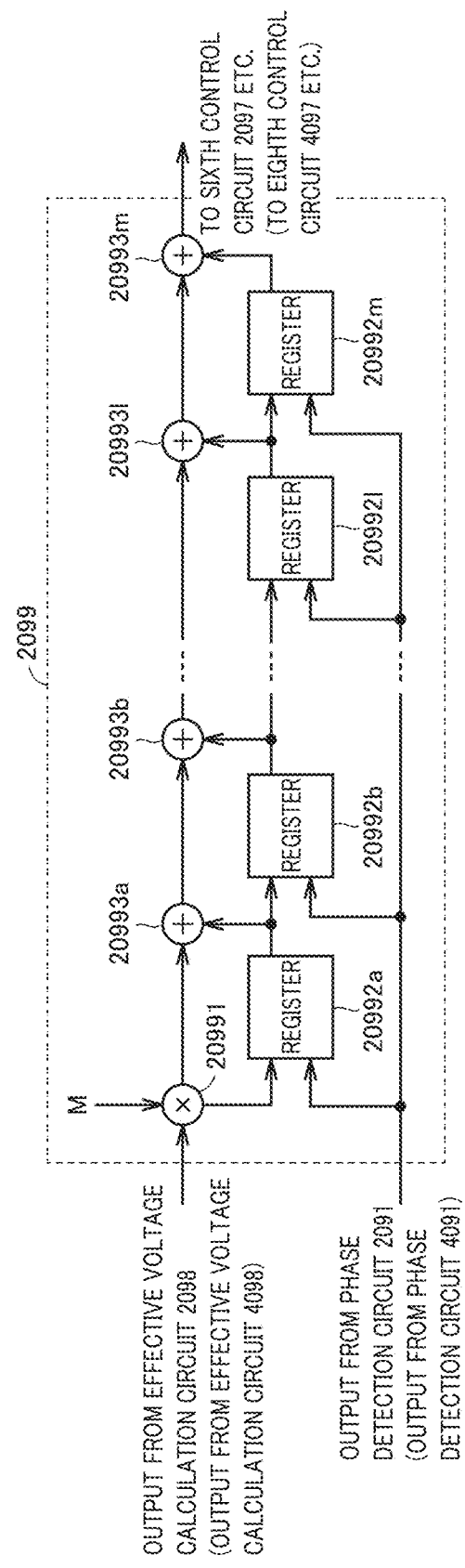
FIG. 10 is a block diagram showing a configuration example of a voltage control target value generation circuit shown in FIGS. 6 and 8.

FIG. 10 is a block diagram showing a configuration example of voltage control target value generation circuits 2099 and 4099 shown in FIGS. 6 and 8, respectively. Since voltage control target value generation circuit 4099 has the same configuration as that of voltage control target value generation circuit 2099, voltage control target value generation circuit 2099 will be hereinafter representatively described.

Referring to FIG. 10, voltage control target value generation circuit 2099 includes a multiplier 20991, registers 20992a to 20992m in a plurality of stages, and adders 20993a to 20993m in a plurality of stages. The multiplier, the registers, and the adders mentioned above constitute a finite impulse response (FIR) filter.

Multiplier 20991 multiplies the AC effective voltage output from effective voltage calculation circuit 2098 by a predetermined coefficient M, and outputs the calculation result to register 20992a and adder 20993a. A set of register 20992 and adder 20993 is prepared by the number of samples for which the moving average is calculated. Register 20992 is connected in a shift register configuration. Coefficient M is provided as a reciprocal of the number of samples of the AC effective voltage for which the moving average is calculated.

According to such a configuration, voltage control target value generation circuit 2099 calculates the moving average value of the AC effective voltage in consumer premises distribution system 10 that is calculated by effective voltage calculation circuit 2098. In the present first embodiment, for example, a moving average value of the AC effective voltage for one minute is calculated. Then, the moving average value of the AC effective voltage in consumer premises distribution system 10 that is calculated by voltage control target value generation circuit 2099 is output as a voltage control target value of consumer premises distribution system 10 to reactive current control circuit 2092, active current control circuit 2094, and sixth control circuit 2097.

Figure 11:
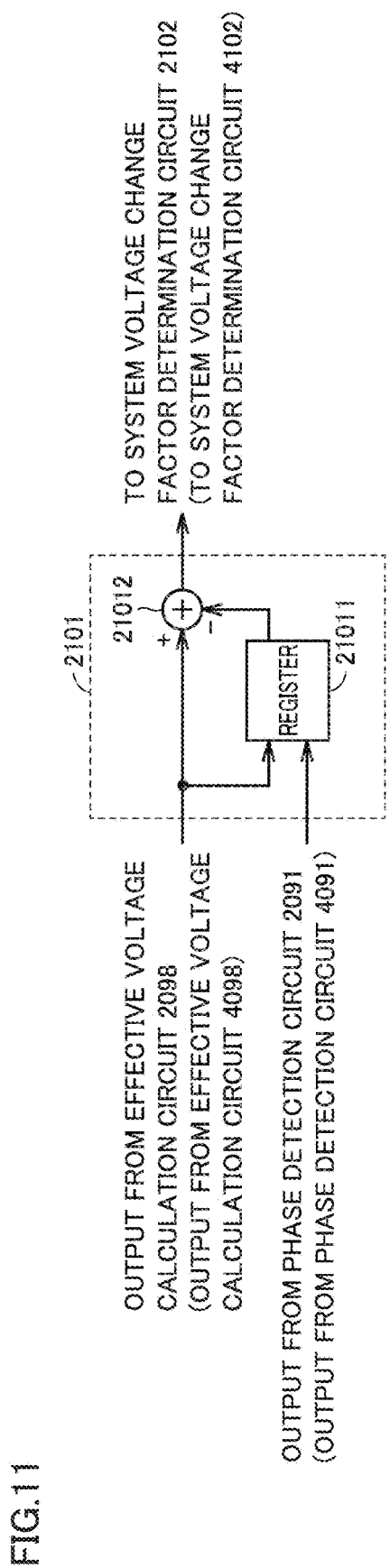
FIG. 11 is a block diagram showing a configuration example of a system voltage monitoring circuit shown in FIGS. 6 and 8.

FIG. 11 is a block diagram showing a configuration example of system voltage monitoring circuits 2101 and 4101 shown in FIGS. 6 and 8, respectively. Since system voltage monitoring circuit 4101 has the same configuration as that of system voltage monitoring circuit 2101, system voltage monitoring circuit 2101 will be representatively described below.

Referring to FIG. 11, system voltage monitoring circuit 2101 includes a register 21011 and a subtractor 21012. Based on the zero-cross point information detected by phase detection circuit 2091, register 21011 delays the AC effective voltage output from effective voltage calculation circuit 2098 by one cycle of an alternating current. If the AC frequency is 60 Hz, register 21011 outputs the AC effective voltage received from effective voltage calculation circuit 2098 with a delay of 1/60 seconds. From the AC effective voltage (the present AC effective voltage) received from effective voltage calculation circuit 2098, subtractor 21012 subtracts the AC effective voltage that is output from register 21011 by one cycle of an alternating current before.

According to such a configuration, system voltage monitoring circuit 2101 receives the AC effective voltage in consumer premises distribution system 10 that is calculated by effective voltage calculation circuit 2098, and subtracts the effective voltage, which has been calculated by one cycle of an alternating current before, from the received effective voltage, and thereby, calculates the amount of change in the effective voltage for one cycle of an alternating current. The amount of change in the effective voltage calculated by system voltage monitoring circuit 2101 is output to system voltage change factor determination circuit 2102.

Figure 12:
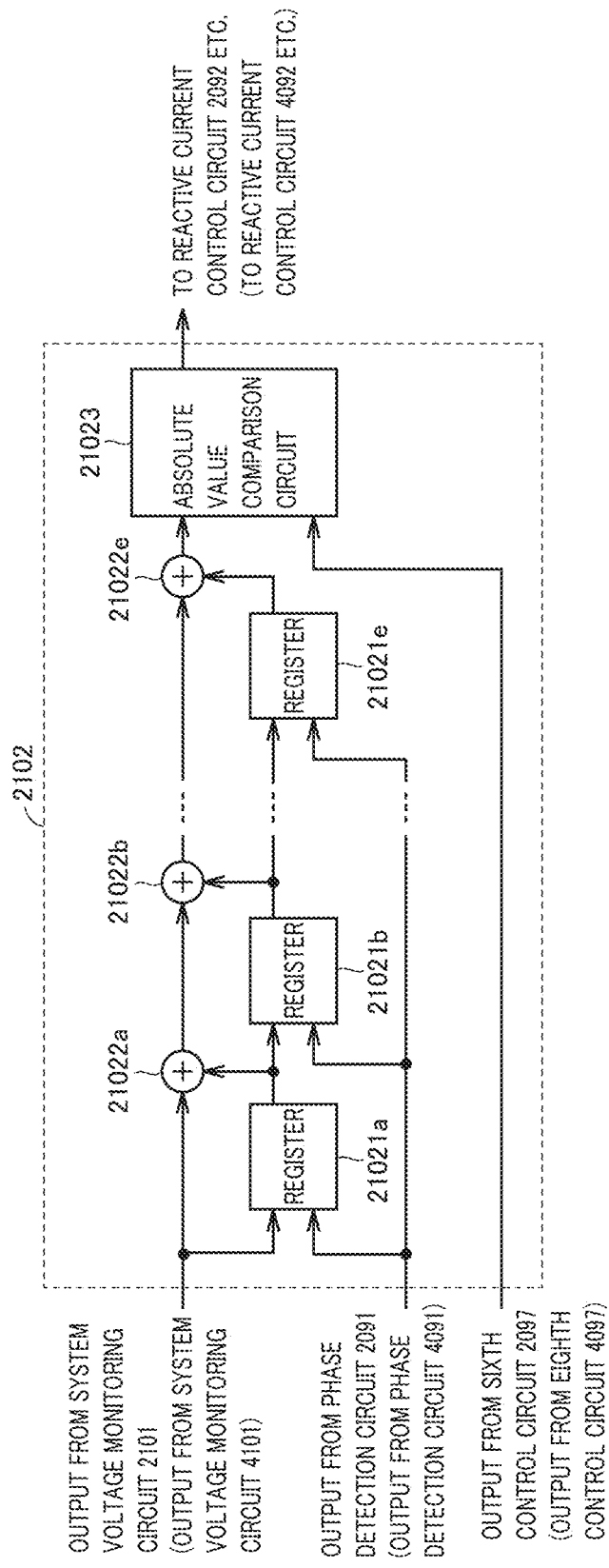
FIG. 12 is a block diagram showing a configuration example of a system voltage change factor determination circuit shown in FIGS. 6 and 8.

FIG. 12 is a block diagram showing a configuration example of system voltage change factor determination circuits 2102 and 4102 shown in FIGS. 6 and 8, respectively. Since system voltage change factor determination circuit 4102 has the same configuration as that of system voltage change factor determination circuit 2102, system voltage change factor determination circuit 2102 will be representatively described below.

Referring to FIG. 12, system voltage change factor determination circuit 2102 includes registers 21021a to 21021n in a plurality of stages, adders 21022a to 21022n in a plurality of stages, and an absolute value comparison circuit 21023. The amount of change in the effective voltage output from system voltage monitoring circuit 2101 is input into register 21021a and adder 21022a.

In system voltage change factor determination circuit 2102, by registers 21021a to 21021n and adders 21022a to 21022n, the amount of change in the effective voltage calculated in system voltage monitoring circuit 2101 is added with the number of stages of registers 21021a to 21021n and plus 1. Then, the result is input into absolute value comparison circuit 21023.

In the present example, five sets of registers 21021 and adders 21022 are provided. Accordingly, the difference value of the AC effective voltage for one cycle of an alternating current that is output from system voltage monitoring circuit 2101 is added by six cycles of an alternating current (corresponding to 100 ms at an AC frequency of 60 Hz). Note that the number to be added is not limited to six cycles of an alternating current, but may be two cycles or ten cycles, or may be changed in accordance with the AC frequency.

When the cycle of the AC voltage changes due to the tap changing in SVR 23, in the present first embodiment, the notification about the zero-cross point detection result to be given to voltage control target value generation circuit 2099 (4099), system voltage monitoring circuit 2101, reactive current control circuit 2092, and active current control circuit 2094 is masked on the phase detection circuit 2091 (4091) side.

Absolute value comparison circuit 21023 compares the absolute value of the result about addition of the effective voltage change amount by registers 21021a to 21021n and adders 21022a to 21022n with the threshold value output from sixth control circuit 2097. When the absolute value of the result about addition of the amount of change in the effective voltage is greater than the threshold value, absolute value comparison circuit 21023 determines that the change in the effective voltage is caused by the tap changing in SVR 23, and then, outputs the determination result to reactive current control circuit 2092 and sixth control circuit 2097. System voltage change factor determination circuit 2102 also outputs the result about addition of the amount of change in the effective voltage.

Figure 13:
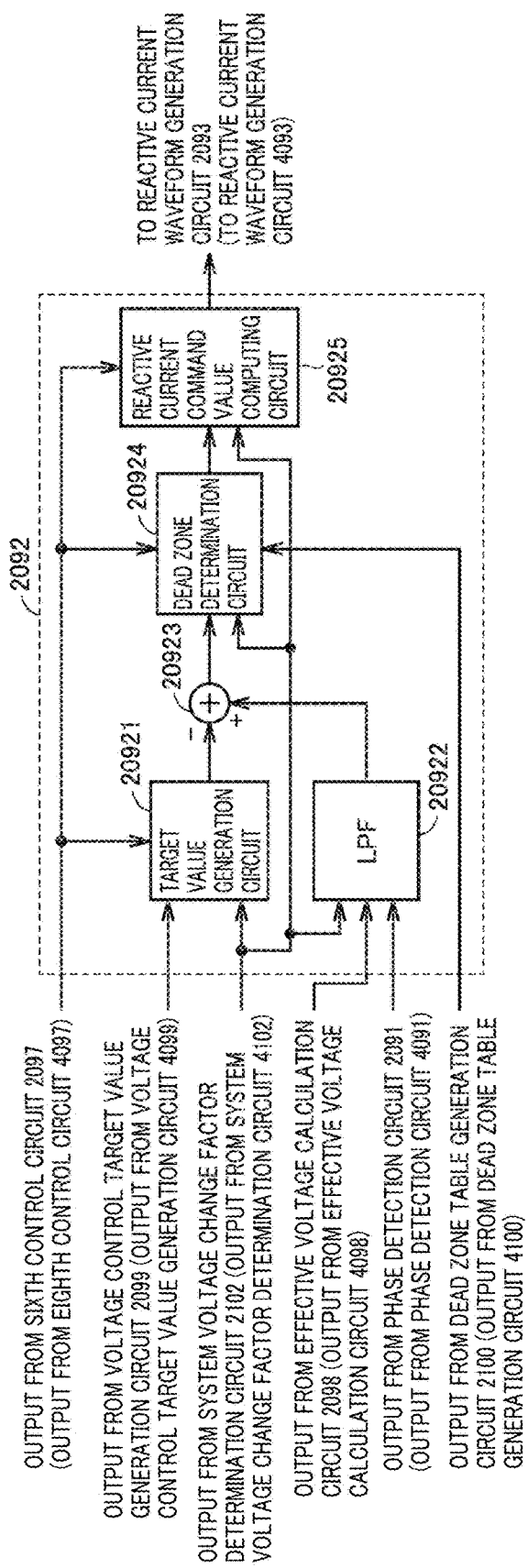
FIG. 13 is a block diagram showing a configuration example of a reactive current control circuit shown in FIGS. 6 and 8.

FIG. 13 is a block diagram showing a configuration example of reactive current control circuits 2092 and 4092 shown in FIGS. 6 and 8, respectively. Since reactive current control circuit 4092 has the same configuration as that of reactive current control circuit 2092, reactive current control circuit 2092 will be representatively described below.

Referring to FIG. 13, reactive current control circuit 2092 includes a target value generation circuit 20921, a low pass filter (LPF) 20922, a subtractor 20923, a dead zone determination circuit 20924, and a reactive current command value computing circuit 20925. Target value generation circuit 20921 generates a target voltage used when generating a reactive current command value. In a normal state (when there is no voltage fluctuation resulting from distribution system voltage stabilization facilities such as SVR 23), target value generation circuit 20921 outputs the target voltage received from voltage control target value generation circuit 2099.

When a voltage fluctuation resulting from distribution system voltage stabilization facilities such as SVR 23 is detected, target value generation circuit 20921 generates a target voltage based on an instruction from sixth control circuit 2097 and outputs the generated target voltage. Specifically, in the present first embodiment, sixth control circuit 2097 calculates the amount of change in the effective voltage in distribution system 10 based on the voltage step width caused by the tap changing in SVR 23. Then, target value generation circuit 20921 adds the amount of change in the effective voltage calculated by sixth control circuit 2097 to the target voltage received from voltage control target value generation circuit 2099, and then, outputs the result. Based on the result about addition of the amount of change in the effective voltage output from system voltage change factor determination circuit 2102, sixth control circuit 2097 determines whether the voltage rises or falls due to the tap changing in SVR 23.

LPF 20922 removes a high frequency component of the effective voltage output from effective voltage calculation circuit 2098. Specifically, LPF 20922 can be formed, for example, of a primary infinite impulse response (IIR) filter having a time constant of several seconds. In the case where LPF 20922 is formed of a digital filter, LPF 20922 is configured to be capable of changing (initializing) an internal register value based on the determination by sixth control circuit 2097 when a voltage fluctuation resulting from distribution system voltage stabilization facilities such as SVR 23 is detected. In the present first embodiment, when a voltage fluctuation resulting from distribution system voltage stabilization facilities such as SVR 23 is detected, LPF 20922 is initialized upon detection of this voltage fluctuation such that the effective voltage calculation result output from effective voltage calculation circuit 2098 is output.

Figure 31:
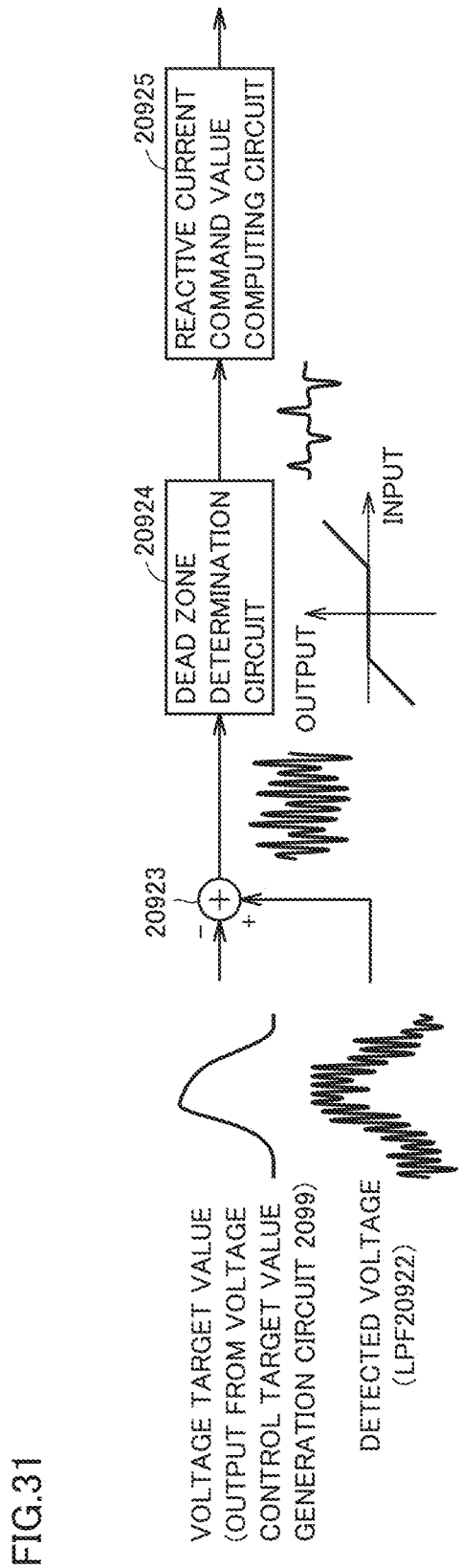
FIG. 31 is a diagram for illustrating the operation of a reactive current control circuit in the first embodiment.

From the output of LPF 20922, subtractor 20923 subtracts the output of target value generation circuit 20921. Based on the dead zone width information output from dead zone table generation circuit 2100, dead zone determination circuit 20924 determines whether the output of subtractor 20923 falls within the dead zone width or not. In the present first embodiment, dead zone determination circuit 20924 is configured by table data deployed in a RAM or the like, and dead zone table generation circuit 2100 writes table data as shown in FIG. 31 (which will be described later in detail) in the RAM or the like in dead zone determination circuit 20924. When a voltage fluctuation resulting from distribution system voltage stabilization facilities such as SVR 23 is detected, dead zone determination circuit 20924 changes the table data deployed in the RAM or the like based on the instruction from sixth control circuit 2097. In the present first embodiment, the contents of the table data deployed in the RAM or the like are not changed.

The output from dead zone determination circuit 20924 is input into reactive current command value computing circuit 20925. Based on the output from dead zone determination circuit 20924, reactive current command value computing circuit 20925 calculates the amplitude of the reactive current output from first DC/AC conversion circuit 208. In the present first embodiment, commonly used proportional-integral control (PI control) is used for controlling the reactive current in reactive current command value computing circuit 20925. Note that reactive current command value computing circuit 20925 is configured to be capable of changing the control parameter for PI control and also capable of maintaining (fixing) the reactive current command value based on the instruction from sixth control circuit 2097 upon detection of a voltage fluctuation resulting from the distribution system voltage stabilization facilities such as SVR 23. In the present first embodiment, when a voltage fluctuation resulting from the distribution system voltage stabilization facilities such as SVR 23 is detected, reactive current command value computing circuit 20925 outputs the reactive current command value that is kept based on the instruction from sixth control circuit 2097.

Figure 14:
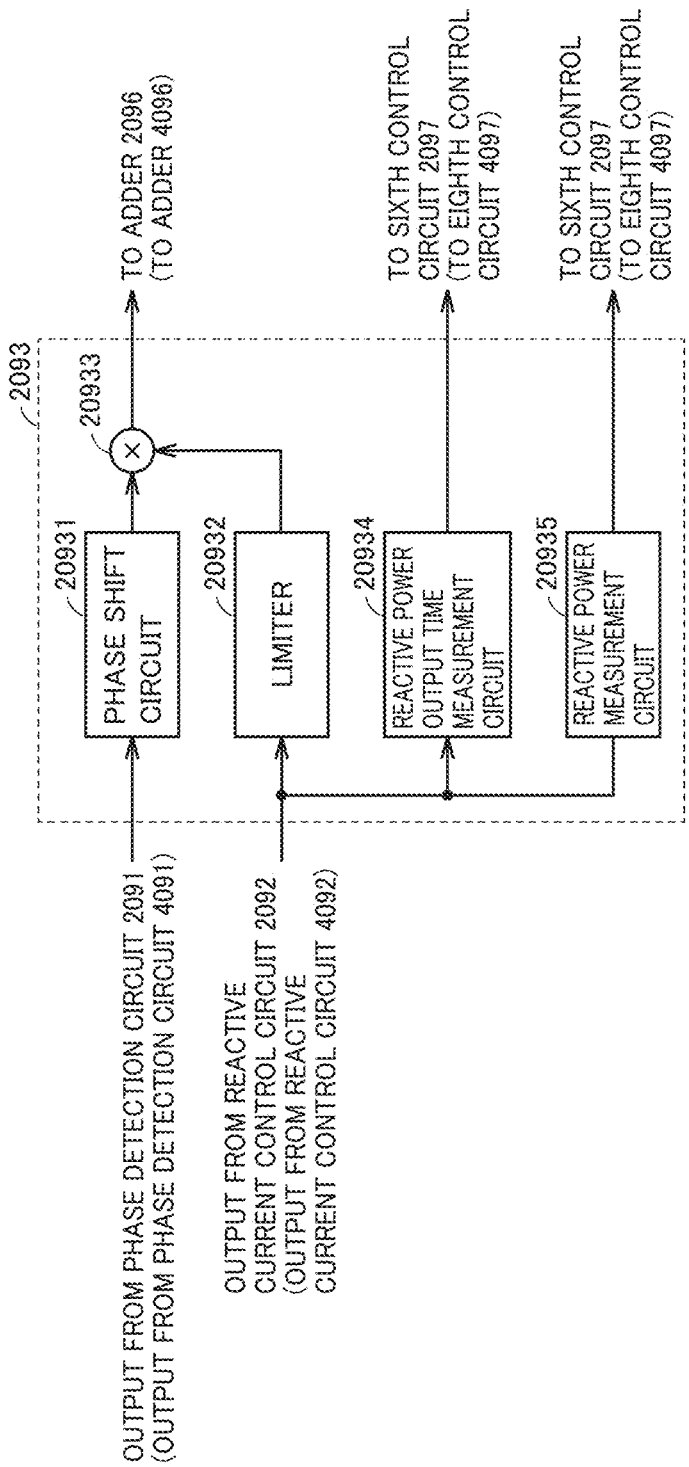
FIG. 14 is a block diagram showing a configuration example of a reactive current waveform generation circuit shown in FIGS. 6 and 8.

FIG. 14 is a block diagram showing a configuration example of reactive current waveform generation circuits 2093 and 4093 shown in FIGS. 6 and 8, respectively. Since reactive current waveform generation circuit 4093 has the same configuration as that of reactive current waveform generation circuit 2093, reactive current waveform generation circuit 2093 will be representatively described below.

Referring to FIG. 14, reactive current waveform generation circuit 2093 includes a phase shift circuit 20931, a limiter 20932, a multiplier 20933, a reactive power output time measurement circuit 20934, and a reactive power measurement circuit 20935.

Phase shift circuit 20931 shifts, by π/2 (90°), the phase information output from phase detection circuit 2091, to generate a cosine wave (cos waveform) used as a reference when generating a reactive current. Limiter 20932 limits the reactive current amplitude output from reactive current control circuit 2092 so as not to exceed a predetermined upper limit value. When the reactive current amplitude from reactive current control circuit 2092 does not exceed the upper limit value, this reactive current amplitude is not limited by limiter 20932 but is output to multiplier 20933 as it is. On the other hand, when the reactive current amplitude from reactive current control circuit 2092 exceeds the upper limit value, limiter 20932 outputs the above-mentioned upper limit value to multiplier 20933. Multiplier 20933 multiplies the reference cosine wave (COS waveform) output from phase shift circuit 20931 by the amplitude information about the reactive current having passed through limiter 20932, to thereby generate a reactive current command value.

Reactive power output time measurement circuit 20934 measures the output time of the reactive power based on the amplitude information about the reactive current output from reactive current control circuit 2092. Reactive power measurement circuit 20935 measures the reactive power output from first DC/AC conversion circuit 208 based on the amplitude information about the reactive current output from reactive current control circuit 2092.

Figure 15:
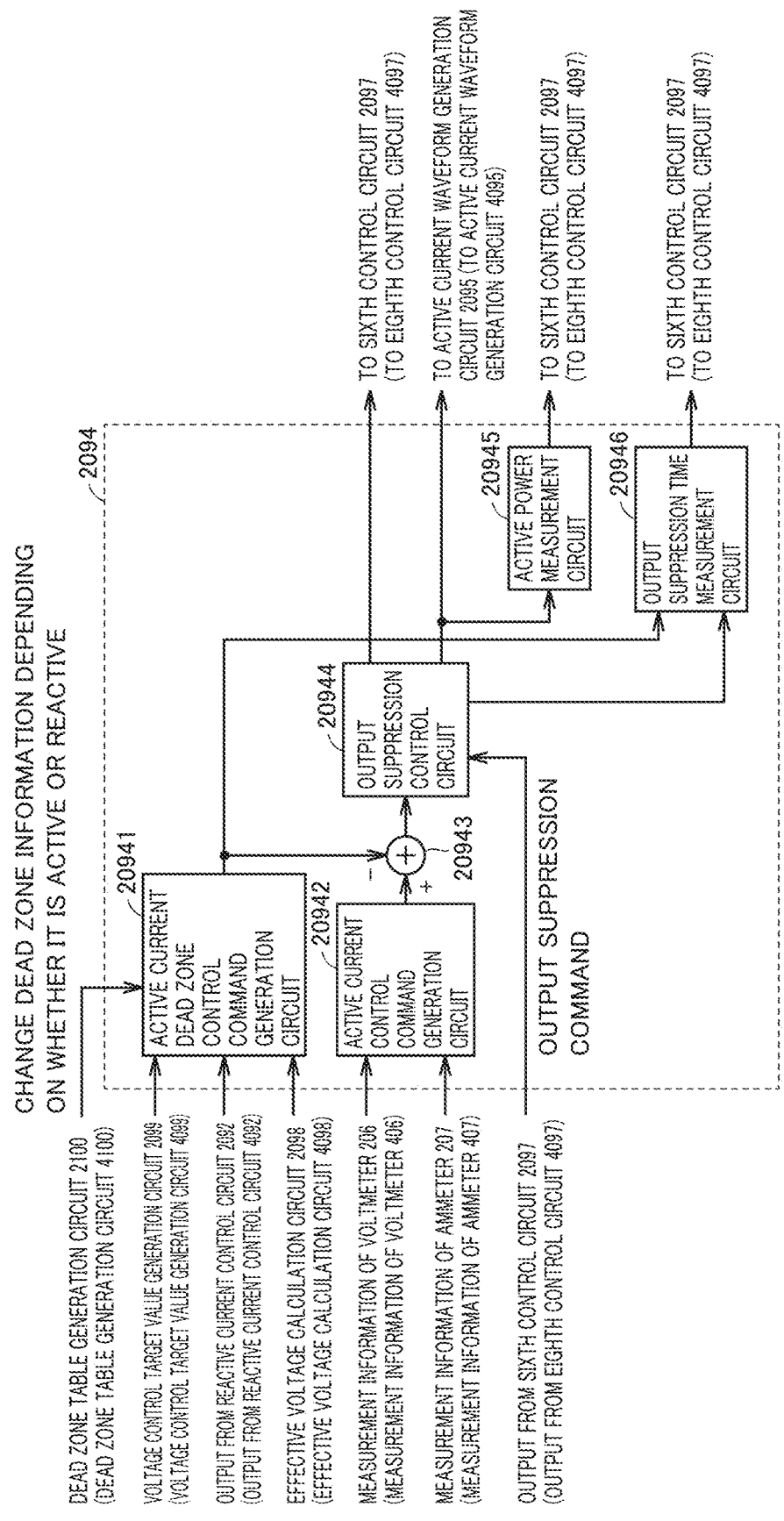
FIG. 15 is a block diagram showing a configuration example of an active current control circuit shown in FIGS. 6 and 8.

FIG. 15 is a block diagram showing a configuration example of active current control circuits 2094 and 4094 shown in FIGS. 6 and 8, respectively. Since active current control circuit 2094 has the same configuration as that of active current control circuit 4094, active current control circuit 2094 will be hereinafter representatively described.

Referring to FIG. 15, active current control circuit 2094 includes an active current dead zone control command generation circuit 20941, an active current control command generation circuit 20942, a subtractor 20943, an output suppression control circuit 20944, an active power measurement circuit 20945, and an output suppression time measurement circuit 20946.

Active current dead zone control command generation circuit 20941 generates a command value for suppressing the active power based on the voltage control target value output from voltage control target value generation circuit 2099, the reactive current amplitude information output from reactive current control circuit 2092, the effective voltage calculation result output from effective voltage calculation circuit 2098, and the dead zone width information output from dead zone table generation circuit 2100. Active current control command generation circuit 20942 generates an active current command value for controlling the active power based on the measurement result by voltmeter 206 and the measurement result by ammeter 207 that are input through sixth control circuit 2097.

Subtractor 20943 subtracts the output of active current dead zone control command generation circuit 20941 from the output of active current control command generation circuit 20942 to thereby generate an active current command value. Based on the output suppression command output from sixth control circuit 2097, output suppression control circuit 20944 suppresses the active current command value output from subtractor 20943 when suppression of the output power is required. DSO 21 gives a notification about this output suppression command through CEMS 15 and HEMS 7.

Active power measurement circuit 20945 measures the active power amount based on the active current command value that has passed through output suppression control circuit 20944. Based on the output from active current dead zone control command generation circuit 20941 and the output from output suppression control circuit 20944, output suppression time measurement circuit 20946 measures the time period during which the output of active power is suppressed.

In the description of the present first embodiment, solar cell 1 that harnesses natural energy is used as an "energy creation device" as illustrated in FIG. 2, but the present invention is not limited thereto, and a fuel cell, a wind power generation facility and the like may also be used, for example. Alternatively, a combination of solar cell 1 and another energy creation device may be disposed as an "energy creation device" in a consumer. Since the configuration and the operation of mega-solar power conversion device 27 shown in FIG. 1 are the same as those of solar cell power conversion device 2 shown in FIG. 2 except for the capacity of the power conversion device, solar cell power conversion device 2 will be representatively described.

Further, in the description of storage battery 3 as an "energy storage device", a fixed stationary battery is used, but the present invention is not limited thereto, and an on-vehicle battery for an electric vehicle may also be used as a storage battery, for example. Alternatively, a combination of the stationary battery and the on-vehicle battery may be used as an "energy storage device". Further, when a lithium-ion battery is used, strictly speaking, a battery management unit incorporated on the battery side manages the power storage amount, the possibility of charge and discharge, the maximum charge current during charging, and the like, and notifies third control circuit 404 about the management results. In the present first embodiment, however, it is assumed that third control circuit 404 collectively manages the power storage amount, the possibility of charge and discharge, the maximum charge current during charging, and the like, for simplifying the description. Since the configuration and the operation of distribution system storage battery power conversion device 29 shown in FIG. 1 are the same as those of storage battery power conversion device 4 shown in FIG. 3 except for the capacity of the power conversion device, storage battery power conversion device 4 will be representatively described.

<Description of Operation of Power Conversion Device>

The following describes a specific operation of the power conversion device in the present first embodiment. Referring again to FIG. 1, in the present first embodiment, in order to control the distribution system voltage from substation 20 to fall within an appropriate voltage range in distribution system 24, three SVR 23a to SVR 23c are provided in series between substation 20 and mega-solar power conversion device 27 (or distribution system storage battery power conversion device 29 and town D 100d). More specifically, building 102 and apartment 103 are connected between substation 20 and SVR 23c through distribution system 24d, and also, town C 100c and factory 101 are connected between SVR 23b and SVR 23c through distribution system 24c. Further, town A 100a and town B 100b are connected between SVR 23a and SVR 23b through distribution system 24b, and also, mega-solar power conversion device 27, distribution system storage battery power conversion device 29, and town D 100d are connected on the secondary side of SVR 23a through distribution system 24a.

DSO 21 manages distribution system 24 based on: the system voltage information from each of voltmeters 22a to 22x installed in distribution system 24; the system voltage information on the primary side and the secondary side of each SVR that is given from SVR 23a to SVR 23c; the tap position information about each of SVR 23a to SVR 23c; the system voltage information of distribution system 24 given from substation 20; and the system voltage information of each consumer house given from CEMS 15 (FIG. 2). DSO 21 and CEMS 15 communicate with each other through a communication line 25.

Referring again to FIG. 2, the following describes a conceivable case where, in a town 100 equipped with a distributed power supply system to which the power conversion device according to the first embodiment is applied, each consumer house 18 is configured as a ZEH house, and solar cell 1 (for example, having a capacity of about 4 kW to 6 kW) is installed in each consumer house 18. In this case, a so-called "mega-solar" system is formed in the entire town.

For each consumer house 18, electric power is supplied from pole-mounted transformer 9 through smart meter 8 to consumer premises distribution system 10. Further, CEMS 15 is connected to HEMS 7 through outside premises communication network 13. The following describes system voltage stabilization control for consumer premises distribution system 10 using the power conversion device constituted of solar cell power conversion device 2 and storage battery power conversion device 4.

Referring again to FIG. 3, HEMS 7, solar cell power conversion device 2, storage battery power conversion device 4, load 5 such as air conditioner 52, and power switchboard 6 are connected to consumer premises communication network 11. When HEMS 7 is activated, HEMS 7 checks the statuses of solar cell power conversion device 2, storage battery power conversion device 4, and load 5. In this case, when CEMS 15 notifies each power conversion device about the target voltage information, the threshold voltage (dead zone width information) and the like for control, HEMS 7 processes part of the information that is to be given through consumer premises communication network 11, and notifies solar cell power conversion device 2 and storage battery power conversion device 4 about the processed information.

As a protocol of consumer premises communication network 11, Echonet Light (registered trademark) can be used. As a physical layer, Ethernet (registered trademark) can be used. Note that the protocol of consumer premises communication network 11 is not limited to Echonet Light, but other protocols or original protocols may be applicable. Similarly, a physical layer that is applicable is also not limited to Ethernet but may be a wireless network such as wireless smart utility network (Wi-SUN) or specified low power radio, a power line communications (PLC) network using electric-light wiring, an optical network, or the like.

Outside premises communication network 13 connects between HEMS 7 and CEMS 15. Transmission and reception of information between HEMS 7 and CEMS 15 will be described later. After checking the status of each device, HEMS 7 monitors the operation of each device. Specifically, HEMS 7 monitors the values measuring: the electric power consumed by each device; the electric power generated by solar cell 1; and the charge/discharge power of storage battery 3. Further, upon reception of a command from CEMS 15, HEMS 7 gives an instruction to each device according to the command. Further, HEMS 7 transmits various types of measurement values (power consumption amount and the like) and the status information to CEMS 15.

The following describes a specific operation principle of stabilization control for the system voltage in distribution system 14 (on the secondary side of pole-mounted transformer 9) by the power conversion device according to the present first embodiment.

When the amount of electric power generated by the distributed power supply such as solar cell 1 increases and the AC voltage (the AC effective voltage) in distribution system 14 that corresponds to an interconnection point with the consumer premises rises, reactive power is output from solar cell power conversion device 2, and thereby, a rise in AC voltage (AC effective voltage) can be suppressed. Thus, solar cell power conversion device 2 is configured to have a function of monitoring the AC effective voltage value of the AC voltage in consumer premises distribution system 10, and outputting reactive power when the AC effective voltage value rises.

Figure 16:
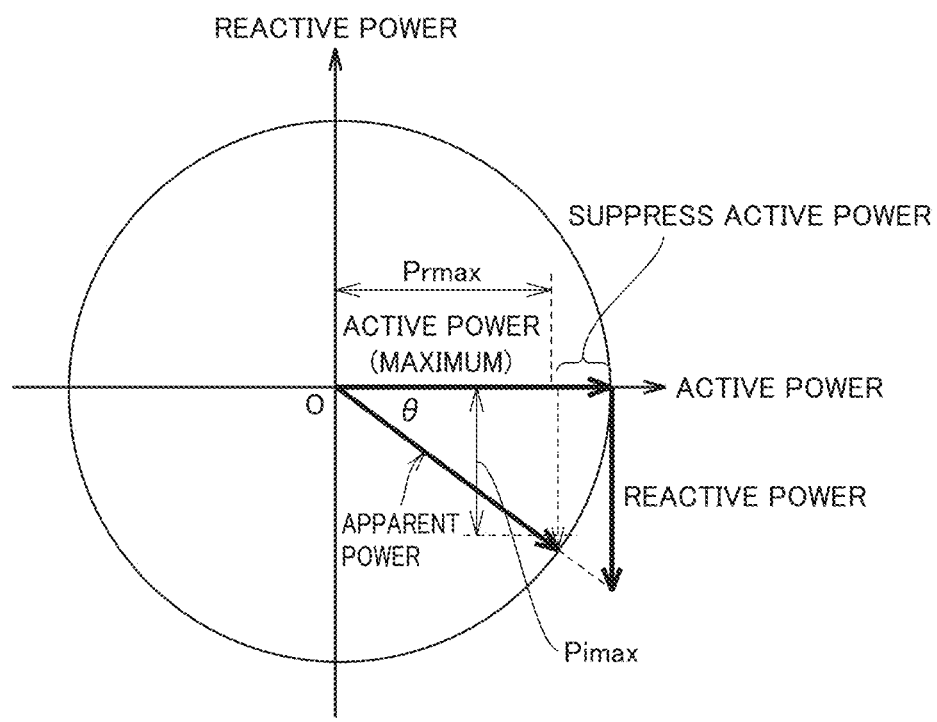
FIG. 16 is a diagram illustrating a principle of system voltage stabilization control for suppressing an increase in AC effective voltage value by output of reactive power.

FIG. 16 is a diagram illustrating a principle of system voltage stabilization control for suppressing an increase in AC effective voltage value by output of reactive power.

Referring to FIG. 16, the circle graph having an origin point O at its center has a horizontal axis representing active power (or an active current) and a vertical axis representing reactive power (or a reactive current). In general, the capacity (the maximum power or the maximum current that can be output) of solar cell power conversion device 2 connected to solar cell 1 is often equal to the maximum electric power generated by solar cell 1. For example, when solar cell 1 of 4 kW is installed, solar cell power conversion device 2 is also generally designed to have a capacity of 4 kW.

The circle graph shown in the figure represents the maximum electric power (equivalent to the radius of the circle graph) that can be output from solar cell power conversion device 2. In other words, solar cell power conversion device 2 can supply electric power in a range inside the circle graph to consumer premises distribution system 10.

The circle graph will be hereinafter further described. For example, when reactive power is zero, solar cell power conversion device 2 can output the maximum electric power generated by solar cell 1. The output power at this time is equivalent to the magnitude of the vector represented as active power (maximum) in the figure.

However, when reactive power is output for suppressing a rise of the system voltage in the state where solar cell 1 generates maximum electric power, the end point of the vector to which reactive power and active power are added is located on the outside of the circle graph as shown in the figure. Such electric power cannot be output from solar cell power conversion device 2.

Thus, when the reactive power is output, the reactive power needs to be added in the state where the output of active power is suppressed. The Grid-interconnection Code specifies that the power factor is 0.85 or more. Accordingly, θ in the figure represents a phase difference between the active power and the reactive power in which cos θ=0.85. Thus, the maximum value (Pimax) of the reactive power that can be output from solar cell power conversion device 2 is a product of the rated capacity of solar cell power conversion device 2 and sin θ. This is a cause of the limitation on the current command value by apparent current limiter circuits 2103 and 4103, and the limitation on the apparent power by sixth control circuit 2097 and eighth control circuit 4097, as will be described later in detail.

By suppressing the voltage rise in consumer premises distribution system 10 by system voltage stabilization control by solar cell power conversion device 2 and/or storage battery power conversion device 4, the voltage rise in distribution system 14 (on the secondary side of pole-mounted transformer 9) can be suppressed. In other words, the above-mentioned system voltage stabilization control can stabilize the voltage in each of consumer premises distribution system 10 and distribution system 14. In this way, the distributed power supply system disposed in each consumer house can eliminate the need to provide distribution system 14 with expensive distribution system stabilization facilities such as an SVC and a system storage battery, or can reduce the capacity of the distribution system stabilization facilities, and thereby, can suppress the voltage rise in distribution system 14, so that the cost can be reduced.

Further, in the present first embodiment, system voltage stabilization control targeting the AC voltage in consumer premises distribution system 10 is described, but if measurable, any AC voltage in other parts, for example, the AC voltage on the input side of smart meter 8 or directly below pole-mounted transformer 9 can also be targeted for system voltage stabilization control.

In the present first embodiment, a dead zone described below is set as a condition for starting the above-described system stabilization control. In the present first embodiment, solar cell power conversion device 2 and storage battery power conversion device 4 operate without directly exchanging information with each other through a communication line. Thus, HEMS 7 processes the dead zone width information received from CEMS 15, and notifies solar cell power conversion device 2 and storage battery power conversion device 4 about the processed information.

Figure 17:
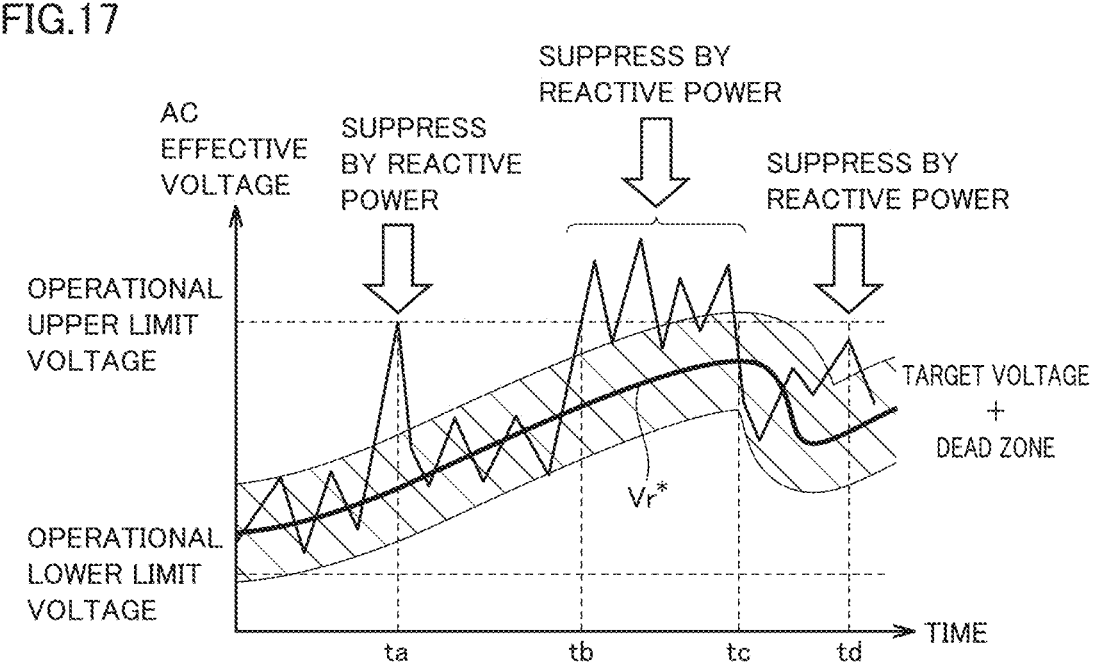
FIG. 17 is a diagram illustrating an operation image of system voltage stabilization control utilizing a distributed power supply.

FIG. 17 is a diagram illustrating an operation image of system voltage stabilization control utilizing a distributed power supply. In the present first embodiment, for dealing with an abrupt change in the electric power generated by an energy creation device such as solar cell 1, the power conversion device in the distributed power supply installed in each consumer house is utilized to stabilize the system voltage, and the voltage fluctuation in a long cycle is addressed by tap changing in SVR 23 installed in distribution system 24 (on the primary side of pole-mounted transformer 9). In FIG. 17, the horizontal axis represents the time axis, and the vertical axis represents the AC effective voltage in consumer premises distribution system 10.

Referring to FIG. 17, a thick solid line represents a voltage control target value Vr* for the AC effective voltage in consumer premises distribution system 10 that is generated by each of voltage control target value generation circuits 2099 and 4099. As described with reference to FIG. 10, voltage control target value Vr* is set in accordance with the moving average value of the AC effective voltage for one minute in consumer premises distribution system 10 that is calculated by effective voltage calculation circuits 2098 and 4098. The method of setting voltage control target value Vr* is not limited thereto, but voltage control target value Vr* may be generated, for example, from a value obtained by removing a high frequency component of the AC effective voltage through the LPF. On the other hand, a thin solid line represents the AC effective voltage (instantaneous value) in consumer premises distribution system 10, and this AC effective voltage changes sequentially in a shape of a line graph in accordance with a change in amount of solar radiation.

The diagonally shaded region shows the voltage range in the dead zone width centering on voltage control target value Vr* of the AC effective voltage. When an abrupt change in solar radiation causes the AC effective voltage in consumer premises distribution system 10 to steeply change and thereby deviate from the voltage range of the dead zone width, system voltage stabilization control is performed for suppressing the AC effective voltage in consumer premises distribution system 10 to fall within the range of the dead zone width by control of the active power and the reactive power that are output from the power conversion device (solar cell power conversion device 2 and/or storage battery power conversion device 4).

When the system voltage stabilization control performed by the power conversion device cannot sufficiently suppress the voltage rise or fall, tap changing in SVR 23 is performed as the AC voltage of the distribution system voltage (distribution system 24) deviates from the operational voltage range of SVR 23 (between the operational upper limit voltage and the operational lower limit voltage). Thereby, the distribution system voltage can be stabilized. In the example shown in the figure, at time tc, tap changing in SVR 23 is performed for suppressing an increase in distribution system voltage. At this timing, the AC effective voltage in consumer premises distribution system 10 also decreases.

In this way, the combination of the system voltage stabilization control by the power conversion device and the tap changing in SVR 23 allows stabilization of the system voltage by tap changing in SVR 23, and also, the power conversion device on the consumer side outputs reactive power for addressing the change in system effective voltage caused by an abrupt change in electric power generated by solar cell 1 due to an abrupt change in solar radiation or caused by an abrupt change in electric power consumed by the load in a consumer house. Thereby, the AC voltages in distribution system 24 and consumer premises distribution system 10 can be stabilized in the state where the number of times of operation (tap changing) in SVR 23 is suppressed, as compared with the case where the system voltage is stabilized only by tap changing in SVR 23.

Then, a specific operation image will be hereinafter described. The dead zone width information given from CEMS 15 to solar cell power conversion device 2 and storage battery power conversion device 4 installed in each consumer house is received once by HEMS 7, and thereafter, partially processed in the present first embodiment, and then delivered as a notification to solar cell power conversion device 2 and storage battery power conversion device 4. The details will be described later.

Upon reception of the dead zone width information from HEMS 7, each of solar cell power conversion device 2 and storage battery power conversion device 4 calculates the upper limit voltage value and the lower limit voltage value of the dead zone width (the diagonally shaded region in FIG. 17) that is not subjected to system voltage stabilization control, based on the voltage control target values output from voltage control target value generation circuits 2099 and 4099 and the received dead zone width information.

Then, it is determined whether the AC effective voltage in consumer premises distribution system 10 falls within the range of the calculated dead zone or not. When it is determined that the AC effective voltage does not fall within the range, the system voltage stabilization control is started. A specific process flow will be described later.

Figure 18:
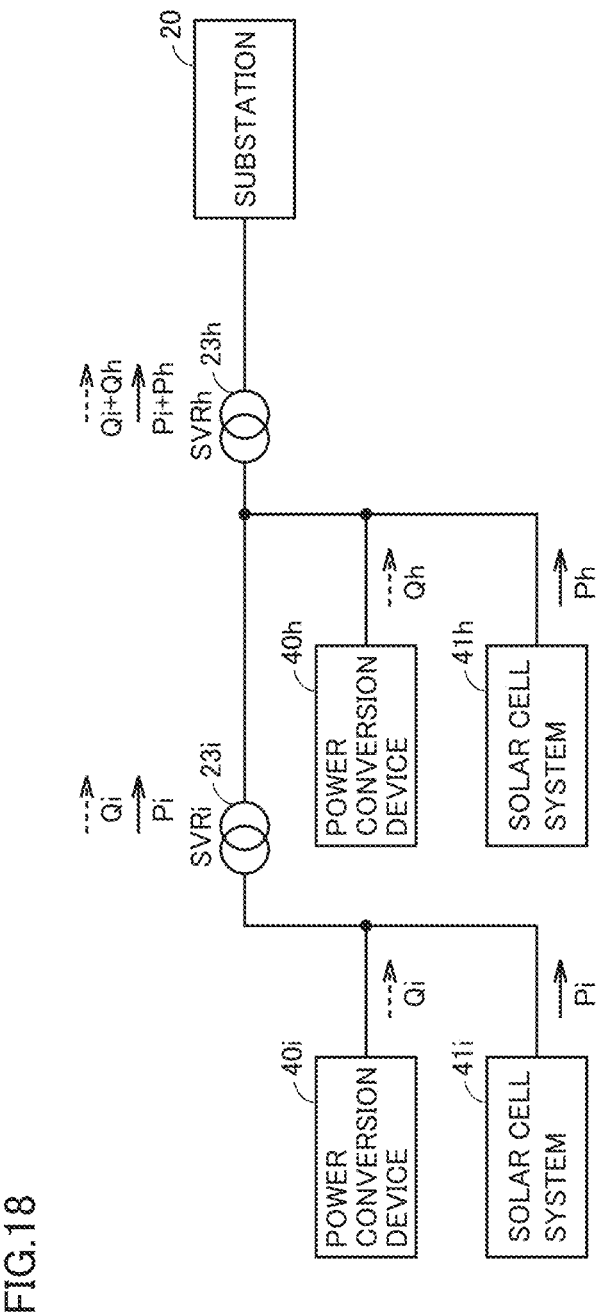
FIG. 18 is a block diagram showing a configuration example of a distribution system facility and a distributed power supply.
Figure 19:
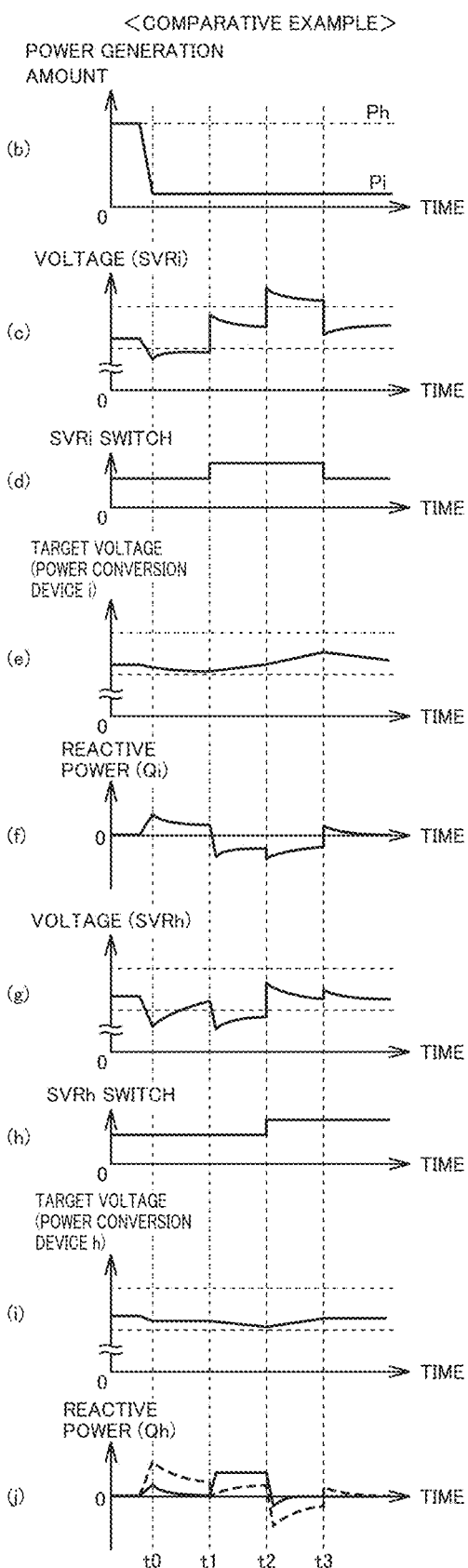
FIG. 19 is a timing chart showing operations of a distributed power supply and a distribution system facility in a comparative example in the configuration shown in FIG. 18.
Figure 20:
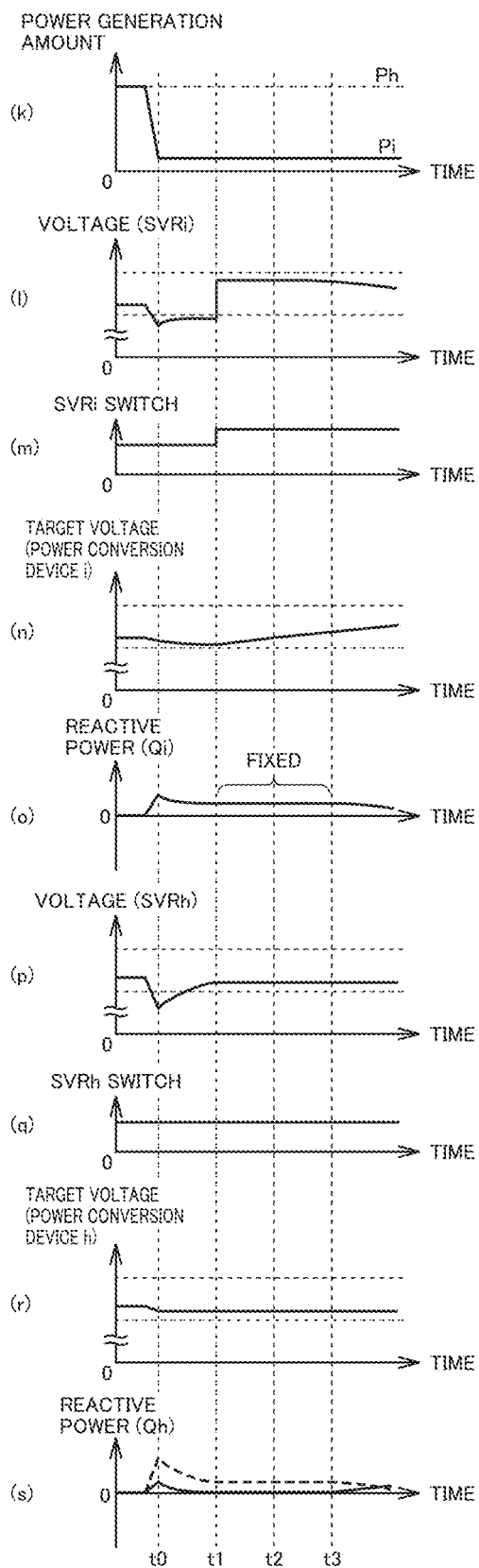
FIG. 20 is a timing chart showing operations of the distributed power supply and the distribution system facility in the first embodiment in the configuration shown in FIG. 18.

The following describes the outline of the operation of the power conversion device according to the present first embodiment with reference to FIGS. 18 to 20.

FIG. 18 is a block diagram showing a configuration example of the distribution system facility and the distributed power supply. In the following description with reference to FIG. 18, in order to explain the outline of the operation in a comprehensible manner, SVR 23 is formed in two stages of an SVR 23h and an SVR 23i, and distributed power supplies are collectively provided in power conversion devices 40h and 40i and solar cell systems 41h and 41i and connected to the distribution system. Further, solar cell systems 41h and 41i output active power Ph and active power Pi, respectively, and power conversion devices 40h and 40i output reactive power Qh and reactive power Qi, respectively.

FIG. 19 is a timing chart showing operations of a distributed power supply and a distribution system facility in a comparative example in the configuration shown in FIG. 18. FIG. 19 shows the operation performed when a conventional power conversion device is used as a comparative example. In this FIG. 19 and the subsequently mentioned FIG. 20, SVRi and SVRh indicate SVR 23i and SVR 23h, respectively, and power conversion devices i and h indicate power conversion devices 40i and 40h, respectively.

In FIG. 19, the horizontal axis indicates time. The solid line in (b) indicates generated electric power Pi of the solar cell that is output from solar cell system 41i, the broken line in (b) indicates generated electric power Ph of the solar cell that is output from solar cell system 41h, (c) indicates a system voltage on the secondary side of SVR 23i, (d) indicates a tap position in SVR 23i, (e) indicates a target voltage of power conversion device 40i that outputs reactive power Qi, and (f) indicates reactive power Qi output from power conversion device 40i. Further, (g) indicates a system voltage on the secondary side of SVR 23h, (h) indicates a tap position in SVR 23h, (i) indicates a target voltage of power conversion device 40h that outputs reactive power Qh, the solid line in (j) indicates reactive power Qh output from power conversion device 40h, and the broken line in (j) indicates reactive power (Qi+Qh) flowing through SVR 23h. Although the reactive power flowing through SVR 23h is actually not a simple sum of reactive power Qi and reactive power Qh, the reactive power flowing through SVR 23h is herein assumed to be a sum of reactive power Qi and reactive power Qh for the sake of simplicity of explanation.

Referring to FIG. 19, when generated electric power Pi of solar cell system 41i decreases shortly before time t0, the system voltages on the secondary sides of SVR 23i and SVR 23h decrease ((c) and (g)). When the system voltage decreases below the lower limit of the dead zone (FIG. 17), power conversion devices 40i and 40h start to output reactive power Qi and reactive power Qh, respectively ((f) and (j)). The target voltages for power conversion devices 40i and 40h are calculated based on the moving average of the effective voltage, and therefore, gradually change ((e) and (i)).

Since the system voltage on the secondary side of SVR 23i does not fall within the operational voltage range (FIG. 17) at time t1 (see (c)), the tap position in SVR 23i changes (see (d)). Also, since the system voltage on the secondary side of SVR 23h falls within the operational voltage range before time t1 (see (g)), the tap position in SVR 23h does not change at time t1 (see (h)). Since SVR 23h is disposed closer to substation 20 than SVR 23i, the system voltage on the secondary side of SVR 23h is not influenced by tap changing in SVR 23i, but influenced by the power flow change (active power and reactive power).

When the tap position in SVR 23i changes, the system voltage on the secondary side of SVR 23i falls within the operational voltage range (see (c)). However, since the target voltage of power conversion device 40i gradually changes, the target voltage after the tap changing is still low, and the system voltage on the secondary side of SVR 23i is above the upper limit of the dead zone. Accordingly, power conversion device 40i controls reactive power Qi to raise the system voltage until before the tap changing in SVR 23i, but starts to control reactive power Qi to lower the system voltage (see (f)) by tap changing.

On the other hand, in SVR 23h, reactive power Qi output from power conversion device 40i changes from the direction in which the system voltage raises to the direction in which the system voltage decreases. Thus, under the influence of such a change, the system voltage on the secondary side decreases (see (g)). In response to the voltage decrease on the secondary side of SVR 23h, power conversion device 40h increases the output of reactive power Qh in order to raise the system voltage (see (j)).

Even though power conversion device 40h outputs maximum reactive power Qh that can be output in order to raise the system voltage, power conversion device 40i outputs reactive power Qi in the direction in which the system voltage decreases. Thereby, the voltage decrease on the secondary side of SVR 23h cannot be sufficiently eliminated (see time t1 to time t2 in (g)). Also, the system voltage on the secondary side of SVR 23h falls below the lower limit of the operational voltage at time t2, and thus, the tap position in SVR 23h changes (see (h)), with the result that the system voltage on the secondary side of SVR 23h rises.

Since the system voltage on the secondary side of SVR 23h rises due to the changing in SVR 23h, the system voltage on the secondary side of SVR 23i installed downstream of SVR 23h with respect to substation 20 also rises at time t2 (see (c)). Under the influence of such a change, power conversion device 40i starts to control the reactive power to lower the system voltage. However, since the system voltage on the secondary side of SVR 23$i$ does not fall within the operational voltage range of SVR 23$i$ at time t3 (see (c)), the tap position in SVR 23$i$ changes again (see (d)). In other words, the tap position in SVR 23$i$ returns to the state before time t1. SVR 23$h$ is slightly influenced by the power flow change, but the system voltage on the secondary side of SVR 23$h$ falls within the operational voltage range of SVR 23$h$, and thus, no further tap changing occurs.

As described above, in the comparative example, under the influence of the tap changing in SVR 23$i$ on the downstream side, the tap changing in SVR 23$h$ occurs, and under the influence thereof, the tap changing in SVR 23$i$ occurs again. In SVR 23, tap changing mechanically occurs, but unnecessary tap changing unnecessarily shortens the lifetime of SVR 23. Thus, it is necessary to avoid controlling the once-changed tap in SVR 23 to return to its original tap position again in a short time period as described above.

FIG. 20 is a timing chart showing operations of the distributed power supply and the distribution system facility in the first embodiment in the configuration shown in FIG. 18. Also, (k) to (s) in FIG. 20 respectively correspond to (b) to (j) in FIG. 19.

Referring to FIG. 20, also in the present example, shortly before time t0, generated electric power Pi of solar cell system 41$i$ decreases, and the system voltages on the secondary sides of SVR 23$i$ and SVR 23$h$ decrease. Since the system voltage on the secondary side of SVR 23$i$ does not fall within the operational voltage range of SVR 23$i$ at time t1 (see (l)), the tap position in SVR 23$i$ changes (see (m)). When the tap position in SVR 23$i$ changes, the system voltage on the secondary side of SVR 23$i$ rises (see (l)). At this time, the system voltage on the secondary side of SVR 23$h$ is hardly influenced by the tap changing in SVR 23$i$ (see (p)). In fact, the power flow (active power and reactive power) changes due to the tap changing in SVR 23$i$, but is less influenced thereby if other conditions are the same.

In the present first embodiment, power conversion device 40 (40$i$, 40$h$) monitors a voltage change in the distribution system. Then, power conversion device 40 determines whether the voltage change in the distribution system is caused by a change in the electric power generated by a load and an energy creation device, or caused by tap changing in SVR 23. When power conversion device 40 determines that the voltage change in the distribution system is caused by tap changing in SVR 23, power conversion device 40 operates to maintain, for a prescribed time period, the reactive power output immediately before or immediately after the distribution system voltage changes (before the reactive power significantly changes).

In the present example, it is determined that the voltage change in the distribution system is caused by the tap changing in SVR 23$i$, and thus, the output of reactive power Qi is maintained (fixed) by power conversion device 40$i$ during the time period from time t1 to time t3. Thereby, the system voltage on the secondary side of SVR 23$h$ can be controlled to fall within an appropriate range (the operational voltage range of SVR 23$h$) by reactive power control (see (s)) by power conversion device 40$h$ (see (p)).

In the present first embodiment, tap changing in SVR 23 occurs when the system voltage on the secondary side of SVR 23 exceeds the operational voltage range for a prescribed time period (this prescribed time period will be hereinafter also referred to as a "dead zone time"). In the present example, the time period (time t1 to time t3) during which the output of reactive power Qi is maintained is approximately twice as long as the dead zone time. The time period during which the output of reactive power Qi is maintained is not limited thereto, but for example may be a moving average time (for example, one minute, which is determined by a time constant) adopted when voltage control target value generation circuit 2099 generates a voltage control target value, or may be the above-mentioned dead zone time, or may be a time period longer than twice as long as the dead zone time. Note that DSO 21 may notify each distributed power supply about this time period so as to be set.

By performing the reactive power control of power conversion device 40$i$ as described above, the voltage control target value of power conversion device 40$i$ rises (see (n)). After the system voltage control by reactive power is restarted (at and after time t3), the voltage control target value rises and the distribution system voltage decreases near the dead zone voltage range in which power conversion device 40$i$ does not perform reactive power control. Therefore, reactive power Qi gradually decreases (see (o)). The distribution system voltage on the secondary side of SVR 23$h$ is maintained under little influence of the tap changing in SVR 23$i$ (see (p)), no tap changing in SVR 23$h$ occurs (see (q)), and the control is stably continued also at and after time t3.

Controlling power conversion device 40$i$ as described above can suppress the influence of the tap changing in SVR 23$i$ upon other SVR 23$h$, and also can suppress occurrence of unnecessary tap changing in SVR 23$h$.

<Description of Operation Sequence>

Figure 21:
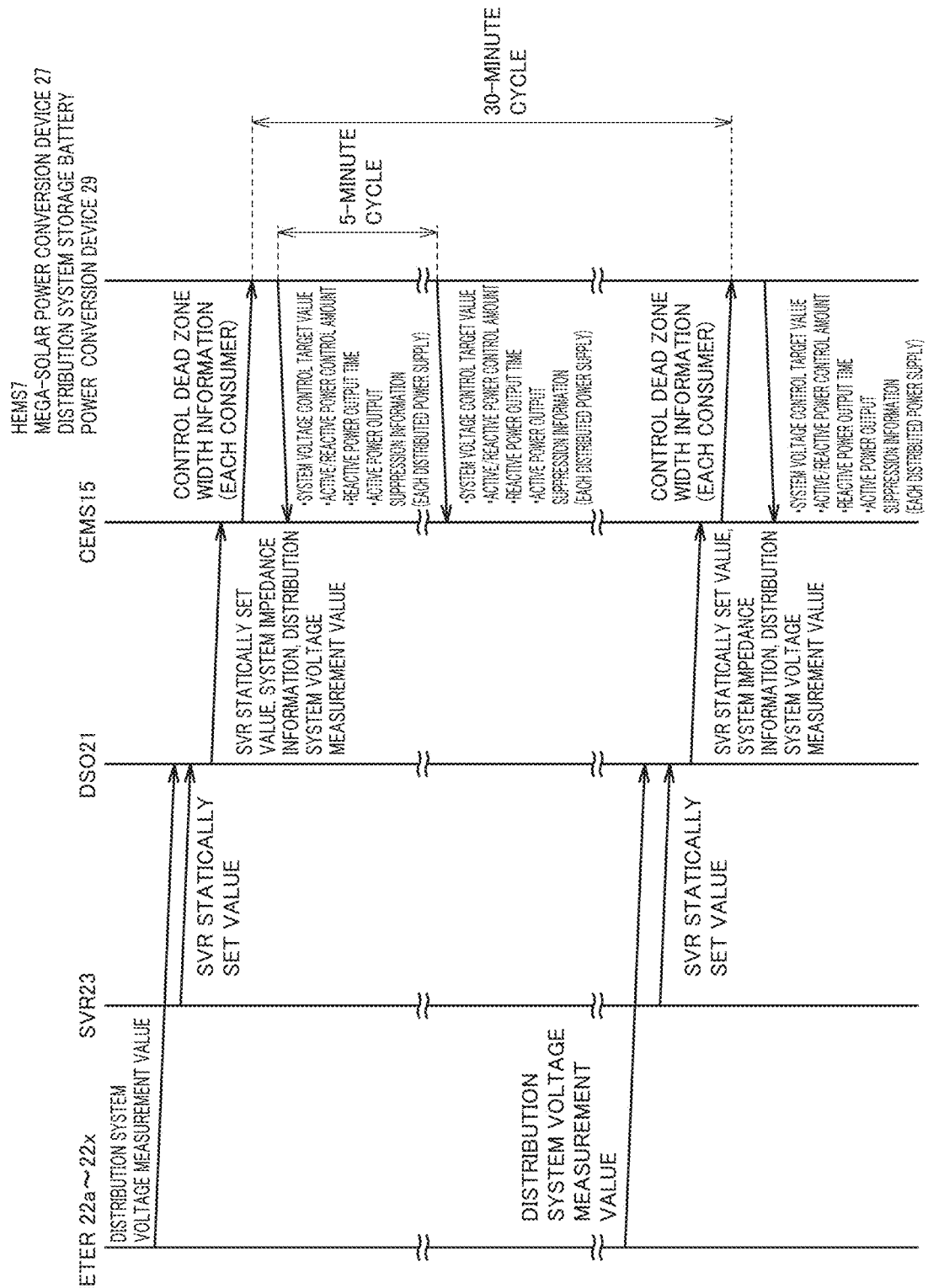
FIG. 21 is an operation sequence diagram between various devices related to system voltage stabilization control in the first embodiment.

FIG. 21 is an operation sequence diagram between various devices related to system voltage stabilization control in the first embodiment. Referring to FIG. 21, the following describes the process flow of generation and notification of the dead zone width information for system voltage stabilization control by DSO 21, CEMS 15, and HEMS 7.

Referring to FIG. 21, the measurement results (AC effective voltage) obtained by voltmeters 22$a$ to 22$x$ (FIG. 1) disposed in distribution system 24 are collected by DSO 21, for example, in a 30-minute cycle. Also, DSO 21 is notified, for example, in a 30-minute cycle about the statically set value of SVR 23 (the winding ratio information about the transformer that is currently used). Further, the distribution system impedance information and the information about voltmeter 22 installed in the distribution system are collected once by DSO 21 and then given to CEMS 15. Note that the notification cycle is not limited to 30 minutes, but can be set in any time length. Further, different notification cycles may be set between the information related to voltmeter 22 and the information related to SVR 23. The notification about the information related to SVR 23 is not necessarily given in a certain cycle, but may be given for each execution of the above-mentioned tap changing.

DSO 21 notifies CEMS 15 in a 30-minute cycle about the voltage measurement result obtained by voltmeter 22, the statically set value information of SVR 23, and additionally, the impedance information about the distribution system that is possessed by this DSO 21. On the other hand, CEMS 15 calculates the dead zone width information for each consumer based on: the above-mentioned information transmitted from DSO 21; the system voltage control target value measured in each consumer and transmitted in a 5-minute cycle (specifically, the moving average value of the AC effective voltage value for 1 minute in the distribution system in the present first embodiment); the active and reactive power control amounts of each distributed power supply installed in a consumer (including active power and reactive power); the reactive power output time; and the active power output suppression information (this information is collected by HEMS 7 in a 5-minute cycle from solar cell power conversion device 2, storage battery power conversion device 4, and power measurement circuit 61). Although the details of the method of calculating a dead zone width will not be described, this dead zone width can be calculated by creating any calculation formula or any calculation table in advance. The dead zone width information about each consumer calculated by CEMS 15 is given in a 30-minute cycle to HEMS 7 installed in each consumer house 18.

Further, CEMS 15 calculates the dead zone width information also about mega-solar power conversion device 27 and distribution system storage battery power conversion device 29 based on the system voltage control target values collected in a 5-minute cycle, the active and reactive power control amounts (including active power and reactive power), the reactive power output time, the active power output suppression information, and various types of information given from DSO 21. Then, CEMS 15 gives a notification about the calculated information in a 30-minute cycle.

Referring to FIGS. 1 to 28, the operation of the power conversion device according to the present first embodiment will be described focusing on solar cell power conversion device 2 and storage battery power conversion device 4.

Figure 22:
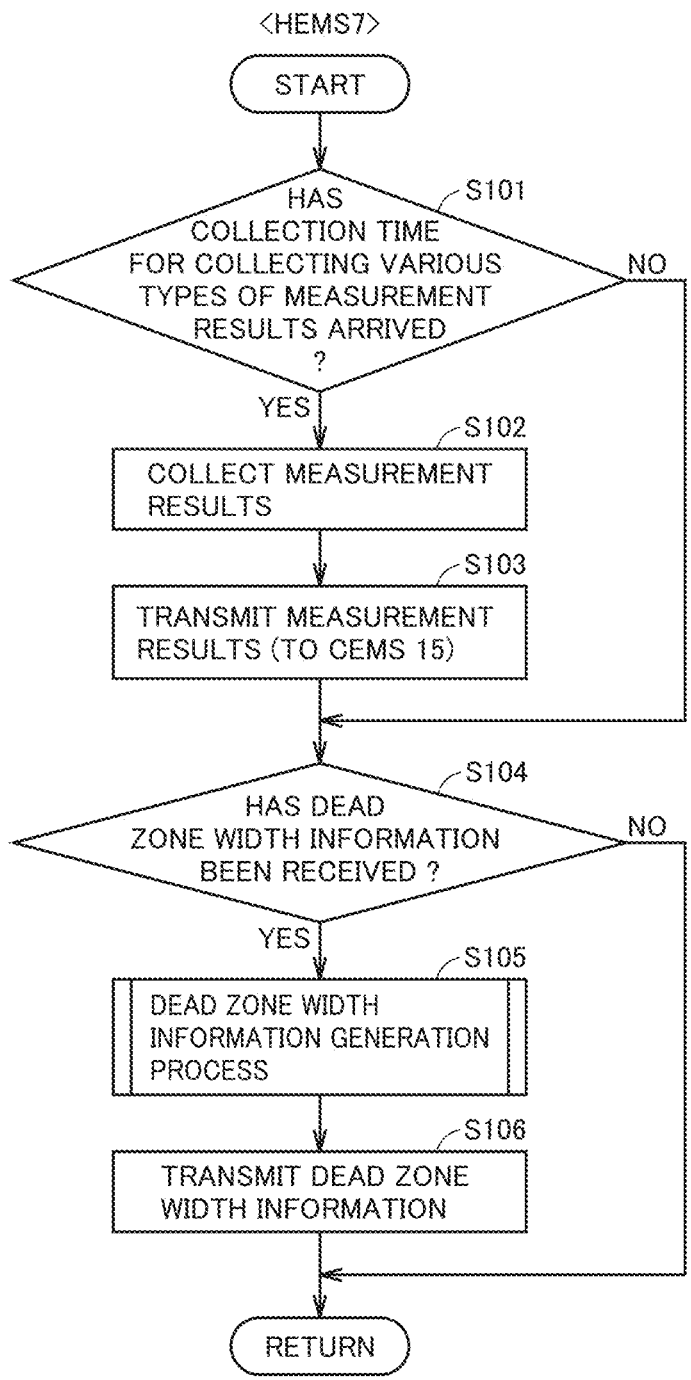
FIG. 22 is a flowchart illustrating a control process of an HEMS related to system voltage stabilization control.

FIG. 22 is a flowchart illustrating a control process of HEMS 7 related to system voltage stabilization control. A series of processes shown in this flowchart is repeatedly performed in a constant cycle.

Referring to FIG. 22, HEMS 7 checks in step (hereinafter also simply abbreviated as "S") 101 whether the collection time for collecting various types of measurement results (performed in a 5-minute cycle) has arrived or not. When the collection time has arrived (YES in S101), HEMS 7 collects various types of measurement results (S102). Specifically, the results collected from solar cell power conversion device 2 and storage battery power conversion device 4 include: the voltage control target value (target voltage) generated by voltage control target value generation circuit 2099 (4099); the output time of the reactive power measured by reactive power output time measurement circuit 20934 in reactive current waveform generation circuit 2093 (4093); and the reactive power control amount generated based on the reactive current amplitude information output from reactive current control circuit 2092 (4092). Further, the results collected from power measurement circuit 61 in power switchboard 6 include: the amount of electric power consumed by the load and measured by power measurement circuit 61; the amount of electric power generated by solar cell 1; and the amount of charge/discharge power for storage battery 3 (5 minutes).

When collection of various types of data completes, HEMS 7 notifies CEMS 15 through outside premises communication network 13 about the collected measurement results (S103). When the notification to CEMS 15 completes in S103, or when it is determined in S101 that the collection time for collecting various types of measurement results has not arrived, HEMS 7 checks whether a notification about new dead zone information has been given or not from CEMS 15 (S104).

When no notification about the dead zone information has been given (NO in S104), the subsequent steps are not performed but the process is shifted to return. On the other hand, when a notification about the dead zone information has been given (YES in S104), HEMS 7 performs a process of generating dead zone width information (S105), and transmits the generated dead zone width information to solar cell power conversion device 2 and storage battery power conversion device 4 (S106).

Figure 23:
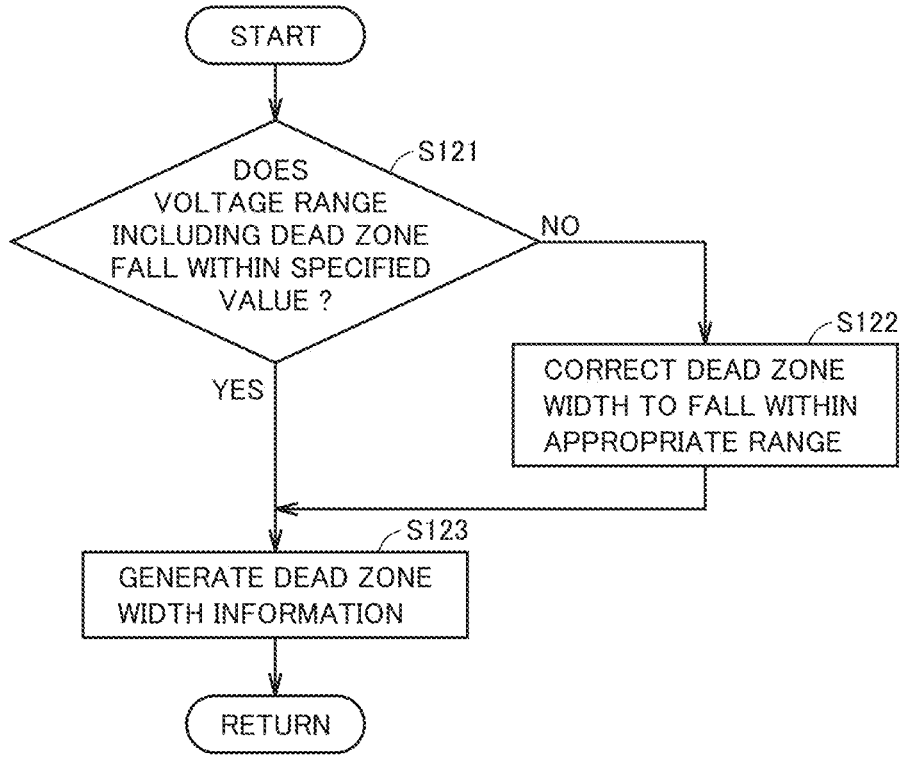
FIG. 23 is a flowchart illustrating details of a dead zone width information generation process performed in S105 in FIG. 22.

FIG. 23 is a flowchart illustrating details of a dead zone width information generation process performed in S105 in FIG. 22.

Referring to FIG. 23, HEMS 7 checks whether the voltage range of the dead zone width is appropriate or not (S121). In the present first embodiment, as described with reference to FIG. 17, the voltage control target value in consumer premises distribution system 10 is set in accordance with the moving average value of the AC effective voltage for 1 minute in consumer premises distribution system 10, and therefore, changes as time passes. Thus, when the voltage control target value is close to the upper and lower limit specified values of the system voltage in consumer premises distribution system 10, the dead zone width needs to be corrected.

Figure 24:
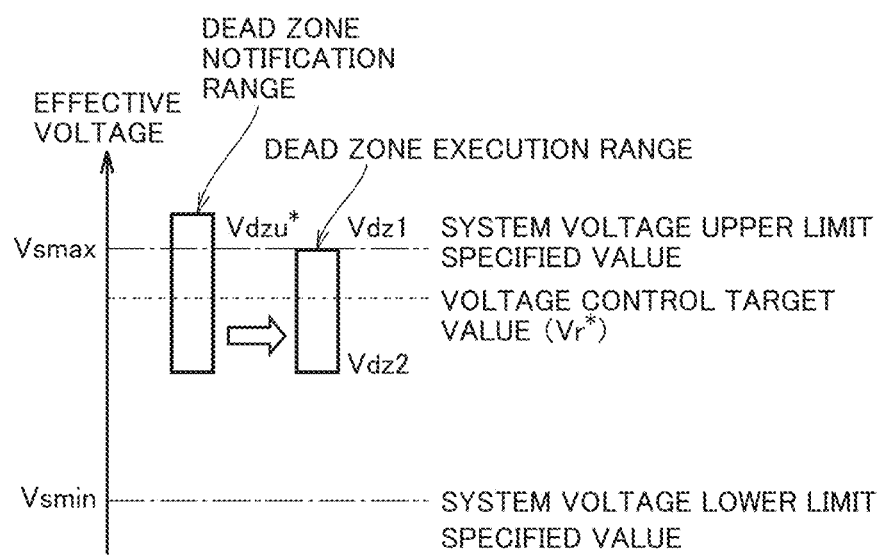
FIG. 24 is a conceptual diagram illustrating correction of a dead zone width.

FIG. 24 is a conceptual diagram illustrating correction of the dead zone width. The vertical axis in FIG. 24 shows the AC effective voltage in consumer premises distribution system 10. Referring to FIG. 24, for the AC effective voltage in consumer premises distribution system 10, a system voltage upper limit specified value Vsmax and a system voltage lower limit specified value Vsmin are set. Thus, an upper limit voltage Vdz1 and a lower limit voltage Vdz2 in the dead zone also need to be set to fall within a range of Vsmin≤Vdz2<Vdz1≤Vsmax.

CEMS 15 gives a notification about, as the dead zone width information, the voltage difference between upper limit voltage Vdz1 and lower limit voltage Vdz2 in the dead zone with respect to the voltage control target value. Based on the voltage control target value and the above-mentioned voltage difference given from CEMS 15, HEMS 7 calculates the upper limit voltage and the lower limit voltage in the actual dead zone. Then, HEMS 7 checks whether the calculation result falls between system voltage upper limit specified value Vsmax and system voltage lower limit specified value Vsmin of the AC effective voltage in consumer premises distribution system 10 (S121 in FIG. 23).

Referring to FIG. 23 together with FIG. 24, when the above-mentioned calculation result does not fall within the range of the specified value (NO in S121), HEMS 7 corrects the dead zone width so as to clip the deviating voltage at system voltage upper limit specified value Vsmax or system voltage lower limit specified value Vsmin (S122).

When the range of the dead zone calculated from the voltage control target value and the above-mentioned voltage difference given from CEMS 15 falls within the range of system voltage upper and lower limit specified values Vsmax and Vsmin (YES in S121), HEMS 7 generates dead zone width information from the voltage difference given from CEMS 15 and the voltage control target value. When the dead zone width is corrected in S122, HEMS 7 generates dead zone width information from the corrected dead zone width and the voltage control target value (S123).

<Description of Control Process for Solar Cell Power Conversion Device 2>

Then, the specific operation of solar cell power conversion device 2 will be described. Referring again to FIGS. 2 and 3, when power generation by solar cell 1 is started, solar cell power conversion device 2 is started for supplying the DC power generated by solar cell 1 to consumer premises distribution system 10. Specifically, in the present first embodiment, solar cell power conversion device 2 is started when the DC voltage output from solar cell 1 becomes equal to or greater than a prescribed determination value.

Referring again to FIGS. 4 to 6, when solar cell power conversion device 2 is started, fifth control circuit 2044 in first control circuit 204 normally instructs MPPT control circuit 2041 to start MPPT control so as to maximize the output power from solar cell 1. Further, fifth control circuit 2044 outputs a control signal to switching circuit 2043 so as to select the output from MPPT control circuit 2041.

On the other hand, sixth control circuit 2097 in second control circuit 209 causes active current control circuit 2094 to calculate the amplitude of the active current and causes active current waveform generation circuit 2095 to generate a current command value such that the DC voltage on DC bus 205 output from voltmeter 206 becomes constant.

Figure 25:
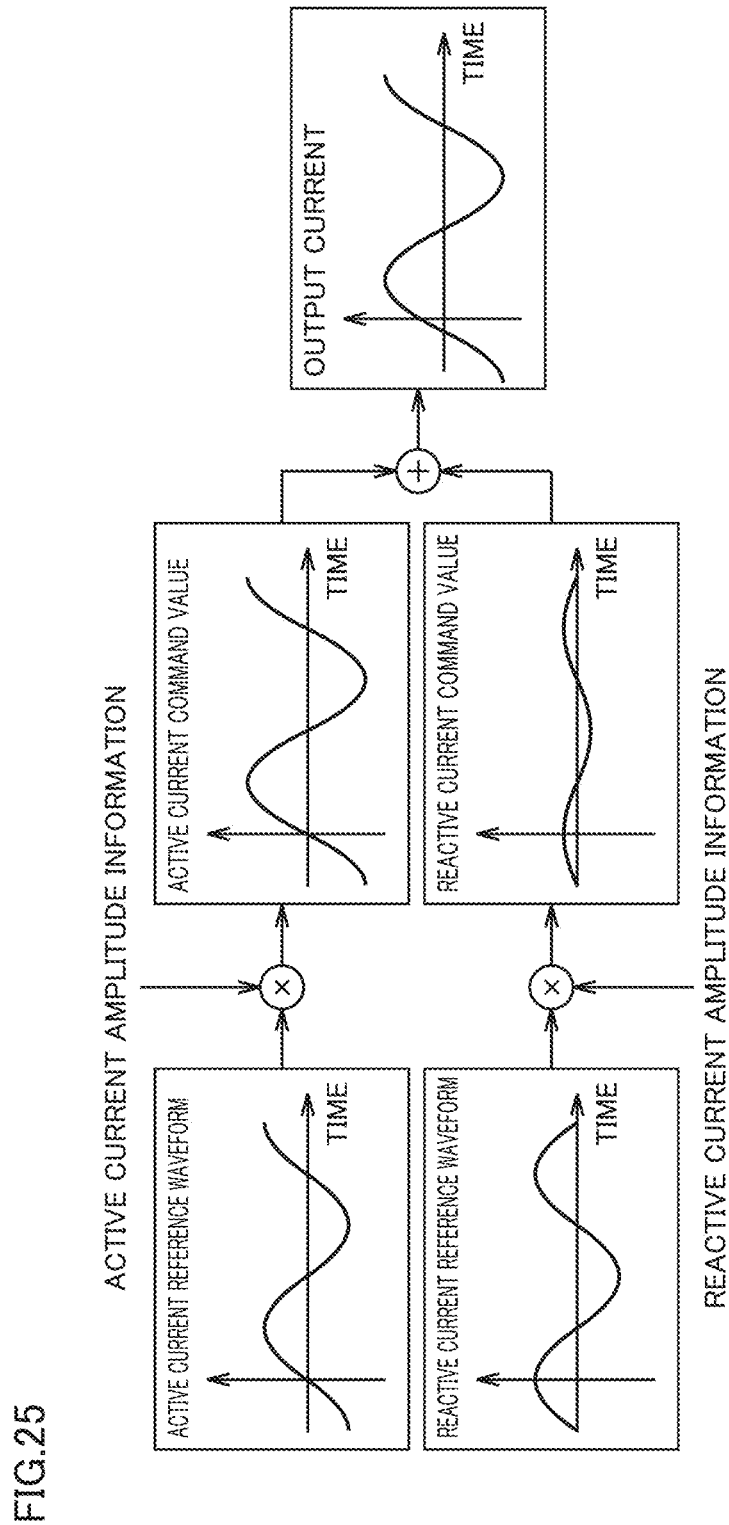
FIG. 25 is a conceptual diagram illustrating generation of a current command value for controlling an active current and a reactive current.

FIG. 25 is a conceptual diagram illustrating generation of a current command value for controlling the active current and the reactive current. Referring to FIG. 6 together with FIG. 25, active current waveform generation circuit 2095 generates an active current reference waveform based on the zero-cross point information about the AC voltage detected in phase detection circuit 2091. The active current reference waveform is a sinusoidal wave having the same frequency and the same phase as those of the AC voltage. The active current reference waveform is multiplied by the active current amplitude information output from active current control circuit 2094, to thereby generate an active current command value.

Similarly, reactive current waveform generation circuit 2093 generates a reactive current reference waveform based on the zero-cross point information about the AC voltage detected in phase detection circuit 2091. The reactive current reference waveform is a cosine wave that is different in phase by ($\pi/2$) from the active current reference waveform. The reactive current reference waveform is multiplied by the reactive current amplitude information output from reactive current control circuit 2092 to thereby generate a reactive current command value.

These calculated active current command value and reactive current command value are added by adder 2096, and thereby an output current command value is generated in accordance with composition of trigonometric functions and then input into apparent current limiter circuit 2103. Apparent current limiter circuit 2103 performs a limiter process for the current command value so as to prevent the output current from exceeding the rated current of first DC/AC conversion circuit 208. The output from apparent current limiter circuit 2103 is input into sixth control circuit 2097.

Based on the received output current command value, sixth control circuit 2097 calculates apparent power to be output from first DC/AC conversion circuit 208. When the calculated apparent power exceeds rated power of first DC/AC conversion circuit 208, the output current command value is processed so as to fall within the rated power. The output current command value set in this way is input into first DC/AC conversion circuit 208.

Figure 26:
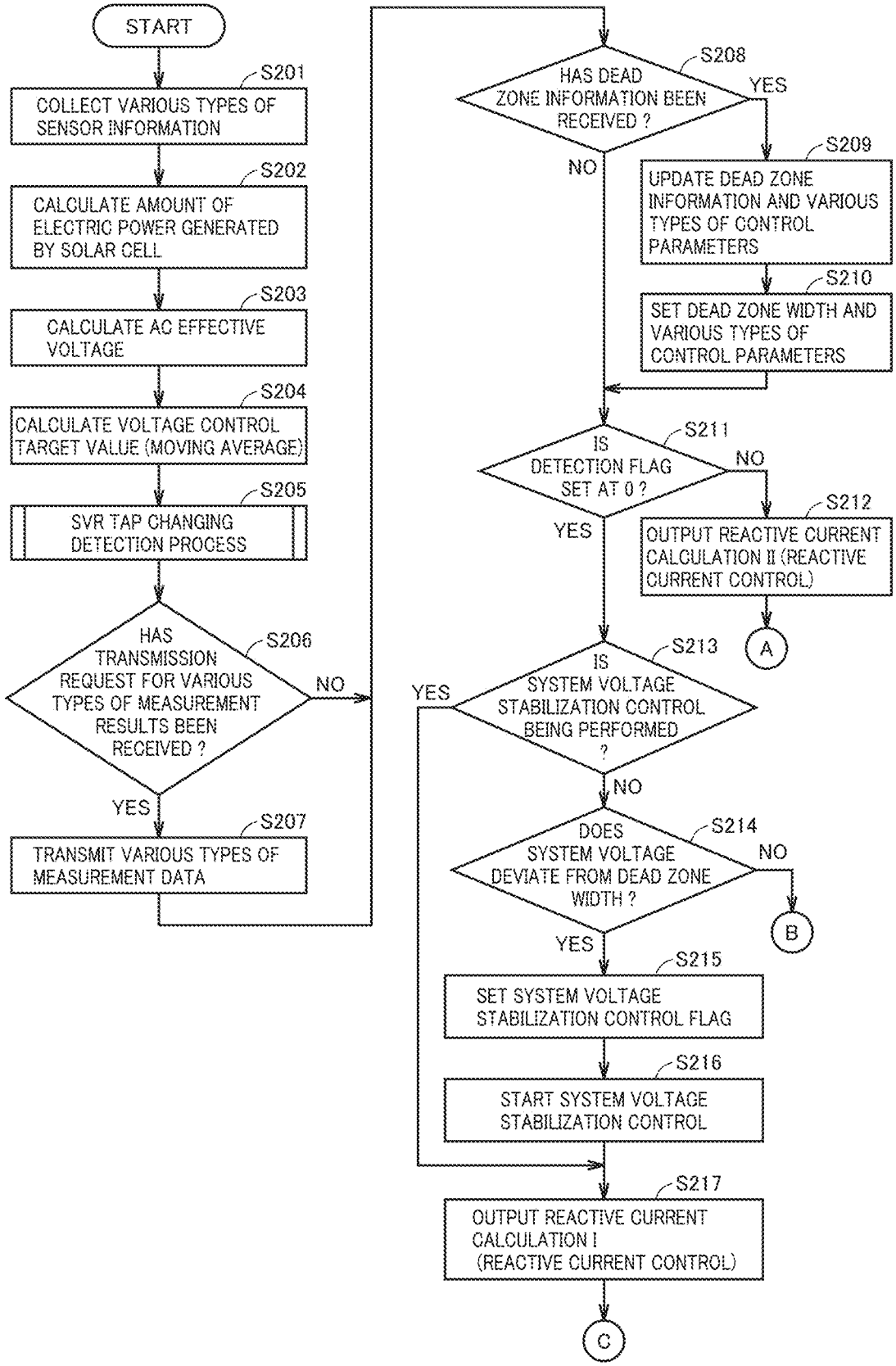
FIG. 26 is a first flowchart illustrating a control process of the solar cell power conversion device according to the first embodiment.
Figure 27:
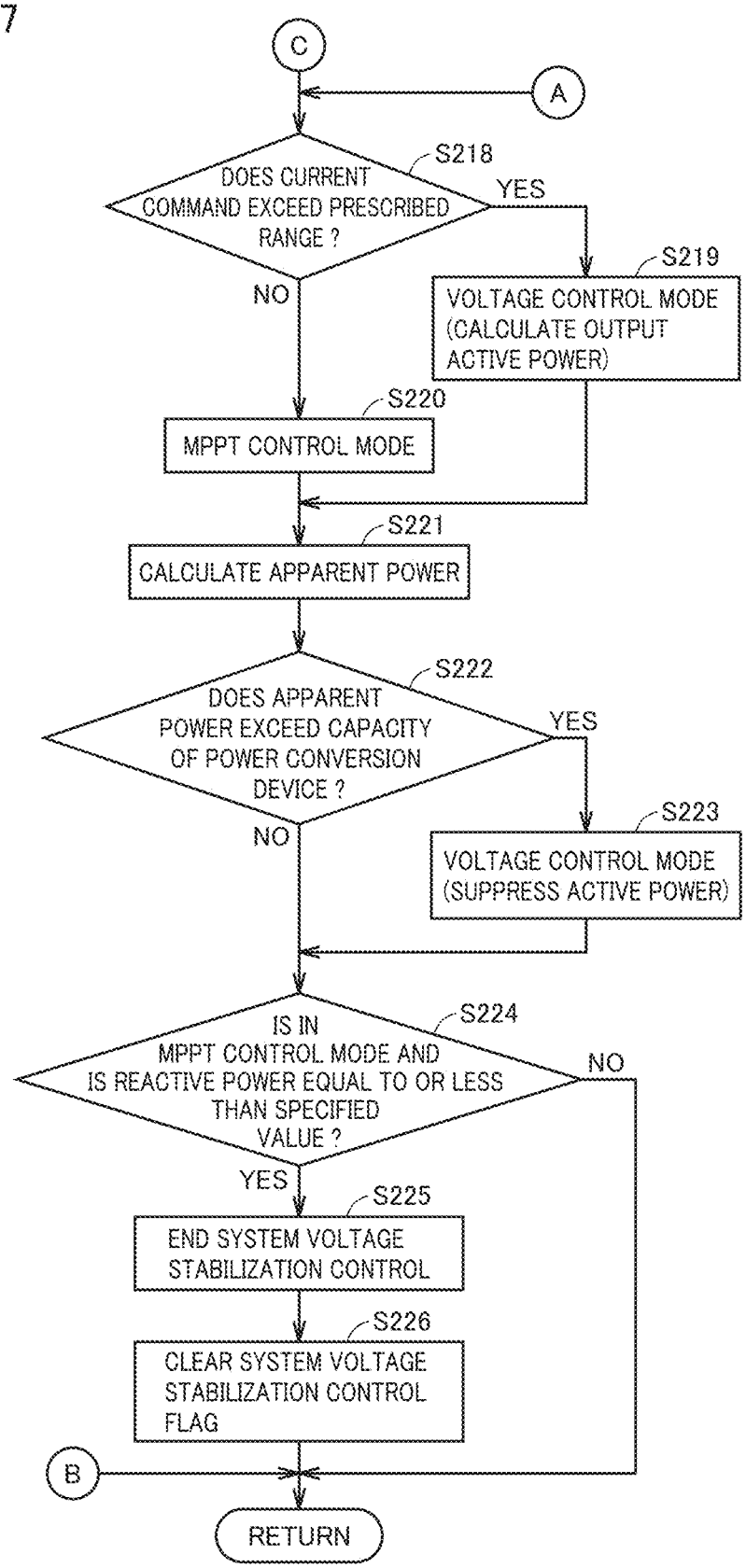
FIG. 27 is a second flowchart illustrating a control process of the solar cell power conversion device according to the first embodiment.

FIGS. 26 and 27 each show a flowchart illustrating the control process of solar cell power conversion device 2 according to the first embodiment. The steps shown in FIGS. 26 and 27 are continuously performed by first control circuit 204 and second control circuit 209 during the operation of solar cell power conversion device 2.

Referring to FIGS. 4 to 6 together with FIG. 26, when solar cell power conversion device 2 is started, various types of sensor information is collected (S201). Specifically, the voltage and the current of solar cell 1 that are measured by voltmeter 201 and ammeter 202, respectively, are input into MPPT control circuit 2041 in first control circuit 204. Also, a DC bus voltage on DC bus 205 measured by voltmeter 206 is input into voltage control circuit 2042 in first control circuit 204 and sixth control circuit 2097 in second control circuit 209. Further, the result of measuring: the current flowing through DC bus 205 and measured by ammeter 207; and the AC current flowing through consumer premises distribution system 10 and measured by ammeter 211 is input into sixth control circuit 2097 in second control circuit 209.

Further, the AC voltage in consumer premises distribution system 10 measured by voltmeter 210 is input into effective voltage calculation circuit 2098 and phase detection circuit 2091 in second control circuit 209.

When collection of the results of measurement by various types of sensors ends, MPPT control circuit 2041 calculates the electric power generated by solar cell 1 (S202). A notification of the calculation result is given to fifth control circuit 2044. Upon reception of the generated electric power, fifth control circuit 2044 notifies sixth control circuit 2097 in second control circuit 209 about the received result.

Phase detection circuit 2091 detects a zero-cross point of the received AC voltage, and outputs the detection result to reactive current control circuit 2092, reactive current waveform generation circuit 2093, active current control circuit 2094, active current waveform generation circuit 2095, sixth control circuit 2097, effective voltage calculation circuit 2098, voltage control target value generation circuit 2099, and system voltage monitoring circuit 2101. Effective voltage calculation circuit 2098 calculates the AC effective voltage based on the received AC voltage by the configuration as described with reference to FIG. 9 (S203).

The AC effective voltage in consumer premises distribution system 10 calculated by effective voltage calculation circuit 2098 is input into reactive current control circuit 2092, active current control circuit 2094, sixth control circuit 2097, voltage control target value generation circuit 2099, and system voltage monitoring circuit 2101.

Upon reception of the AC effective voltage, voltage control target value generation circuit 2099 calculates a voltage control target value for solar cell power conversion device 2 by the configuration described with reference to FIG. 10 (S204). In the present first embodiment, the moving average value of the AC effective voltage for 1 minute that is calculated by using a FIR filter shown in FIG. 10 is set as a voltage control target value of consumer premises distribution system 10.

When the voltage control target value is calculated, a tap changing detection process is performed for detecting whether tap changing in SVR 23 occurs or not (S205). The following specifically describes a method of detecting tap changing in SVR 23 in the present first embodiment.

<Description of Method of Detecting Tap Changing>

For stabilizing the system AC voltage (AC effective voltage), as described above, a distributed power supply on the consumer side and distribution system voltage facilities (including distribution system storage battery 28 (FIG. 1)) such as an SVC are used for stabilizing an abrupt change. On the other hand, SVR 23 is used for addressing gradual voltage fluctuations.

For example, when the electric power generated by solar cell 1 or mega-solar system 26 abruptly changes due to an abrupt change in amount of solar radiation, or when a large-sized device starts to operate in factory 101 or the like, the system AC voltage (AC effective voltage) may abruptly change. In particular, in town 100 constituted of ZEH houses where several hundreds of ZEH houses each equipped with solar cell 1 are gathered in a relatively small area, a mega-solar system is formed. Thus, when a cloud passes through the sky over town 100 or mega-solar system 26, generated electric power significantly varies, and the system AC voltage significantly changes. Such a change in the generated electric power caused by an abrupt change in solar radiation depends on the speed of the cloud passing through the sky and also depends on the control response speeds of solar cell power conversion device 2 and mega-solar power conversion device 27. For example, assuming that a cloud moves at a speed of 20 in/sec and town 100 has a length of 200 meters in the direction in which the cloud passes over town 100, it takes about 10 seconds for the cloud to entirely cover solar cells 1 of all the houses. Similarly, it may take about several seconds to several tens of seconds to end an abrupt change of the generated electric power in mega-solar system 26.

On the other hand, since the system voltage change caused by tap changing in SVR 23 is caused only by physically changing a switch, it takes less than one second for voltage change. Further, in the case where the devices disposed in factory 101 are operated, facilities connected to a distribution system exert less influence upon this distribution system as compared with an abrupt change in power generation output from solar cell 1 or mega-solar system 26 that is caused by an abrupt change in solar radiation (the system AC voltage (AC effective voltage) is less influenced). Further, also in the case where load 5 in consumer house 18 changes abruptly, it is almost probabilistically impossible that all loads 5 in several hundreds of consumers are simultaneously started (for example, within one second).

Thus, in the present first embodiment, a change in system AC voltage (AC effective voltage) is monitored, and when a voltage change exceeding a threshold value occurs in a prescribed time period (for example, 1 s), such a change is detected as a change in system AC voltage (AC effective voltage) caused by tap changing in SVR 23. Note that the threshold value can be set, for example, based on the voltage change caused by tap changing in SVR 23. The voltage change caused by tap changing in SVR 23 is, for example, about 150 V with respect to the voltage of 6.6 kV, and is about 4.55 V with respect to the voltage of 200 V in consumer premises distribution system 10 in consumer house 18.

Referring again to FIG. 12, in the present first embodiment, absolute value comparison circuit 21023 calculates the absolute value of the result about addition of the effective voltage change amount by registers 21021*a* to 21021*n* and adders 21022*a* to 21022*n*, and compares the absolute value with the threshold value output from sixth control circuit 2097. When the absolute value of the addition result exceeds the threshold value, it is determined that the change in the system voltage is caused by the tap changing in SVR 23, and then, an SVR tap changing detection flag (which will be hereinafter also simply referred to as a "detection flag") is set at 1. At this time, absolute value comparison circuit 21023 starts a counter (not shown) and keeps the detection flag to be set at 1 for a prescribed time period (for example, about 90 seconds).

In the present first embodiment, the threshold value output from sixth control circuit 2097 is assumed to be 70% of the voltage change caused by the tap changing in SVR 23 (4.55 V×0.7=3.2 V in consumer premises distribution system 10). Note that the threshold value is not limited thereto, but may be determined based on the result of actually measuring the voltage change by voltmeter 22 during tap changing in SVR 23, or an optimal detection width may be determined for each distributed power supply in each consumer house 18 by using a method such as machine learning by means of DSO 21 configured to have a learning function.

Further, the count time period during which the detection flag is maintained at 1 is not limited to 90 seconds, but may be a time period during which the moving average for voltage control target value generation circuit 2099 is taken, may be the time constant of voltage control target value generation circuit 2099 in the case where this voltage control target value generation circuit 2099 is formed of an LPF, or may be determined from the dead zone time period taken when tap changing in SVR 23 is performed.

Note that the above-mentioned time period is preferably set longer than the time period for which the moving average for voltage control target value generation circuit 2099 is taken. Thereby, the voltage control target value output from voltage control target value generation circuit 2099 can be prevented from being influenced by the tap changing in SVR 23 at the end of reactive current (power) control, which will be described later.

Figure 28:
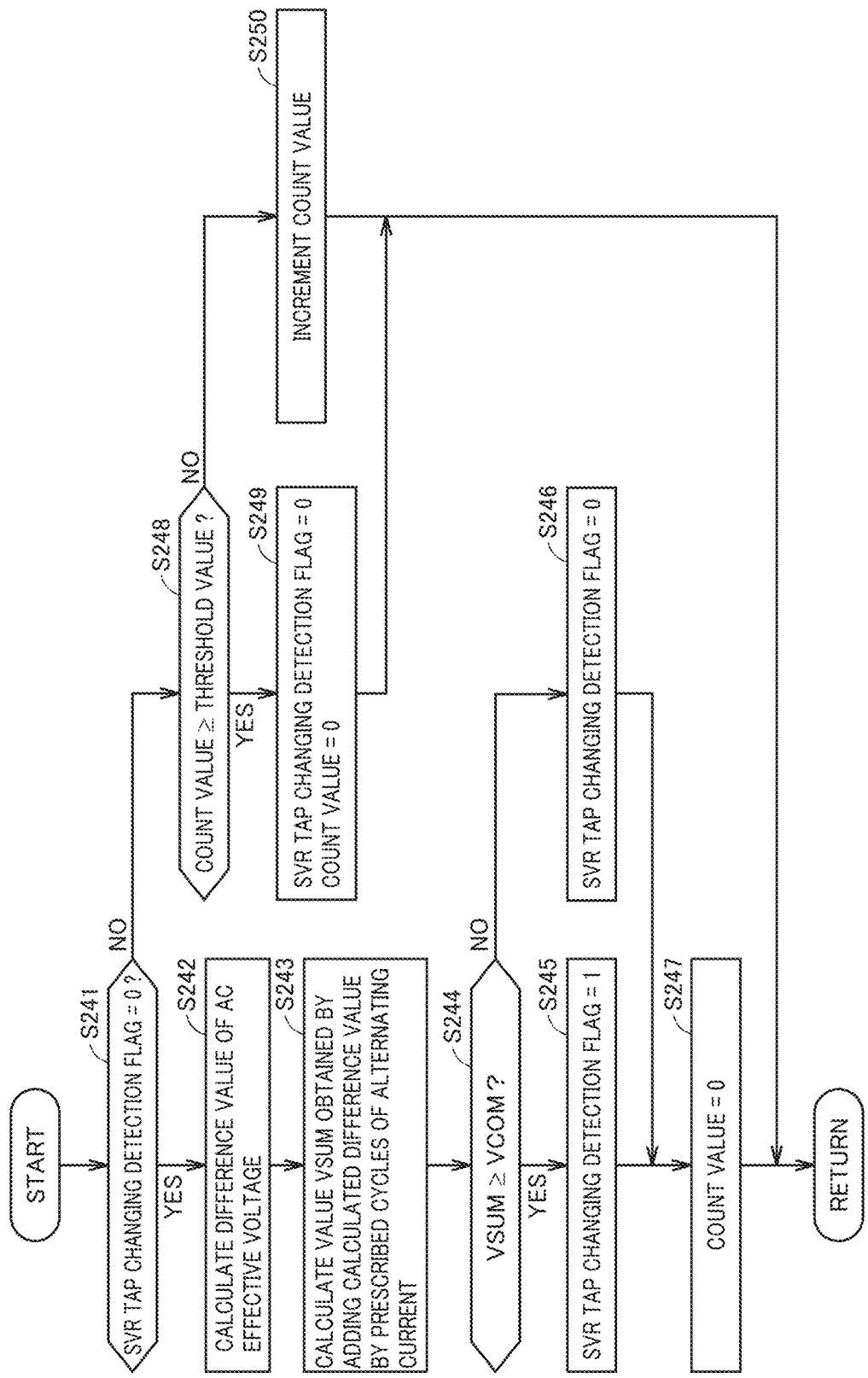
FIG. 28 is a flowchart illustrating a tap changing detection process performed in S205 in FIG. 26.

FIG. 28 is a flowchart illustrating a tap changing detection process performed in S205 in FIG. 26.

Referring to FIGS. 11 and 12 together with FIG. 28, absolute value comparison circuit 21023 in system voltage change factor determination circuit 2102 determines whether the SVR tap changing detection flag is "0" or not (S241). When it is determined that the detection flag is 0 (YES in S241), it is determined that the change in the system AC effective voltage caused by the tap changing in SVR 23 has not been detected.

System voltage monitoring circuit 2101 calculates a difference value of the system AC effective voltage (S242). Then, system voltage change factor determination circuit 2102 adds the calculated difference value by the cycles of an alternating current (for example, by six cycles) using registers 21021*a* to 21021*e* and adders 21022*a* to 21022*e*, thereby calculating a value VSUM (S243). The process in S242 and S243 may also be performed when the detection flag is not 0 (i.e., "1").

Then, absolute value comparison circuit 21023 determines whether or not the absolute value of value VSUM is equal to or greater than a threshold value VCOM output from sixth control circuit 2097 (S244). Threshold value VCOM is, for example, 70% of the voltage change caused by tap changing in SVR 23, and calculated in sixth control circuit 2097. When it is determined that the absolute value of value VSUM is equal to or greater than threshold value VCOM (YES in S244), it is recognized that the tap changing in SVR 23 has been performed, and then, absolute value comparison circuit 21023 sets the detection flag at "1" (S245). At this time, absolute value comparison circuit 21023 holds value VSUM in its internal register (not shown).

On the other hand, when it is determined in S244 that the absolute value of value VSUM is smaller than threshold value VCOM (NO in S244), it is determined that the tap changing in SVR 23 has not been performed, and then, absolute value comparison circuit 21023 sets the detection flag at "0" (S246). Then, when the detection flag is set in S245 or S246, absolute value comparison circuit 21023 sets the count value of the internal counter at 0.

On the other hand, when it is determined in S241 that the detection flag is not 0, i.e., the detection flag is 1 (NO in S241), absolute value comparison circuit 21023 determines whether or not the count value of the counter is equal to or greater than the threshold value (the count time period) (S248). This threshold value is a count value equivalent to 90 seconds, for example, and shows a time period during which the detection flag is maintained at 1 after this detection flag is set at 1.

When it is determined that the count value is equal to or greater than the threshold value (YES in S248), absolute value comparison circuit 21023 resets the detection flag at 0 and clears the count value to be 0 (S249). When it is determined in S248 that the count value is less than the threshold value (NO in S248), absolute value comparison circuit 21023 increments the count value by one (S250).

Referring again to FIGS. 4 to 6 together with FIG. 26, when the process of detecting tap changing in SVR 23 is performed in S205, sixth control circuit 2097 in second control circuit 209 checks communication interface circuit 212 whether or not the transmission request for the measurement result has been received from HEMS 7 (S206). When the transmission request has been received (YES in S206), sixth control circuit 2097 transmits, through communication interface circuit 212 to HEMS 7, the electric power generated by solar cell 1, the control mode of solar cell 1 (two types of an MPPT control mode and a voltage control mode as will be described later in detail), the AC effective voltage in consumer premises distribution system 10, and the AC voltage control target value, and additionally, as will be described later in detail, the result of measuring the reactive power output time, the result of measuring the reactive power control amount, the output active power amount, and the information of the time during which output has been suppressed (S207). After transmission of various pieces of measurement data in S207, the result of measuring the output time of reactive power, the result of measuring the reactive power control amount, the output active power amount, and the information of the time during which output has been suppressed are cleared once.

Then, sixth control circuit 2097 checks whether or not the dead zone width information has been received from HEMS 7 (S208). When the dead zone width information has been received (YES in S208), sixth control circuit 2097 updates the dead zone width information, threshold value VCOM used in absolute value comparison circuit 21023 (S244 in FIG. 28), the threshold value compared with the count value of the counter (S248 in FIG. 28), and the like (S209).

When various pieces of information such as dead zone width information are updated, dead zone table generation circuit 2100 generates a dead zone table based on the information output from sixth control circuit 2097. Further, sixth control circuit 2097 sets various control parameters such as threshold value VCOM in absolute value comparison circuit 21023 and the threshold value (count time period) of the counter, each of which has been transmitted together with the dead zone width information (S210).

When it is determined in S208 that the dead zone width information has not been received, or when the dead zone width (dead zone table) and various control parameters have been set in S210, absolute value comparison circuit 21023 determines whether the SVR tap changing detection flag is 0 or not (S211). When it is determined that the detection flag is set at 1 (NO in S211), reactive current control circuit 2092 performs an output reactive current calculation process II (S212). In the present first embodiment, when the tap changing in SVR 23 is detected (detection flag=1), output reactive current calculation process II is performed to maintain the reactive current at a value, which occurs immediately before the detection of tap changing or immediately after the detection of tap changing (before the reactive current significantly changes), for a prescribed time period (for a count time period of the counter). The operation of output reactive current calculation process II will be described later with reference to the operation timing chart in FIG. 30. When output reactive current calculation process II is performed, the process is shifted to S218 (described later) in FIG. 27.

On the other hand, when it is determined in S211 that the detection flag is set at 0 (YES in S211), sixth control circuit 2097 checks whether first DC/AC conversion circuit 208 is performing system voltage stabilization control, based on the flag value stored in a register (not shown) (S213). When the system voltage stabilization control is being performed (YES in S213), the process is shifted to S217 (described later). On the other hand, when the system voltage stabilization control is not being performed (NO in S213), sixth control circuit 2097 determines whether or not the AC effective voltage in consumer premises distribution system 10 deviates from the dead zone voltage range set in S210 (S214).

When the AC effective voltage does not deviate from the dead zone voltage range (NO in S214), a series of subsequent steps are not performed, and the process is shifted to return (FIG. 27). In other words, while the AC effective voltage in consumer premises distribution system 10 falls within the dead zone voltage range, the process in S201 to S214 is repeatedly performed without performing the system voltage stabilization control.

On the other hand, when it is determined in S214 that the AC effective voltage (in consumer premises distribution system 10) deviates from the dead zone voltage range (YES in S214), sixth control circuit 2097 sets a system voltage stabilization control flag in a register (not shown) (S215) and starts system voltage stabilization control (S216).

When the system voltage stabilization control is started in S216 or when it is determined in S213 that the system voltage stabilization control is being performed (YES in S213), reactive current control circuit 2092 performs an output reactive current calculation process I (S217). This output reactive current calculation process I is performed for calculating (controlling) the amplitude of the reactive current in the normal state, and the operation of reactive current control circuit 2092 related to this process has been described with reference to FIGS. 6, 13, and the like, and therefore, the description thereof will not be repeated.

Then, referring to FIGS. 4 to 6 together with FIG. 27, apparent current limiter circuit 2103 checks whether the current command value exceeds a prescribed range or not (exceeds the current capacity in first DC/AC conversion circuit 208 or not) (S218). This current command value is a value obtained by adding the reactive current command value and the active current command value. The reactive current command value is calculated by reactive current waveform generation circuit 2093 based on the current amplitude value of the reactive current calculated by output reactive current calculation process I. The active current command value is calculated by active current waveform generation circuit 2095 based on the current amplitude value of the active current calculated by active current control circuit 2094 (FIG. 6). Then, adder 2096 adds the reactive current command value and the active current command value to thereby obtain the above-mentioned current command value.

When it is determined in S218 that the current command value exceeds the specified range (YES in S218), apparent current limiter circuit 2103 limits the amplitude of the current command value and outputs an output suppression command to sixth control circuit 2097 to suppress the active current. At this time, apparent current limiter circuit 2103 also notifies sixth control circuit 2097 about the amplitude of the limited current command value.

Then, sixth control circuit 2097 outputs a command to instruct fifth control circuit 2044 to operate in the voltage control mode (S219). At this time, sixth control circuit 2097 calculates the suppression amount of the electric power generated by solar cell 1 based on the amplitude of the limited current command value received from apparent current limiter circuit 2103, and then, notifies fifth control circuit 2044 also about the calculation result.

In order to prevent repeated switching between the voltage control mode and the MPPT control mode in a short time (to prevent hunting), it is preferable that, within a predetermined time period since switching between the control modes, the switching between the control modes (the MPPT control mode and the voltage control mode) is masked, and also, the specified range used in determination in S218 is set such that the threshold value adopted when determining the switching from the voltage control mode to the MPPT control mode is smaller than the threshold value adopted when determining the switching from the MPPT control mode to the voltage control mode. Thereby, the control mode of solar cell 1 can be prevented from frequently switching in a short time period, so that the system voltage stabilization control can be stably performed. Note that the above-described determination is made by sixth control circuit 2097 based on the output from apparent current limiter circuit 2103.

When fifth control circuit 2044 receives the instruction to change the control mode of solar cell 1 to the voltage control mode, and when MPPT control circuit 2041 is operating, fifth control circuit 2044 outputs an instruction to stop the control, and then, captures the information such as a present command value. Then, fifth control circuit 2044 transmits, to voltage control circuit 2042, the generated electric power information given from sixth control circuit 2097, and, when voltage control circuit 2042 is not operating, fifth control circuit 2044 transmits the information such as a present command value received from MPPT control circuit 2041. Upon reception of the generated electric power information from fifth control circuit 2044, voltage control circuit 2042 generates a control command value so as to attain the received power generation amount. When voltage control circuit 2042 is not started, control is started using the information such as the present command value received from MPPT control circuit 2041 as an initial value. Further, fifth control circuit 2044 notifies voltage control circuit 2042 about the generated electric power information and the like, and outputs a control signal for selecting the output of voltage control circuit 2042 to switching circuit 2043.

When it is determined in S218 that the current command value does not exceed the specified range (NO in S218), sixth control circuit 2097 outputs a command for instructing fifth control circuit 2044 to operate in the MPPT control mode (S220). When fifth control circuit 2044 receives the instruction to operate in the MPPT control mode and when fifth control circuit 2044 operates in the voltage control mode, it reads the information such as the present command value from voltage control circuit 2042 and notifies MPPT control circuit 2041 about the read control information. Further, fifth control circuit 2044 instructs MPPT control circuit 2041 to start MPPT control based on the received information as an initial value, and outputs a control signal for selecting the output of MPPT control circuit 2041 to switching circuit 2043. When fifth control circuit 2044 operates in the MPPT control, the MPPT control is continued as it is.

When the process in S219 or S220 is performed, sixth control circuit 2097 calculates the apparent power based on the current command value output from apparent current limiter circuit 2103 (S221). Then, sixth control circuit 2097 determines whether or not the calculated apparent power exceeds the capacity of solar cell power conversion device 2 (S222).

When it is determined that the apparent power exceeds the capacity of solar cell power conversion device 2 (YES in S222), sixth control circuit 2097 performs a process for suppressing the active power (S223). Specifically, sixth control circuit 2097 outputs an output suppression command to suppress the electric power generated by solar cell 1 to fifth control circuit 2044. At this time, sixth control circuit 2097 notifies fifth control circuit 2044 also about the power generation amount. When fifth control circuit 2044 receives the output suppression command from sixth control circuit 2097, it checks the currently adopted control mode of solar cell 1. When the currently adopted control mode is the MPPT control mode, fifth control circuit 2044 switches the control mode to a voltage control mode.

Specifically, fifth control circuit 2044 outputs a control stop instruction to MPPT control circuit 2041 and captures the information such as the present command value from MPPT control circuit 2041. Then, fifth control circuit 2044 transmits the information about generated electric power given from sixth control circuit 2097 to voltage control circuit 2042. Also, when voltage control circuit 2042 is not operating, fifth control circuit 2044 transmits the information such as the present command value obtained from MPPT control circuit 2041 to voltage control circuit 2042. Upon reception of the information about the generated electric power from fifth control circuit 2044, voltage control circuit 2042 generates a control command value so as to attain the generated electric power that has been received. In this case, when voltage control circuit 2042 is not started, the control is started using the information such as the present command value obtained from MPPT control circuit 2041 as an initial value. Further, fifth control circuit 2044 notifies voltage control circuit 2042 of the information about the generated electric power and the like, and also outputs a control signal for selecting the output of voltage control circuit 2042 to switching circuit 2043.

On the other hand, when solar cell 1 is operating in the voltage control mode, fifth control circuit 2044 notifies voltage control circuit 2042 about the generated electric power that has been received. Voltage control circuit 2042 generates a control command value so as to attain the generated electric power that has been received. The generated control command value is output to first DC/DC conversion circuit 203 through switching circuit 2043.

When the process for suppressing the active power is performed in S223, or when it is determined in S222 that the apparent power does not exceed the capacity of solar cell power conversion device 2 (NO in S222), sixth control circuit 2097 checks the condition for ending the system voltage stabilization control.

Specifically, sixth control circuit 2097 checks fifth control circuit 2044 whether the currently adopted control mode of solar cell 1 is the MPPT control mode or not. Further, sixth control circuit 2097 compares the result of measuring the reactive power given from reactive power measurement circuit 20935 (FIG. 14) in reactive current waveform generation circuit 2093 with a predetermined end determination value. Then, when the currently adopted control mode of solar cell 1 is not the MPPT control mode or when it is determined that the result of measuring the reactive power is greater than the end determination value (NO in S224), the process is shifted to return. Thereby, the system voltage stabilization control is continued.

On the other hand, when it is determined in S224 that solar cell 1 is operating in the MPPT control mode and that the result of measuring the reactive power is equal to or less than the end determination value (YES in S224), sixth control circuit 2097 ends the system voltage stabilization control (S225) and clears the system voltage stabilization control flag (S226). The following describes the reason why the condition for ending the system voltage stabilization control (S224) is determined as described above.

During the grid interconnection operation, solar cell 1 normally operates in the MPPT control mode in order to extract the generated electric power as much as possible. Thus, when solar cell 1 is operating in the voltage control operation mode, regenerative power flows in large quantity through consumer premises distribution system 10, and thereby, it is conceivable that the system voltage rises. Further, the system voltage stabilization control in consumer premises distribution system 10, distribution system 14 and the like may be performed more effectively by the active power than by the reactive power depending on the configuration of the system impedance. Specifically, when the main element of the system impedance results from the influence of a reactor or a capacitor, the system voltage stabilization control by reactive power is more effective. On the other hand, when the main element of the system impedance is a resistance, the system voltage stabilization control by active power is more effective. Thus, in the present first embodiment, the control mode of solar cell 1 and the result of measuring the reactive power both are used as the condition for ending the system voltage stabilization control, and thereby, the end of the system voltage stabilization control can be reliably determined.

In the above description of the present first embodiment, the system voltage stabilization control by reactive power is prioritized. However, when the main element of the system impedance information given from DSO 21 is a resistance component, the system voltage stabilization control may be performed while prioritizing active power control. Specifically, in the case where the main element of the system impedance is a reactor or a capacitor, comparison between controlling of the active power and controlling of the reactive power shows that the voltage amplitude of the distribution AC system is influenced more by the reactive power than by the active power. On the other hand, when the main element of the system impedance is a resistance component, the system voltage is less influenced even when the reactive power is controlled. Thus, in the case where the main element of the system impedance is a reactor or a capacitor, it is preferable that, as shown in FIG. 27, when the output of reactive power reaches the allowable maximum value, the process in S219 and S223 is performed to thereby execute the system voltage stabilization control while prioritizing reactive power. On the other hand, when the main element of the system impedance is a resistance component, it is preferable that the process in S219 and S223 is performed before the system voltage stabilization control is performed while prioritizing suppression of active power.

In this way, by switching whether to prioritize output of reactive power or suppression of active power in accordance with the configuration of the system impedance information, the system voltage stabilization control can be further effectively performed. For example, based on the system impedance information given through CEMS 15 from DSO 21, HEMS 7 can determine the priority order between suppression of the system voltage by the output of reactive power and reduction of the system voltage by suppression of active power. HEMS 7 notifies solar cell power conversion device 2 and storage battery power conversion device 4 about the determination result, and thereby, the system voltage stabilization control can be performed effectively based on the impedance information about the distribution system.

Then, the operation of the distribution system in the present first embodiment will be described with reference to FIGS. 1, 29, and 30. The following describes an example of the operation performed in the distribution system shown in FIG. 1 when the power generation amount of solar cell 1 in each consumer house 18 in town A 100*a* and town B 100*b* decreases for a short time period due to an abrupt change in solar radiation, and thereby, SVR 23*b* starts to operate.

Figure 29:
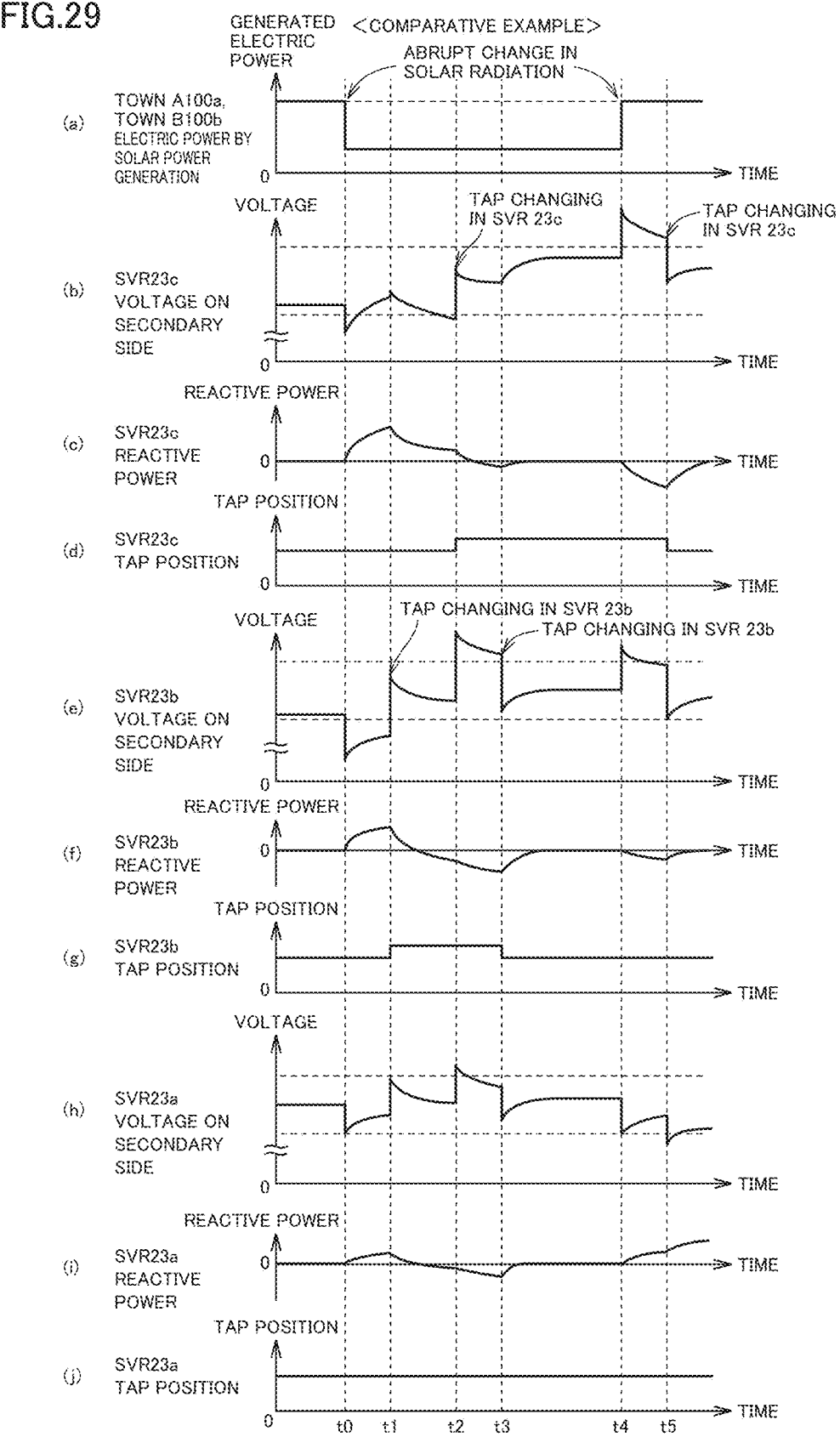
FIG. 29 is a timing chart showing an operation of a distribution system in the comparative example that has the same configuration as that in FIG. 1.

FIG. 29 is a timing chart showing the operation of the distribution system in the comparative example that has the same configuration as that in FIG. 1. FIG. 29 shows the operation of a conventional distribution system as a comparative example.

Referring to FIG. 29, at time t0, the electric power generated by solar cells 1 in town A 100*a* and town B 100*b* decreases due to an abrupt change in solar radiation (see (a)). The voltages on the secondary sides of SVR 23*a* to SVR 23*c* decrease under the influence of the decrease in the electric power generated by each solar cell 1 (see (b), (e) and (h)). Further, due to such a voltage decrease, the voltage in consumer premises distribution system 10 in each consumer house 18 deviates from the appropriate range. In this figure, the appropriate voltage range of SVR 23 is represented by a dotted line. For simplicity of explanation, it is assumed in the following description that, when the voltage on the secondary side of SVR 23 deviates from the appropriate voltage range, the distribution system voltage in each consumer house 18 also deviates from the appropriate range.

Then, when deviation of the voltage from the appropriate range is detected, solar cell power conversion device 2 and storage battery power conversion device 4 installed in each consumer house 18, mega-solar power conversion device 27, and distribution system storage battery power conversion device 29 each output reactive power in order to raise the distribution system voltage (see (c), (f) and (i)). For simplicity of explanation, it is assumed in the following description that the reactive power generated by each distributed power supply flows through SVR 23.

In this case, the voltages on the secondary sides of SVR 23*a* and SVR 23*c* can be suppressed by the output of reactive power from each distributed power supply to fall within their respective appropriate voltage ranges by time t1, but the voltage on the secondary side of SVR 23*b* cannot be suppressed to fall within the appropriate voltage range by time t1, and thus, tap changing in SVR 23*b* occurs (see (e)). Since the tap changing in SVR 23*b* influences the voltage on the primary side of SVR 23*a*, the voltage on the secondary side of SVR 23*a* rises (see (h)). On the other hand, in SVR 23*c* provided upstream of SVR 23*b*, the voltage on the secondary side slightly changes in accordance with the change in the power flow of the active power and the reactive power, but there is no significant voltage change (see (b)).

However, in each of the distributed power supplies connected to the secondary sides of SVR 23*b* and SVR 23*a*, the voltage in consumer premises distribution system 10 rises and exceeds the upper limit value of the dead zone at time t1. Thus, even though the voltages on the secondary sides of SVR 23*b* and SVR 23*a* fall within their respective appropriate ranges, the above-mentioned distributed power supplies decrease the output of reactive power in order to lower the voltage in consumer premises distribution system 10. This causes the voltage on the secondary side of SVR 23c to change its direction from an upward direction to a downward direction at and after time t1. Accordingly, town C 100c and factory 101 connected to the secondary side of SVR 23c increase the output of reactive power, but cannot compensate for the decrease in output of the reactive power by the distributed power supplies connected to the secondary sides of SVR 23b and SVR 23a. As a result, the voltage on the secondary side of SVR 23c deviates from the appropriate range, and tap changing in SVR 23c occurs at time t2 (see (b) and (d)).

The tap changing in SVR 23c at time t2 influences the voltages on the secondary sides of SVR 23b and SVR 23c (see (b), (e) and (h)). Since the distribution system voltage exceeds the dead zone width in each of SVR 23a to SVR 23c due to the tap changing in SVR 23c, the distributed power supplies in all consumer houses 18 each decrease the output of reactive power in order to lower the voltage in consumer premises distribution system 10.

Thereby, in SVR 23a, the voltage in consumer premises distribution system 10 falls within an appropriate range (within the dead zone) in a situation where reactive power is substantially not output (see (h) and (i)). SVR 23c is also controlled to reduce the reactive power, so that the voltage on the secondary side of SVR 23c is controlled to fall within an appropriate range (see (b) and (c)).

In SVR 23b, since the voltage on the secondary side does not fall within the operational voltage range even at time t3, the tap position changes again. Specifically, the tap position returns to the tap position located before occurrence of an abrupt change in solar radiation (see (g)). The tap changing in SVR 23b at time t3 influences the voltage on the primary side of SVR 23a as described above, and thus, the voltage on the secondary side of SVR 23a decreases (see (h)). In SVR 23c, in contrast, no significant voltage change occurs (see (b)).

After the tap changing in SVR 23b, in the distributed power supplies connected to the secondary sides of SVR 23b and SVR 23a, the voltage in consumer premises distribution system 10 lowers and falls below the lower limit value of the dead zone. Thus, even though the voltages on the secondary sides of SVR 23b and SVR 23a fall within their respective appropriate ranges, these distributed power supplies each increase the output of reactive power in order to raise the voltage in consumer premises distribution system 10. On the other hand, SVR 23c is controlled to lower the voltage on the secondary side until time t3, but the reactive power flowing through SVR 23c decreases as the reactive power flowing through SVR 23b and SVR 23a increases. Then, between time t3 and time t4, the system voltage falls within the dead zone range, and the output of reactive power reaches 0.

At time t4, solar radiation abruptly changes again, and the electric power generated by solar cells 1 in town A 100a and town B 100b returns to the state at and before time t0 (see (a)). The voltages on the secondary sides of SVR 23a to SVR 23c rise under the influence of the increase in power generation by solar cell 1 (see (b), (e) and (h)). Then, the voltage on the secondary side of SVR 23c cannot be suppressed to fall within the appropriate voltage range by time t5, so that tap changing in SVR 23c occurs, and then, the tap position in SVR 23c returns to the position located at and before time t0 (see (d)). At and after time t5, the voltages on the secondary sides of SVR 23a to SVR 23c fall within their respective appropriate ranges, and thereafter, no tap changing occurs.

Figure 30:
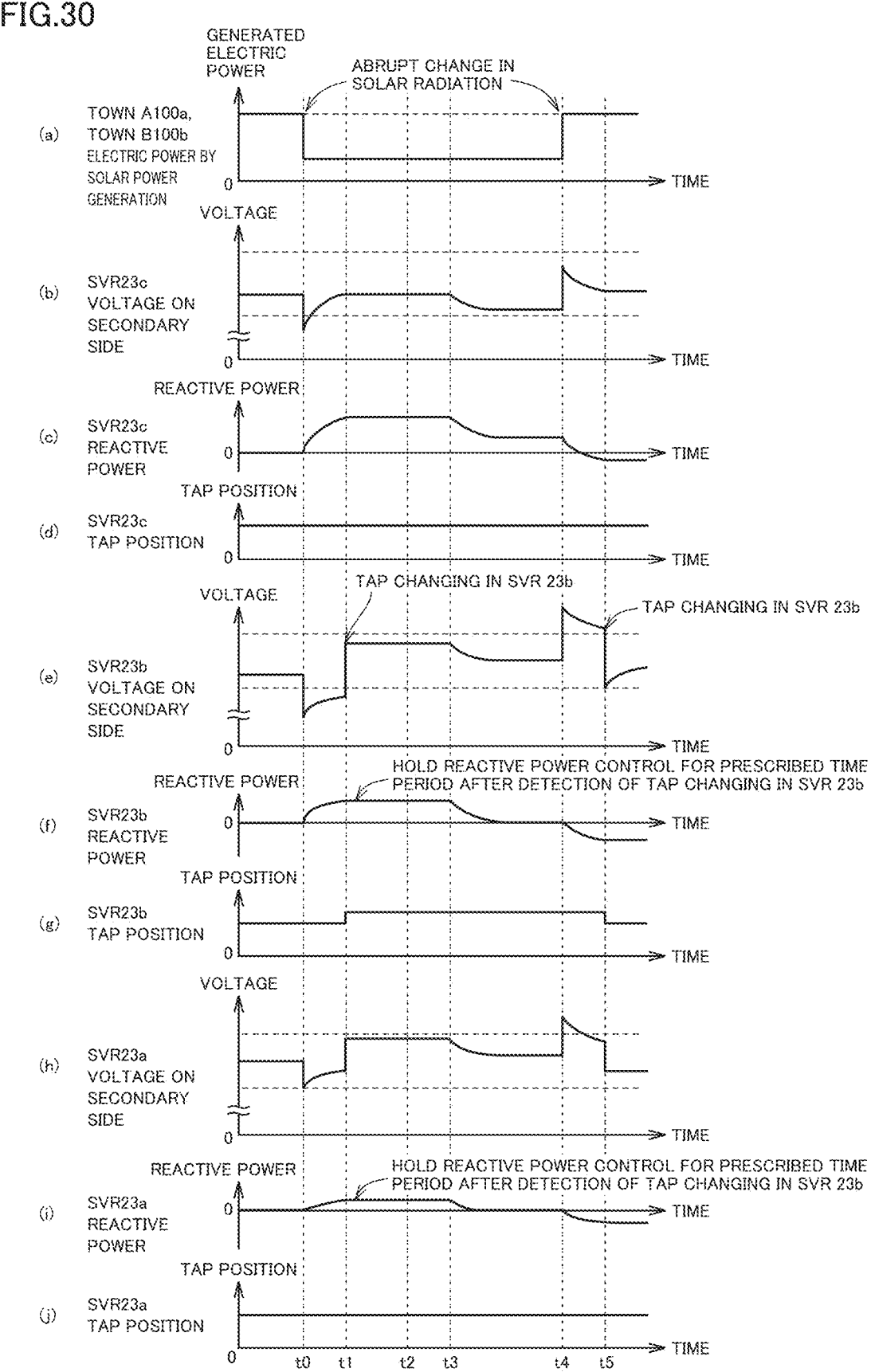
FIG. 30 is a timing chart showing the operation of the distribution system in the present first embodiment in the configuration shown in FIG. 1.

FIG. 30 is a timing chart showing the operation of the distribution system in the first embodiment in the configuration shown in FIG. 1. FIGS. 30(a) to 30(j) respectively correspond to FIGS. 29(a) to 29(j).

Referring to FIG. 30, at time t0, the electric power generated by solar cell 1 in each of town A 100a and town B 100b decreases due to an abrupt change in solar radiation (see (a)), as in FIG. 29. Each of consumer houses 18 in town A 100a and town B 100b gives a notification about such a decrease in the electric power generated by solar cell 1 from sixth control circuit 2097 in solar cell power conversion device 2 to HEMS 7. On the other hand, storage battery power conversion device 4 detects an abrupt change in the power generation amount of solar cell 1 based on a change in the power flow in consumer premises distribution system 10 that is measured by storage battery power conversion device 4 itself, and then gives a notification about such an abrupt change from eighth control circuit 4097 to HEMS 7.

Town D 100d, mega-solar power conversion device 27, and distribution system storage battery power conversion device 29, each of which is located closer to the end side of distribution system 24 than town A 100a and town B 100b, monitor the system AC effective voltage in order to detect a voltage change caused by tap changing in SVR 23 from the change in system AC effective voltage in consumer premises distribution system 10 or distribution system 24a. Also for the distributed power supplies in respective consumer houses 18 in each of town A 100a and town B 100b, the change in the system AC effective voltage in consumer premises distribution system 10 may be monitored for detecting a voltage change caused by the tap changing in SVR 23.

Referring again to FIG. 6, the zero-cross point of the AC voltage is detected by phase detection circuit 2091 from the voltage in consumer premises distribution system 10 that is measured by voltmeter 210. Specifically, the timing at which the voltage is switched from negative to positive is detected. The detection result of the zero-cross point is conveyed to reactive current control circuit 2092, reactive current waveform generation circuit 2093, active current control circuit 2094, active current waveform generation circuit 2095, sixth control circuit 2097, effective voltage calculation circuit 2098, voltage control target value generation circuit 2099, system voltage monitoring circuit 2101, and system voltage change factor determination circuit 2102.

Note that the detection result of the zero-cross point is conveyed as it is to reactive current waveform generation circuit 2093, active current waveform generation circuit 2095, sixth control circuit 2097, and effective voltage calculation circuit 2098. On the other hand, phase detection circuit 2091 detects a phase jump of the AC voltage from the zero-cross point detection cycle. Also, when the phase jump of the AC voltage is detected, the zero-cross point detection result is masked against reactive current control circuit 2092, active current control circuit 2094, voltage control target value generation circuit 2099, system voltage monitoring circuit 2101, and system voltage change factor determination circuit 2102. Further, the detection result of the zero-cross point is masked also in the case where, when the tap position in SVR 23 changes, the phase of the AC voltage does not change but the AC voltage becomes unsteady at the moment of tap changing and thereby is erroneously detected as a zero-cross point.

This is because, when a phase jump of the AC voltage occurs in calculating an effective voltage by effective voltage calculation circuit 2098 from the voltage in one cycle of an alternating current, the effective voltage may decrease (in the case where the cycle becomes shorter) or the effective voltage may increase (in the case where the cycle becomes longer), which may adversely affect: the reactive current control in reactive current control circuit 2092; the active current control in active current control circuit 2094; and the monitoring of the system AC effective voltage in system voltage monitoring circuit 2101. Further, the zero-cross point detection result is masked also against voltage control target value generation circuit 2099 because it is unnecessary disturbance information for voltage control target value generation circuit 2099.

Effective voltage calculation circuit 2098 calculates an effective voltage in one cycle of the AC voltage based on the zero-cross point detection information output from phase detection circuit 2091, and outputs the calculation result to voltage control target value generation circuit 2099. Also when a phase jump of the AC voltage occurs, effective voltage calculation circuit 2098 outputs the result that has been calculated until then. Voltage control target value generation circuit 2099 calculates a moving average of the effective voltage for one minute by the configuration shown in FIG. 10. Further, the output from effective voltage calculation circuit 2098 is also given to system voltage monitoring circuit 2101. By the configuration shown in FIG. 11, system voltage monitoring circuit 2101 obtains a change (difference data) in the effective voltage from one cycle of the AC voltage before, and outputs the calculation result to system voltage change factor determination circuit 2102.

In system voltage change factor determination circuit 2102, difference data for six cycles of an alternating current (for example, 100 ms) is added. Then, absolute value comparison circuit 21023 compares the absolute value of the addition result with the threshold value output from sixth control circuit 2097. Then, according to the flowchart shown in FIG. 28, the SVR tap changing detection flag is controlled based on the comparison result.

Referring again to FIG. 30, the change in system voltage caused by the abrupt change in solar radiation actually slowly occurs over a time period of several seconds to several dozen seconds. Thus, the change in the effective voltage for six cycles of an alternating current is smaller than threshold value VCOM output from sixth control circuit 2097. Then, absolute value comparison circuit 21023 determines that the change in the system voltage caused by such an abrupt change in solar radiation is not a voltage fluctuation caused by the tap changing in SVR 23. Accordingly, in the distributed power supplies in town A 100a, town B 100b, and town D 100d, mega-solar power conversion device 27, and distribution system storage battery power conversion device 29, the reactive power control similar to that in the reference example shown in FIG. 29 is performed, and the same operation as that in the reference example is performed until time t1.

When tap changing in SVR 23b occurs at time t1, the change in the effective voltage for six cycles of an alternating current (for example, 100 ms) is compared with threshold value VCOM in the distributed power supplies in town A 100a, town B 100b, and town D 100d, and system voltage change factor determination circuit 2102 in each of mega-solar power conversion device 27 and distribution system storage battery power conversion device 29, each of which is connected closer to the end side than SVR 23b. In the present example, the change in the effective voltage is determined as being equal to or greater than threshold value VCOM, the change in the voltage on the secondary side of SVR 23b at time t1 is determined as being a voltage change caused by the tap changing in SVR 23b, and thus, the SVR tap changing detection flag is set at 1.

In the present first embodiment, when the SVR tap changing detection flag is set at 1, the reactive current command value output from reactive current control circuit 2092 is maintained at the value obtained during tap changing in SVR 23 (an output reactive current calculation process II). Output reactive current calculation process II will be described below with reference to FIG. 31.

FIG. 31 is a diagram for illustrating the operation of reactive current control circuit 2092 in the first embodiment. Referring to FIG. 13 together with FIG. 31, output reactive current calculation process II is performed in reactive current control circuit 2092. First, the operation of reactive current control circuit 2092 in the normal state will be described.

In the normal state, target value generation circuit 20921 outputs the voltage control target value, as it is, output from voltage control target value generation circuit 2099. Further, LPF 20922 removes the noise component (high frequency component) of the AC effective voltage output from effective voltage calculation circuit 2098 (see the detection voltage in FIG. 31). The time constant of LPF 20922 is set to be shorter than the time constant of voltage control target value generation circuit 2099. Subtractor 20923 subtracts the output of target value generation circuit 20921 from the output of LPF 20922. Thereby, the deviation of the detected voltage from the voltage control target value is calculated (see the output waveform of subtractor 20923 in FIG. 31).

The output of subtractor 20923 is input into dead zone determination circuit 20924. Dead zone determination circuit 20924 outputs "0" so as to prevent reactive current control from being performed for a voltage deviation with a small amplitude. The voltage deviation exceeding the dead zone width is output from dead zone determination circuit 20924. Note that one example of input/output characteristics of dead zone determination circuit 20924 is shown below dead zone determination circuit 20924 in the figure, and one example of the output waveform from dead zone determination circuit 20924 is shown in the lower right of dead zone determination circuit 20924 in the figure.

Reactive current command value computing circuit 20925 calculates a reactive current command value (an amplitude of the reactive current) such that the voltage deviation output from dead zone determination circuit 20924 becomes 0. Reactive current command value computing circuit 20925 is formed of a proportional-integral control circuit, for example. Note that the configuration of computing circuit 20925 is not limited to a proportional-integral control circuit, but may be formed of a proportional control circuit, a proportional-integral-differential control circuit, or other control circuits.

The following describes the operation of reactive current control circuit 2092 performed when system voltage change factor determination circuit 2102 determines that the change in the system AC voltage (effective voltage) is a voltage change caused by tap changing in SVR 23.

In this case, target value generation circuit 20921, LPF 20922, subtractor 20923, and dead zone determination circuit 20924 perform the same operations as those in the normal state. When reactive current command value computing circuit 20925 confirms that the SVR tap changing detection flag output from system voltage change factor determination circuit 2102 becomes "1", it captures the reactive current command value (the amplitude of the reactive current), which is currently output, into a register (not shown), and also, outputs the captured reactive current command value during a time period in which the detection flag is "1".

Although there is no particular problem in the proportional control circuit, in the case where the proportional-integral circuit or the proportional-integral-differential control circuit exemplified in the present first embodiment is used, the following control operation needs to be performed in order to seamlessly continue the reactive power control when the SVR tap changing detection flag is reset to 0. Specifically, the control operation needs to be performed to write: the reactive current command value that has been output for a time period during which the detection flag is 1; and the register value in the control circuit that is calculated from the output of dead zone determination circuit 20924. Both of these values need to be written as initial values at the start of control.

Referring again to FIG. 30, when tap changing in SVR 23b occurs at time t1 (the SVR tap changing detection flag is set at 1), the voltages on the secondary sides of SVR 23b and SVR 23a are influenced by tap changing (see (e) and (h)). On the other hand, the voltage on the secondary side of SVR 23c is slightly influenced by changes in power flow of the active power and the reactive power, but is hardly influenced by the tap changing in SVR 23b. After the tap changing, the voltages on the secondary sides of SVR 23a and SVR 23b fall within their respective appropriate ranges. In the present first embodiment, as described above, each distributed power supply disposed closer to the end side than SVR 23b keeps the output of the reactive current at the value obtained at the time of tap changing, during a prescribed time period (until time t3 in FIG. 30) from the time of tap changing in SVR 23b.

By performing control in this way, the system voltages on the secondary sides of SVR 23a to SVR 23c are controlled to fall within their respective appropriate voltage ranges until time t3. In the present first embodiment, the length of the time period during which the output of the reactive current is maintained (time t1 to time t3) is set to be longer than the moving average time (for example, one minute) in voltage control target value generation circuit 2099 (FIG. 10) or the time constant of voltage control target value generation circuit 2099. Thereby, the voltage control target value output from voltage control target value generation circuit 2099 becomes substantially equal to the effective voltage value output from effective voltage calculation circuit 2098 (fall within the dead zone), and the reactive power output from the distributed power supply connected closer to the end side than SVR 23b becomes close to 0 (see (f) and (i)). In the reference example in FIG. 29, the reactive power is output in the direction in which the voltage decreases, and thus, the voltage on the secondary side of SVR 23c deviates from the appropriate voltage range.

Therefore, in the present first embodiment, the voltages on the secondary sides of SVR 23a to SVR 23c are controlled to fall within their respective appropriate ranges also during the time period from time t3 to time t4. Then, at time t4, when solar radiation abruptly changes and the electric power generated by solar cell 1 in each of town A 100a and town B 100b returns to the state before time t0, the voltages in SVR 23a to SVR 23c rise (see (b), (e) and (h)). Thereby, each distributed power supply outputs reactive power to control the system voltage, but the voltage on the secondary side of SVR 23b does not fall within the appropriate range, and the tap position in SVR 23b changes at time t5 and returns to the position located at and before time t0, i.e., before solar radiation abruptly changes.

After the tap changing in SVR 23b, system voltage change factor determination circuit 2102 determines that the change in the system AC voltage (effective voltage) is a voltage change caused by the tap changing in SVR 23b. Then, as described above, in the present first embodiment, the distributed power supplies in town A 100a, town B 100b, and town D 100d, mega-solar power conversion device 27, and distribution system storage battery power conversion device 29 maintain the reactive current command value from reactive current command value computing circuit 20925 (FIG. 13) at the value appearing during tap changing in SVR 23b (see (f) and (i)). Thereby, the voltages on the secondary sides of SVR 23a to SVR 23c are controlled to fall within their respective appropriate ranges (see (b), (e) and (h)).

As described above, according to the present first embodiment, occurrence of unnecessary tap changing in SVR 23 (in the above description, tap changing in SVR 23c with respect to the comparative example) can be suppressed, for example, when solar radiation abruptly changes repeatedly in a short time period. As a result, degradation in SVR 23 caused by unnecessary tap changing can be suppressed.

<Description of Control Process of Storage Battery Power Conversion Device 4>

Then, the operation of storage battery power conversion device 4 will be described. Referring again to FIG. 4, storage battery power conversion device 4 normally operates based on the operation plan given from HEMS 7. Specifically, in the present first embodiment, storage battery power conversion device 4 operates in four types of operation modes including: a "power selling priority mode" for selling the electric power generated by solar cell 1 to the greatest possible extent; a "charge priority mode" for charging with surplus electric power of the electric power generated by solar cell 1; a "peak cut mode" for suppressing the selling electric power to be equal to or less than a predetermined upper limit value; and a "standby mode" for performing only collection of the results of measurement by various types of sensors and periodical communication of measurement data. The standby mode is characterized by extremely small power consumption.

When the power supply is turned on, storage battery power conversion device 4 is started in the standby mode and then operates in the standby mode until it receives an operation plan from HEMS 7. In the standby mode, storage battery power conversion device 4 collects various types of sensor information and performs only reception of the dead zone width information from HEMS 7 and transmission of the results of measurement by various types of sensors to HEMS 7.

Figure 32:
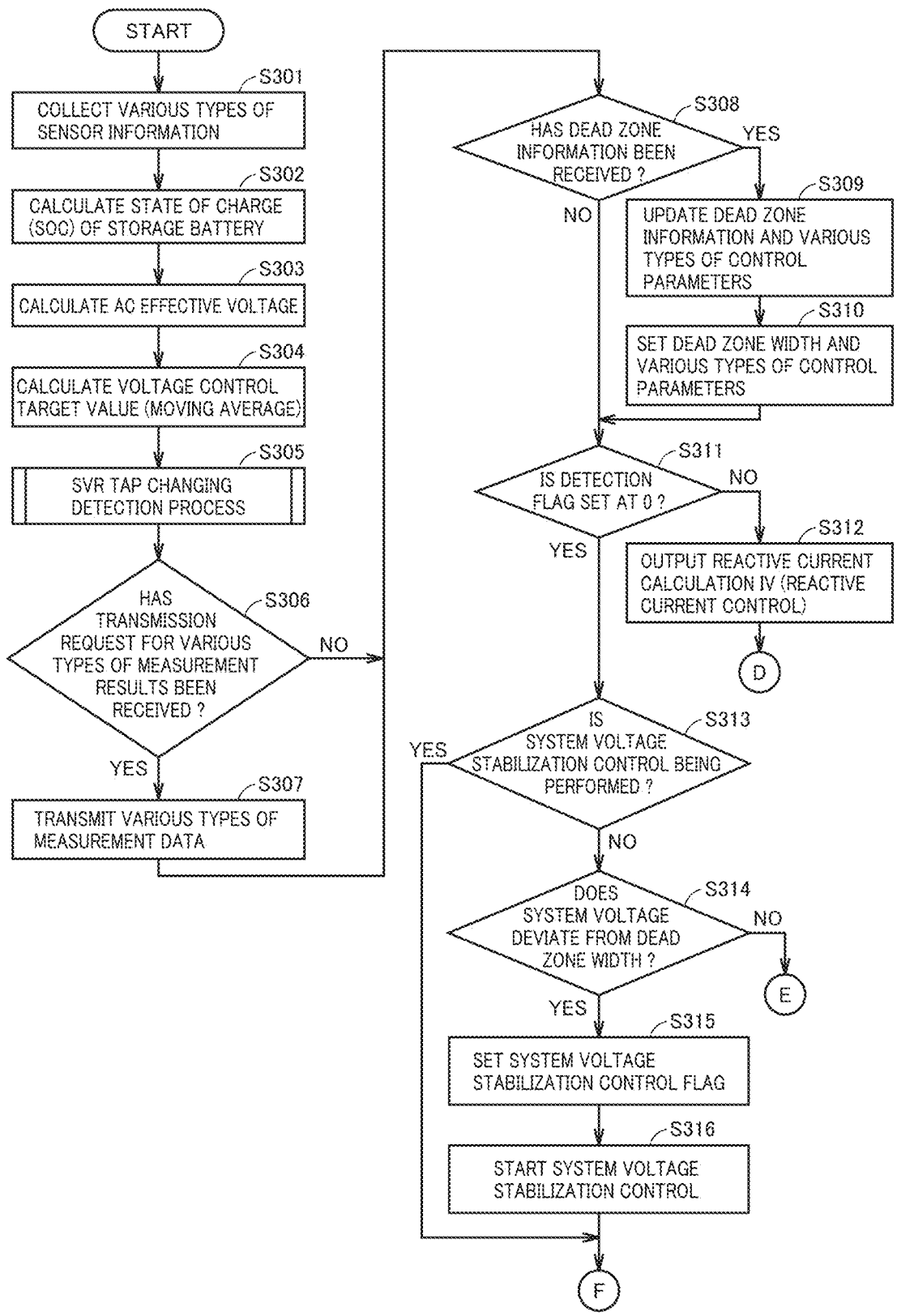
FIG. 32 is a first flowchart illustrating a control process of the storage battery power conversion device according to the first embodiment.
Figure 33:
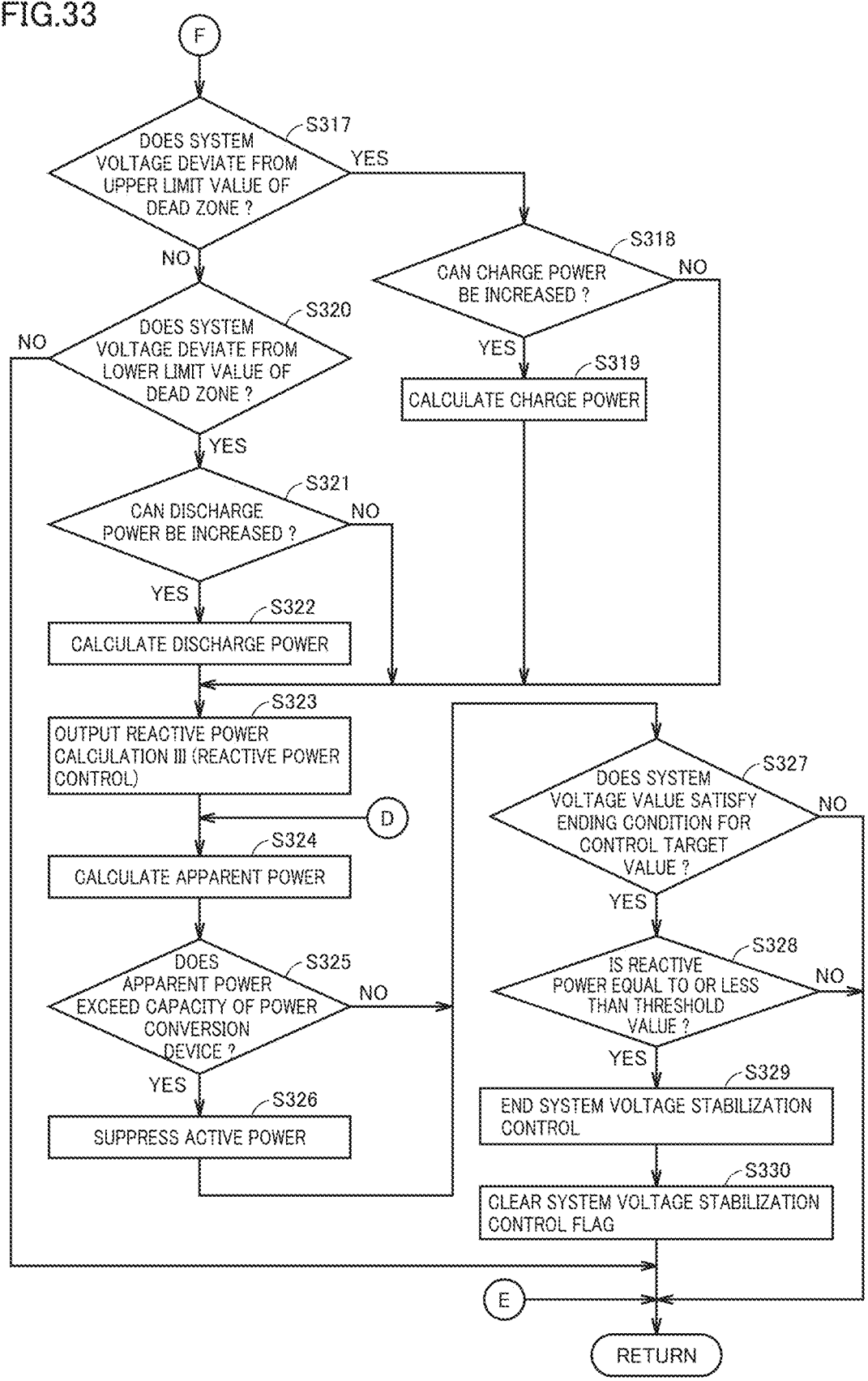
FIG. 33 is a second flowchart illustrating a control process of the storage battery power conversion device according to the first embodiment.

FIGS. 32 and 33 each are a flowchart illustrating a control process of storage battery power conversion device 4 according to the first embodiment. The steps shown in FIGS. 32 and 33 are continuously performed by third control circuit 404 and fourth control circuit 409 during the operation of storage battery power conversion device 4.

Referring to FIGS. 4, 7, and 8 together with FIG. 32, when storage battery power conversion device 4 is started, various types of sensor information is collected (S301). Specifically, the voltage and the current of storage battery 3 that are respectively measured by voltmeter 401 and ammeter 402, and the DC bus voltage on DC bus 405 collected by voltmeter 406 are input into seventh control circuit 4044, charge control circuit 4041, and discharge control circuit 4042 in third control circuit 404. Further, the current flowing through DC bus 405 and measured by ammeter 407, and the result of measuring the AC current flowing through the consumer premises distribution system and measured by ammeter 411 are input into eighth control circuit 4097 in fourth control circuit 409. Further, the AC voltage in consumer premises distribution system 10 that is measured by voltmeter 410 is input into effective voltage calculation circuit 4098 and phase detection circuit 4091 in fourth control circuit 409.

When collection of the results of measurement by various types of sensors ends, seventh control circuit 4044 calculates the charge/discharge power from storage battery 3 based on the sensor information output from voltmeter 401 and ammeter 402, and calculates a state of charge (SOC) of storage battery 3 (S302). In the description of the present first embodiment, the SOC of storage battery 3 is calculated in seventh control circuit 4044, but calculation of the SOC of storage battery 3 can be performed by any elements. For example, the SOC may be calculated by a battery management unit (BMU) (not shown) provided in storage battery 3, and seventh control circuit 4044 may receive the calculation result from the BMU.

When the charge/discharge power from storage battery 3 and the SOC of storage battery 3 are calculated, seventh control circuit 4044 notifies eighth control circuit 4097 in fourth control circuit 409 about the calculation result. Phase detection circuit 4091 detects the zero-cross point of the AC voltage measured by voltmeter 410, and outputs the detection result to reactive current control circuit 4092, reactive current waveform generation circuit 4093, active current control circuit 4094, active current waveform generation circuit 4095, eighth control circuit 4097, effective voltage calculation circuit 4098, voltage control target value generation circuit 4099, and system voltage monitoring circuit 4101.

Effective voltage calculation circuit 4098 calculates the AC effective voltage in the distribution system based on the input AC voltage (S303). Effective voltage calculation circuit 4098 can be formed in the same configuration as that of effective voltage calculation circuit 2098 shown in FIG. 9. The AC effective voltage in consumer premises distribution system 10 that is calculated by effective voltage calculation circuit 4098 is input into reactive current control circuit 4092, active current control circuit 4094, eighth control circuit 4097, voltage control target value generation circuit 4099, and system voltage monitoring circuit 4101.

Upon reception of the AC effective voltage, voltage control target value generation circuit 4099 calculates the voltage control target value of storage battery power conversion device 4 (S304). The configuration and the operation of voltage control target value generation circuit 4099 are the same as those of voltage control target value generation circuit 2099 shown in FIG. 10. In other words, voltage control target value generation circuit 4099 sequentially calculates the moving average value of the AC effective voltage for a certain time period (for example, 1 minute) in consumer premises distribution system 10 that is calculated by effective voltage calculation circuit 4098. Then, voltage control target value generation circuit 4099 outputs the calculation result as the voltage control target value of consumer premises distribution system 10 to reactive current control circuit 4092, active current control circuit 4094, and eighth control circuit 4097.

When the voltage control target value is calculated, a tap changing detection process is performed for detecting whether tap changing in SVR 23 occurs or not (S305). The method of detecting tap changing in SVR 23 and the operation of each circuit related thereto are the same as those in solar cell power conversion device 2, and therefore, the description thereof will not be repeated.

When the process of detecting tap changing in SVR 23 is performed, eighth control circuit 4097 in fourth control circuit 409 checks communication interface circuit 412 whether a transmission request for the measurement result has been received or not from HEMS 7 (S306). When the transmission request has been received (YES in S306), eighth control circuit 4097 transmits, through communication interface circuit 412 to HEMS 7, the charge/discharge power of storage battery 3, the SOC of storage battery 3, the AC effective voltage in the distribution system, the voltage control target value, and as in solar cell power conversion device 2, the result of measuring the output time of reactive power, the result of measuring the reactive power control amount, the output active power amount, and the information of the time during which the output is suppressed (S307). After transmission of various pieces of measurement data in S307, the result of measuring the output time of reactive power, the result of measuring the reactive power control amount, the output active power amount, and the information of the time during which the output is suppressed (suppression of discharge power or increasing of the charge power) are cleared once.

Then, eighth control circuit 4097 checks whether the dead zone width information has been received or not from HEMS 7 (S308). When the dead zone width information has been received (YES in S308), eighth control circuit 4097 updates the dead zone width information, threshold value VCOM used in absolute value comparison circuit 21023, the threshold value (the count time period) compared with the count value of the counter, and the like (S309).

When various pieces of information such as dead zone width information are updated, dead zone table generation circuit 4100 generates a dead zone table based on the information output from eighth control circuit 4097. Further, eighth control circuit 4097 sets various control parameters such as threshold value VCOM in absolute value comparison circuit 21023 and the threshold value (the count time period) of the counter, which have been received together with the dead zone width information (S310).

When it is determined in S308 that the dead zone width information has not been received, or when the dead zone width (dead zone table) and various control parameters are set in S310, absolute value comparison circuit 21023 determines whether the SVR tap changing detection flag is 0 or not (S311). When it is determined that the detection flag is set at 1 (NO in S311), reactive current control circuit 4092 performs an output reactive current calculation process IV (S312). Output reactive current calculation process IV is the same as output reactive current calculation process II described with regard to the control process of solar cell power conversion device 2, and therefore, the description thereof will not be repeated. When output reactive current calculation process IV is performed, the process is shifted to S324 (described later) in FIG. 33.

On the other hand, when it is determined in S311 that the detection flag is set at 0 (YES in S311), eighth control circuit 4097 checks based on the flag value stored in the register (not shown) whether second DC/AC conversion circuit 408 performs system voltage stabilization control (S313). When the system voltage stabilization control is being performed (YES in S313), the process is shifted to S317 (described later) in FIG. 33. On the other hand, when the system voltage stabilization control is not being performed (NO in S313), eighth control circuit 4097 determines whether or not the AC effective voltage in consumer premises distribution system 10 deviates from the dead zone voltage range set in S310 (S314).

When the AC effective voltage does not deviate from the dead zone voltage range (NO in S314), the series of subsequent steps are not performed, and the process is shifted to return (FIG. 33). In other words, while the AC effective voltage in consumer premises distribution system 10 is in the dead zone voltage range, the process in S301 to S314 is repeated without performing the system voltage stabilization control.

On the other hand, when it is determined in S314 that the AC effective voltage (in consumer premises distribution system 10) deviates from the dead zone voltage range (YES in S314), eighth control circuit 4097 sets a system voltage stabilization control flag in a register (not shown) (S315), and starts system voltage stabilization control (S316).

Referring to FIGS. 4, 7, and 8 together with FIG. 33, when the system voltage stabilization control is started in S316 in FIG. 32, or when it is determined in S313 that the system voltage stabilization control is being performed (YES in S313), eighth control circuit 4097 checks whether or not the AC effective voltage in consumer premises distribution system 10 deviates from the upper limit value of the dead zone width (S317).

When it is determined that the AC effective voltage deviates from the upper limit value of the dead zone width (YES in S317), eighth control circuit 4097 checks seventh control circuit 4044 for the currently operating state (charge/discharge/standby). At this time, eighth control circuit 4097 also checks the charge/discharge power in storage battery 3. Thereby, eighth control circuit 4097 checks whether the charge power of storage battery 3 can be increased or not (S318).

When storage battery 3 is discharged or when the charge power can be increased (YES in S318), eighth control circuit 4097 calculates the charge/discharge power (S319) and notifies seventh control circuit 4044 about the calculation result. When seventh control circuit 4044 receives the calculation result of the charge/discharge power, and when storage battery 3 is discharged, seventh control circuit 4044 notifies discharge control circuit 4042 about the received result of discharge power as a discharge power target value. Thereby, discharge control circuit 4042 controls the discharge power from storage battery 3 based on the discharge power target value.

On the other hand, when storage battery 3 is discharged but eighth control circuit 4097 notifies seventh control circuit 4044 about the charge power, then in S319, seventh control circuit 4044 instructs discharge control circuit 4042 to stop the discharge control and notifies charge control circuit 4041 about the charge power target value. Upon reception of the charge power target value, charge control circuit 4041 starts to control charging of storage battery 3 based on the charge power target value. In this case, seventh control circuit 4044 outputs a control signal for selecting the output of charge control circuit 4041 to switching circuit 4043.

In the present first embodiment, the above-mentioned solar cell power conversion device 2 prioritizes the output of reactive power in order to minimize suppression of the electric power generation by solar cell 1. Also, when the system voltage cannot be suppressed to fall within an appropriate range even by the reactive power control, solar cell power conversion device 2 suppresses the active power. On the other hand, when the AC effective voltage in consumer premises distribution system 10 exceeds the upper limit voltage value of the dead zone width, storage battery power conversion device 4 suppresses the discharge power from storage battery 3. Specifically, when storage battery 3 is discharged, discharge power is suppressed or discharging is switched to charging. In particular, by switching from discharging to charging, the reverse direct current of the active power as a main cause of an increase in system voltage is suppressed, so that an increase in system voltage can be suppressed. Thereby, suppression of electric power generation by solar cell 1 and output from solar cell power conversion device 2 can be minimized while unnecessary discharge from storage battery 3 can be suppressed. As a result, the electric power generated by solar cell 1 can be efficiently used.

On the other hand, when it is determined in S317 that the AC effective voltage does not deviate from the upper limit value of the dead zone width (NO in S317), eighth control circuit 4097 checks whether the AC effective voltage in consumer premises distribution system 10 deviates or not from the lower limit value of the dead zone width (S320). When the AC effective voltage does not deviate from the lower limit value (NO in S320), the series of subsequent steps are not performed, and the process is shifted to return.

When it is determined in S320 that the AC effective voltage deviates from the lower limit value of the dead zone width (YES in S320), eighth control circuit 4097 checks seventh control circuit 4044 for the currently operating state (charge/discharge/standby). At this time, eighth control circuit 4097 also checks the charge/discharge power of storage battery 3. Thereby, eighth control circuit 4097 checks whether the discharge power of storage battery 3 can be increased or not (S321).

When storage battery 3 is being charged or when the discharge power can be increased (YES in S321), eighth control circuit 4097 calculates the charge/discharge power (S322), and notifies seventh control circuit 4044 about the calculation result. When seventh control circuit 4044 receives the calculation result of the charge/discharge power, and when storage battery 3 is being discharged, seventh control circuit 4044 notifies discharge control circuit 4042 about the received result of discharge power as a discharge power target value. Discharge control circuit 4042 controls the discharge power from storage battery 3 based on the received discharge power target value.

On the other hand, when seventh control circuit 4044 receives an instruction from eighth control circuit 4097 to suppress the charge power in the state where storage battery 3 is being charged, seventh control circuit 4044 instructs charge control circuit 4041 to perform charge control based on the charge power target value received from eighth control circuit 4097. Charge control circuit 4041 controls second DC/DC conversion circuit 403 based on the received charge power target value.

When seventh control circuit 4044 receives an instruction from eighth control circuit 4097 to perform discharging in the state where storage battery 3 is being charged, seventh control circuit 4044 instructs charge control circuit 4041 to stop the charge control and notifies discharge control circuit 4042 about the discharge power target value. Upon reception of the discharge power target value, discharge control circuit 4042 starts the discharge control of storage battery 3 based on the discharge power target value. In this case, seventh control circuit 4044 outputs a control signal for selecting the output of discharge control circuit 4042 to switching circuit 4043.

When it is determined as NO in S318, when S319 is performed, when it is determined as NO in S321, or when step S322 is performed, eighth control circuit 4097 performs an output reactive power calculation process III (S323).

Specifically, as in solar cell power conversion device 2, storage battery power conversion device 4 performs reactive power (reactive current) control in order to suppress the AC effective voltage in consumer premises distribution system 10 to fall within the dead zone width range. Since the operation of reactive current control circuit 4092 in fourth control circuit 409 is the same as the operation of reactive current control circuit 2092 in the normal state in solar cell power conversion device 2, the description of the operation will not be repeated.

When the process in S312 in FIG. 32 is performed or when the process in S323 is performed, eighth control circuit 4097 calculates the apparent power from the current command value output from apparent current limiter circuit 4103 (S324). Then, eighth control circuit 4097 determines whether or not the calculated apparent power exceeds the capacity of storage battery power conversion device 4 (S325).

When it is determined that the apparent power exceeds the capacity of storage battery power conversion device 4 (YES in S325), eighth control circuit 4097 performs a process for suppressing the active power (S326).

Specifically, referring again to FIG. 8, the output from adder 4096 is input into apparent current limiter circuit 4103 as in solar cell power conversion device 2. Apparent current limiter circuit 4103 limits the amplitude when the current command value output from adder 4096 exceeds a threshold value. The output from apparent current limiter circuit 4103 is input into eighth control circuit 4097. Then, eighth control circuit 4097 calculates electric power. When the calculated electric power exceeds the power capacity of second DC/AC conversion circuit 408, eighth control circuit 4097 further limits the current command value.

In the present first embodiment, the active power is suppressed by limiting the output of active current waveform generation circuit 4095. At this time, eighth control circuit 4097 instructs seventh control circuit 4044 to reduce the charge/discharge power. Seventh control circuit 4044 having received the instruction instructs charge control circuit 4041 or discharge control circuit 4042 to reduce the charge/discharge power amount. In this case, the charging operation is not shifted to the discharging operation or the discharging operation is not shifted to the charging operation.

When the process in S326 is performed, or when it is determined in S325 that the apparent power does not exceed the capacity of storage battery power conversion device 4 (NO in S325), eighth control circuit 4097 checks the condition for ending the system voltage stabilization control (S327). Specifically, eighth control circuit 4097 checks whether or not the present value of the AC effective voltage in consumer premises distribution system 10 falls within the dead zone width.

When it is determined as NO in S327, the process is shifted to return, and then, the system voltage stabilization control is continued. On the other hand, when it is determined as YES in S327, eighth control circuit 4097 determines whether or not the measurement result of the reactive power received from the reactive power measurement circuit in reactive current waveform generation circuit 4093 is equal to or less than a threshold value (end determination value) (S328). When the measurement result of the reactive power is greater than the end determination value (NO in S328), the process is shifted to return, and then, the system voltage stabilization control is continued.

On the other hand, when it is determined in S328 that the measurement result of the reactive power is equal to or less than the end determination value (YES in S328), eighth control circuit 4097 ends the system voltage stabilization control (S329), and clears the system voltage stabilization control flag (S330).

In this way, in the present first embodiment, the command value calculated by first control circuit 204 is input into first DC/DC conversion circuit 203 and used for controlling the output voltage of solar cell 1 so as to extract the electric power generated by solar cell 1. Similarly, the command value calculated by second control circuit 209 is input into first DC/AC conversion circuit 208 and used for controlling conversion such that the electric power generated by solar cell 1 and output from first DC/DC conversion circuit 203 is converted into AC power. As a result, the electric power generated by solar cell 1 is output as AC power to consumer premises distribution system 10.

Similarly, the command value calculated by third control circuit 404 is input into second DC/DC conversion circuit 403, and used for controlling the charge/discharge power for storage battery 3. The command value calculated by fourth control circuit 409 is input into second DC/AC conversion circuit 408 and used for controlling conversion such that the charge/discharge power of storage battery 3 output from second DC/DC conversion circuit 403 is converted into AC power. As a result, the electric power output from storage battery 3 is eventually output as AC power to consumer premises distribution system 10.

Figure 34:
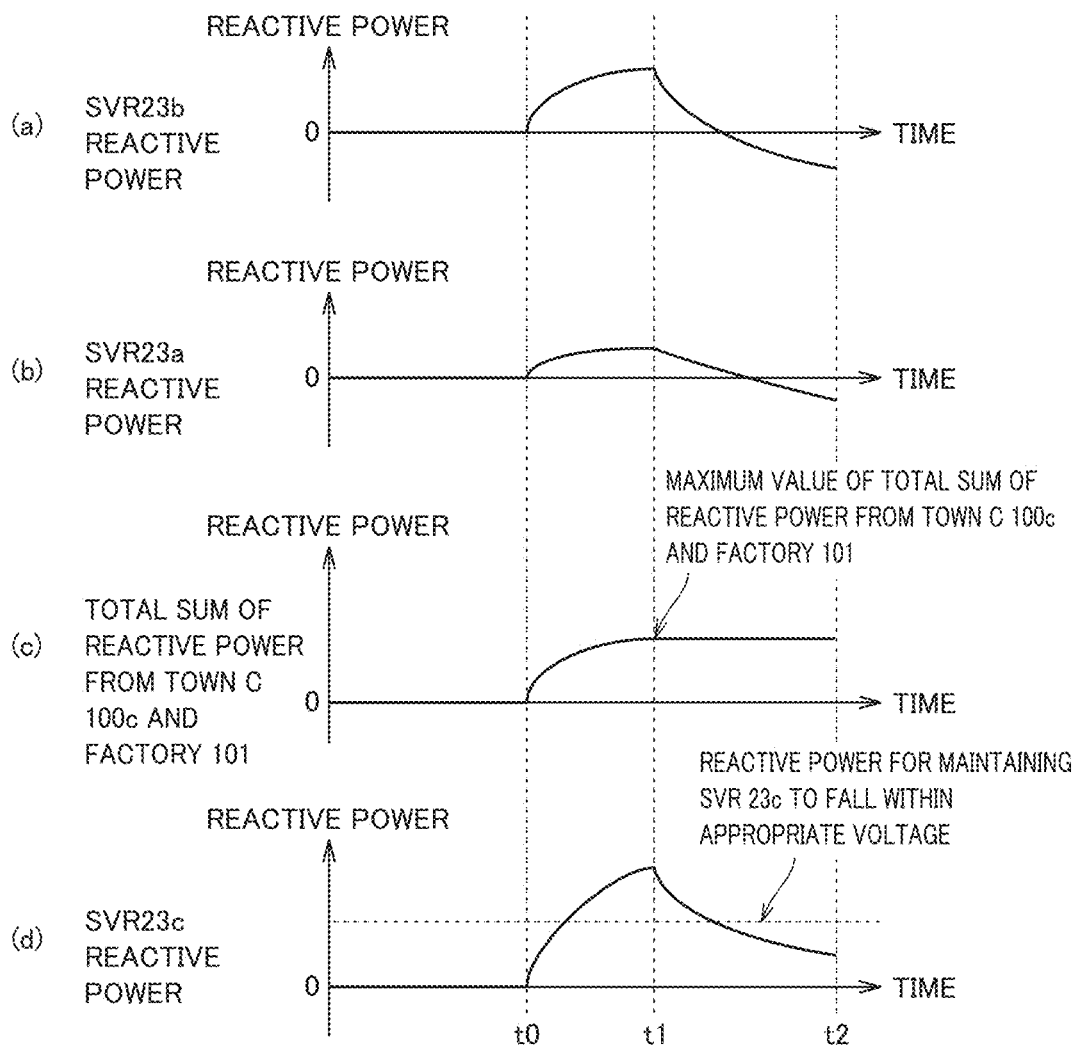
FIG. 34 is a diagram for specifically illustrating the operations of the distributed power supply and the distribution system facility in the comparative example.
Figure 35:
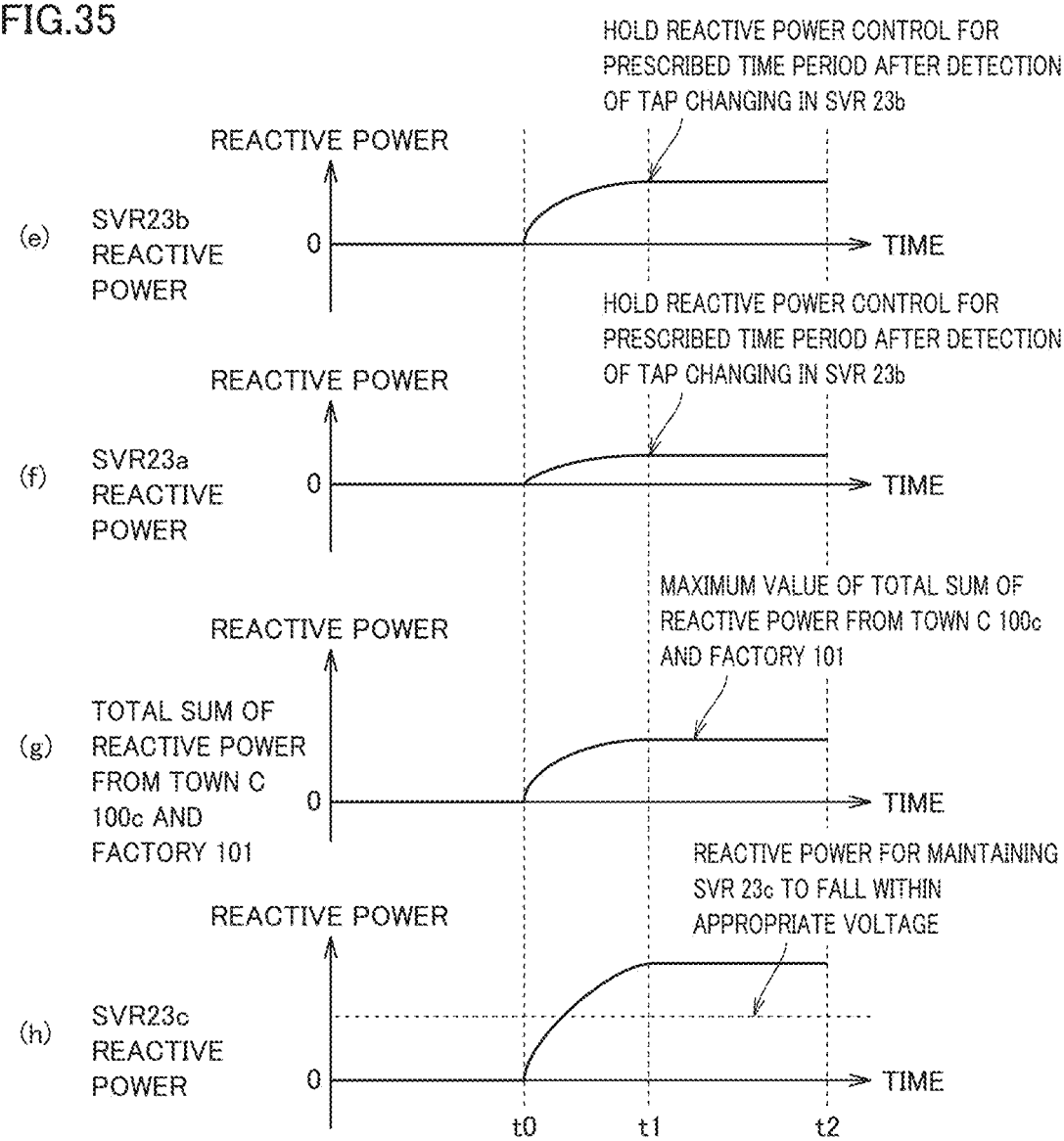
FIG. 35 is a diagram for specifically illustrating the operations of the distributed power supply and the distribution system facility in the first embodiment.

Then, the operations of the distributed power supply and the distribution system facility in the present first embodiment will be described in greater detail with reference to FIGS. 34 and 35. FIGS. 34 and 35 correspond to the above-mentioned FIGS. 29 and 30, respectively. FIGS. 34 and 35 show: the reactive power flowing through SVR 23*a* to SVR 23*c* at time t0 to time t2 in the timing charts shown in FIGS. 29 and 30; and the total value of the reactive power output from town C 100*c* and factory 101. Specifically, FIG. 34 shows a change in reactive power in a comparative example, and FIG. 35 shows a change in reactive power in the present first embodiment.

Referring to FIG. 34, in the distribution system shown in FIG. 1, reactive power (see (a)) flowing through SVR 23*b* is the total value of reactive power (see (b)) flowing through SVR 23*a* and reactive currents output from town A 100*a* and town B 100*b*. More precisely, due to tap changing in SVR 23*b*, the power flow changes, so that the flowing reactive power slightly changes, and also, there is reactive power partially flowing through the load and the like in each of town A 100*a* and town B 100*b*. In this case, however, the change in reactive power will not be explained for the sake of clarity of description.

Similarly, the reactive power flowing through SVR 23*c* (see (d)) is the total value of the reactive power flowing through SVR 23*b* and the reactive power output from town C 100*c* and factory 101 (see (c)). As shown in the figure, in the comparative example, the voltage on the secondary side of SVR 23*c* cannot be controlled to fall within an appropriate range due to the influence of reactive power flowing through SVR 23*b* even though the maximum reactive power is output from town C 100*c* and factory 101.

Referring to FIG. 35, in the present first embodiment, after the tap changing in SVR 23*b* at time t1, the reactive power output from each of town A 100*a* and town B 100*b* and the reactive power output from each of town D 100*d*, mega-solar power conversion device 27, and distribution system storage battery power conversion device 29 are maintained. Thereby, the voltage on the secondary side of SVR 23*c* can be suppressed to fall within an appropriate range by the reactive power output from each of town C 100c and factory 101 (see (g)). As a result, unnecessary tap changing in SVR 23c can be suppressed.

Note that mega-solar power conversion device 27 and distribution system storage battery power conversion device 29 operate in the same manner as with solar cell power conversion device 2 and storage battery power conversion device 4, respectively, and therefore, the description thereof will not be repeated.

As described above, in the distributed power supply system to which the power conversion device according to the present first embodiment is applied, the system voltage stabilization control method is changed between: the case where the distribution system voltage (consumer premises distribution system 10 or distribution system 14) changes to temporarily rise or lower due to an abrupt change in solar radiation or an abrupt change in load; and the case where the distribution system voltage changes due to tap changing in SVR 23 or the like, and therefore, the system voltage can be stabilized using the distributed power supply in each consumer house. Thereby, the distribution system voltage stabilization facilities such as SVR 23 do not have to be unnecessarily operated. For example, when the SVR is used, deterioration in the SVR can be suppressed without unnecessarily increasing the number of times of tap changing.

Further, in the present first embodiment, since the distributed power supply on the consumer side is used, the distribution system voltage can be stabilized without having to introduce system stabilization facilities such as an expensive SVC. Specifically, the conventional automatic voltage regulator (SVR) disposed in distribution system 24 (on the primary side of pole-mounted transformer 9) is utilized to regulate the voltage fluctuations in a long cycle by the automatic voltage regulator (SVR). In contrast, for the voltage fluctuations in a short cycle resulting from an abrupt change in solar radiation or load fluctuations, a distributed power supply (power conversion device) in each consumer house 18 controls the active power and/or the reactive power. Thereby, the system voltage can be stabilized without having to introduce new system stabilization facilities. Also, the storage battery for a distribution system that is introduced for stabilizing the distribution system voltage is operated in cooperation and coordination with storage battery 3 on the consumer side, so that the storage battery can be reduced in capacity.

Further, by setting the dead zone width information for each consumer based on the impedance information about the distribution system, prediction of the power generation amount from solar cell 1 and the result of predicting the power consumption of the load, system voltage stabilization control by the distributed power supplies in respective consumer houses 18 can be started at the same timing and ended at the same timing. This can consequently prevent a burden from differing among the consumers due to the difference in interconnection point among the consumers' distribution systems.

Second Embodiment

In the description of the first embodiment, when a change in system AC voltage (effective voltage) caused by SVR 23 is detected, reactive current control circuits 2092 and 4092 in solar cell power conversion device 2, storage battery power conversion device 4, mega-solar power conversion device 27, and distribution system storage battery power conversion device 29 maintain, for a prescribed time period, the reactive current command value that is set when a change in system AC voltage (effective voltage) caused by SVR 23 is detected (immediately before or immediately after the detection).

In the present second embodiment, when a change in system AC voltage (effective voltage) caused by SVR 23 is detected, the control parameters (control gain and the like) for reactive current command value computing circuit 20925 in each of reactive current control circuits 2092 and 4092 are changed for a prescribed time period. Specifically, the responsiveness of the reactive current control performed in reactive current command value computing circuit 20925 is delayed (for example, the response time is set to be about ten times to several tens of times longer than the response time in the normal control), to thereby suppress an abrupt change in output of the reactive power after the tap changing in SVR 23.

The outline of the operation of a power conversion device according to the present second embodiment will be described below with reference to FIGS. 18 and 36.

Figure 36:
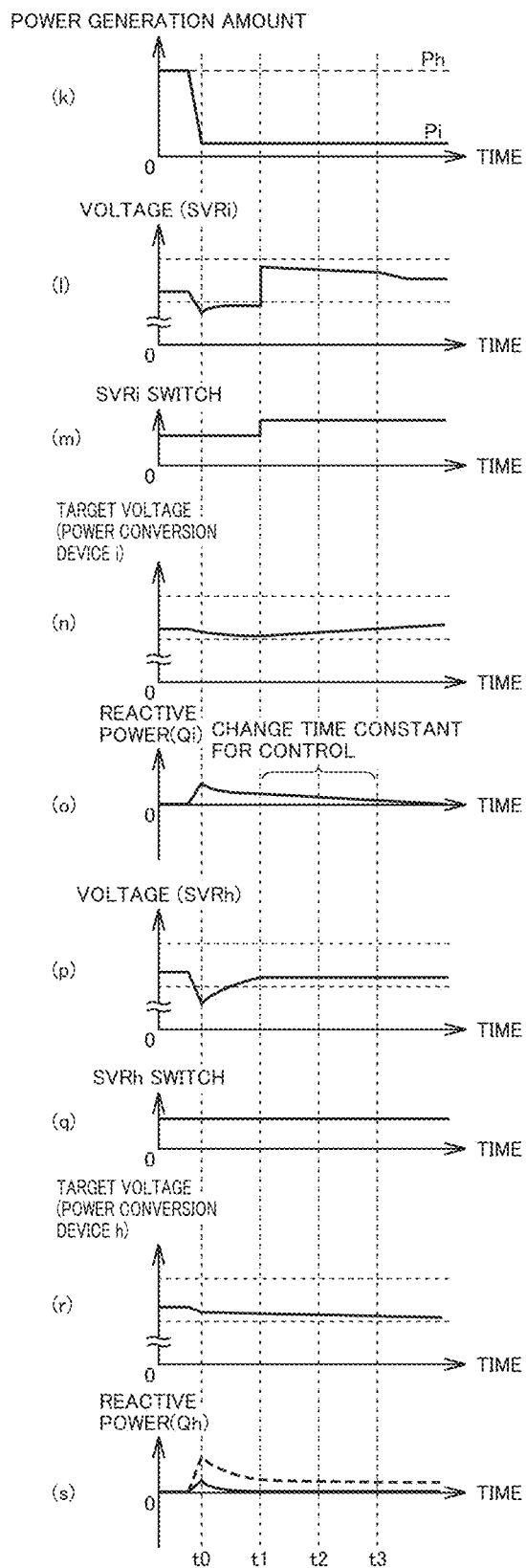
FIG. 36 is a timing chart showing operations of a distributed power supply and a distribution system facility in a second embodiment in the configuration shown in FIG. 18.

FIG. 36 is a timing chart showing operations of a distributed power supply and a distribution system facility in the second embodiment in the configuration shown in FIG. 18. FIG. 36 corresponds to FIG. 20 described in the first embodiment, and FIGS. 36(k) to 36(s) respectively correspond to FIGS. 20(k) to 20(s).

Referring to FIG. 36, also in the present example, slightly before time t0, generated electric power Pi of solar cell system 41i decreases and the system voltages on the secondary sides of SVR 23i and SVR 23h decrease. The operation performed until time t1 is the same as that shown in FIGS. 19 and 20, and thus, the description thereof will not be repeated.

Since the system voltage on the secondary side of SVR 23i does not fall within the operational voltage range of SVR 23i at time t1 (see (l)), the tap position in SVR 23i changes (see (m)). When the tap position in SVR 23i changes, the system voltage on the secondary side of SVR 23i rises (see (l)). At this time, the system voltage on the secondary side of SVR 23h is hardly influenced by the tap changing in SVR 23i (see (p)). In fact, the power flow (active power and reactive power) changes due to the tap changing in SVR 23i, but the influence thereof is relatively small if other conditions are the same.

Also in the second embodiment, as in the first embodiment, power conversion device 40 (40i, 40h) determines whether the voltage change in the distribution system is caused by a change in electric power generated by the load, the energy creation device and the like, or caused by tap changing in SVR 23. When it is determined that the voltage change in the distribution system at time t1 is caused by the tap changing in SVR 23i, power conversion device 40i changes the control gain of reactive current command value computing circuit 20925, for example, to a value that is 0.02 times greater than this control gain (50 times greater than the time constant).

In the present example, the control gain is controlled to be 0.02 times greater than that (50 times greater than the time constant) during the time period from time t1 to time t3. Thus, the reactive power output from power conversion device 40i gradually decreases, unlike the movement in the comparative example shown in FIG. 19(f) (see (o)). Thereby, in the comparative example in FIG. 19, power conversion device 40i operates so as to decrease the system voltage in response to the tap changing in SVR 23i at time t1 (see (f)). In contrast, in the present second embodiment, power conversion device 40i operates so as to gradually decrease the reactive power output at time t1 (see (o)), so that the system voltage on the secondary side of SVR 23*h* can be controlled to fall within an appropriate range (the operational voltage range of SVR 23*h*) (see (p)) by the reactive power control by power conversion device 40*h* (see (s)).

Also in the present example, the prescribed time period (time t1 to time t3) during which the control gain (time constant) is changed is approximately twice as long as the dead zone time. The prescribed time period is not limited thereto, but, for example, may be a moving average time (for example, one minute determined by a time constant) obtained when voltage control target value generation circuit 2099 generates a voltage control target value, may be the above-mentioned dead zone time, or may be a time period longer than twice as long as the dead zone time. Note that DSO 21 may notify each distributed power supply about this prescribed time period so as to be set.

By controlling power conversion device 40*i* as described above, the influence on other SVR 23*h* caused by the tap changing in SVR 23*i* can be suppressed, and thus, occurrence of unnecessary tap changing in SVR 23*h* can be suppressed.

The present second embodiment is different from the first embodiment only in the operation performed when a change in system AC voltage (effective voltage) caused by SVR 23 is detected, and therefore, only such a different operation will be described below. Specifically, since the operation of each circuit in each of reactive current control circuit 2092 shown in FIG. 6, reactive current control circuit 4092 shown in FIG. 8, reactive current control circuit 2092 shown in FIG. 13, the operation in S212 shown in FIG. 26, and the operation in S312 shown in FIG. 32 are different from those in the first embodiment, these portions will be mainly described below.

Figure 37:
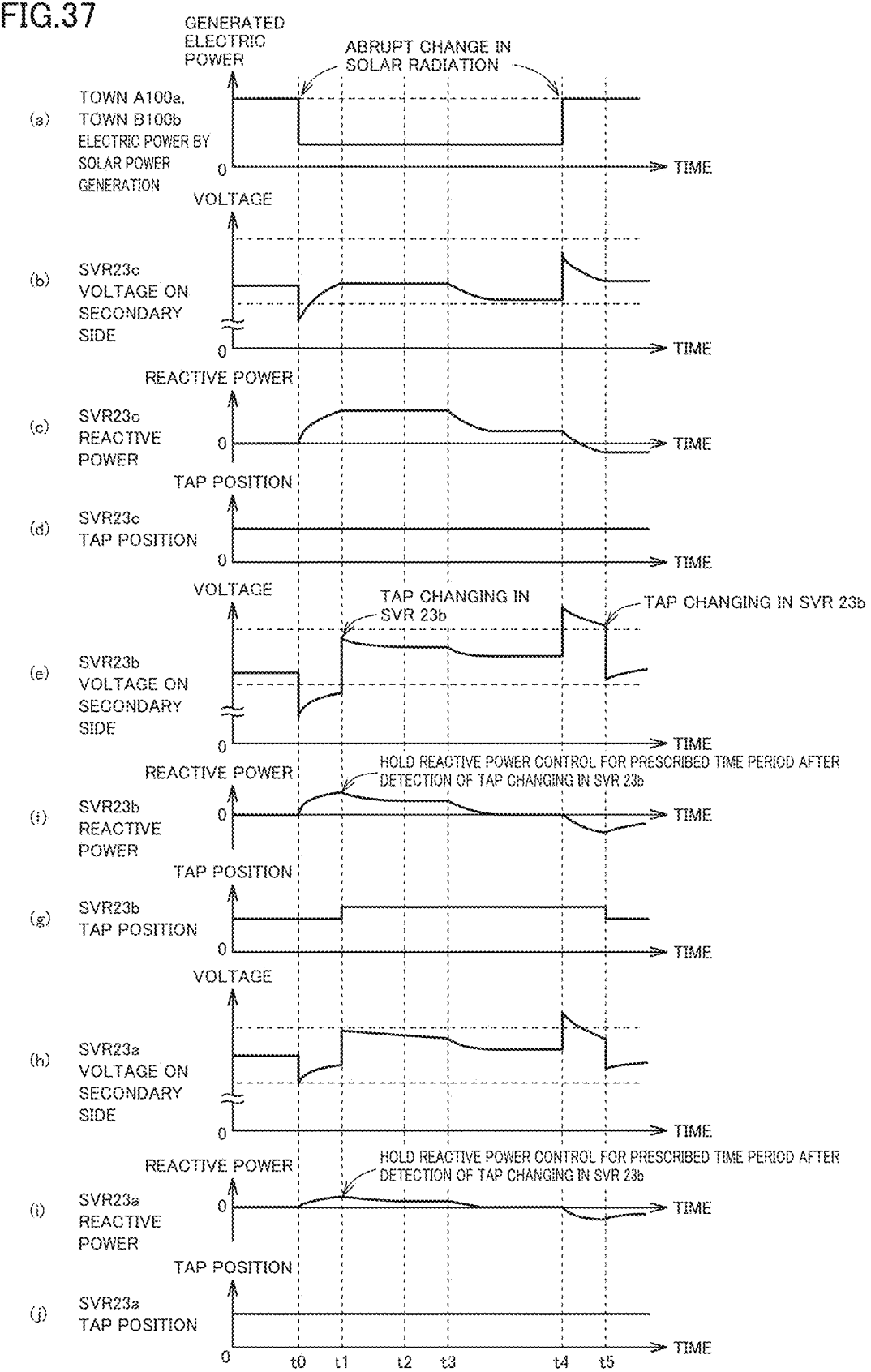
FIG. 37 is a timing chart showing the operation of a distribution system in the second embodiment in the configuration shown in FIG. 1.

The following describes a detailed operation in S212 in FIG. 26 in the present second embodiment with reference to FIGS. 8, 13, and 37. Since the operation of reactive current control circuit 4092 in storage battery power conversion device 4 is the same as that of reactive current control circuit 2092 in solar cell power conversion device 2, only the operation of reactive current control circuit 2092 will be described below (the description of the operation in S312 in FIG. 32 will be omitted).

FIG. 37 is a timing chart showing the operation of the distribution system in the second embodiment in the configuration shown in FIG. 1. FIG. 37 corresponds to FIG. 30 described in the first embodiment, and FIGS. 37(*a*) to 37(*j*) respectively correspond to FIGS. 30(*a*) to 30(*j*).

Referring to FIG. 37, as in FIG. 30, the electric power generated by solar cells 1 in town A 100*a* and town B 100*b* decreases at time t0 due to an abrupt change in solar radiation (see (a)). The same operation as that in the first embodiment shown in FIG. 30 is performed until time t1.

When tap changing in SVR 23*b* occurs at time t1, system voltage change factor determination circuit 2102 compares the change in effective voltage for six cycles of an alternating current (corresponding to 100 ms) with threshold value VCOM. In the present example, the change in effective voltage is then determined to be equal to or greater than threshold value VCOM, the voltage change on the secondary side of SVR 23*b* at time t1 is determined to be a voltage change caused by the tap changing in SVR 23*b*, and then, the SVR tap changing detection flag is set at 1.

In the present second embodiment, when the SVR tap changing detection flag is set at 1, reactive current command value computing circuit 20925 in reactive current control circuit 2092 changes the control parameter set in the normal control state. Specifically, the control parameter is changed to a control parameter (control gain) that is received from sixth control circuit 2097 and that is to be used when a voltage change caused by tap changing in SVR 23 is detected. Also in the present second embodiment, reactive current command value computing circuit 20925 is formed of a proportional-integral control circuit as in the first embodiment. Note that the configuration of computing circuit 20925 is not limited to a proportional-integral control circuit, but may be a proportional control circuit, a proportional-integral-differential control circuit, or any other control circuits.

In general, the dead zone time for tap changing in SVR 23 (the time period from the time point when the voltage on the secondary side of SVR 23 deviates from the operational voltage range to the time point when tap changing starts) is often set to be about 30 seconds to about 90 seconds. In the present second embodiment, the dead zone time of the tap changing in SVR 23 is 45 seconds.

In the present second embodiment, the proportional gain and the integration time of the proportional-integral control circuit in reactive current command value computing circuit 20925 are set to be about 2 seconds as response time in the case of normal control. On the other hand, when the voltage change caused by the tap changing in SVR 23 is detected, the above-mentioned proportional gain and the integration time are set to be about 50 times as long as the response time in the case of normal control. This response time is determined based on the time constant of voltage control target value generation circuit 2099. In the present second embodiment, the moving average value of the effective voltage for one minute is calculated by voltage control target value generation circuit 2099, as in the first embodiment. The response time of the proportional-integral control circuit in reactive current command value computing circuit 20925 is set to be longer than the above-mentioned moving average time (the time constant of the LPF when voltage control target value generation circuit 2099 is formed of the LPF). This allows switching to normal reactive power control after the influence of the system AC voltage significantly changed by the tap changing in SVR 23 (specifically, the influence of the system AC voltage exerted before occurrence of tap changing) is eliminated as much as possible from the voltage control target value generated by voltage control target value generation circuit 2099.

Referring to FIG. 37, when tap changing in SVR 23*b* occurs at time t1, distributed power supplies in town A 100*a*, town B 100*b*, and town D 100*d*, and reactive current command value computing circuit 20925 in each of megasolar power conversion device 27 and distribution system storage battery power conversion device 29, each of which is connected closer to the end side than SVR 23*b*, performs reactive current control while changing the control parameters (proportional gain and integration time) of the proportional-integral control circuit such that the response time is 50 times as long as that in the case of the control parameter adopted in the normal case and received from sixth control circuit 2097 (eighth control circuit 4097). As described above, since SVR 23*c* is hardly influenced by the tap changing in SVR 23*b* (slightly influenced by the change in power flow), the normal control is continued.

Then, the operation of reactive current control circuit 2092 in the present second embodiment will be described again with reference to FIG. 13. When system voltage change factor determination circuit 2102 determines that the change in system AC voltage (effective voltage) is a voltage change caused by the tap changing in SVR 23, in the present second embodiment, target value generation circuit 20921, LPF 20922, subtractor 20923, and dead zone determination circuit 20924 each perform the same operation as that in the normal state.

When it is determined that the change in the system AC voltage (effective voltage) is caused by the tap changing in SVR 23, reactive current command value computing circuit 20925 calculates a reactive current command value (the amplitude of the reactive current) on condition that the voltage deviation output from dead zone determination circuit 20924 is defined as 0. At this time, the control parameters (the proportional gain and the integration time) of the proportional-integral control circuit are changed as described above, and thus, the reactive current command value output from reactive current command value computing circuit 20925 gradually changes (decreases). Thereby, the currents flowing through SVR 23b and SVR 23a gradually decrease as shown in (f) and (i) in FIG. 37.

In the comparative example shown in FIG. 29, the current flowing through each of SVR 23b and SVR 23a significantly changes, and the reactive power is negative at time t2, as shown in (f) and (i) in FIG. 29. On the other hand, in the present second embodiment, the reactive power exhibits a positive value also at time t3 as shown in (f) and (i) in FIG. 37. Thus, the voltage on the secondary side of SVR 23c can be controlled to fall within an appropriate range by the reactive power output from solar cell power conversion device 2 and storage battery power conversion device 4 installed in each of town C 100c and factory 101 (see (b) in FIG. 37). The voltage on the secondary side of each of SVR 23a and SVR 23b is also controlled to fall within an appropriate voltage (see (e) and (h)).

In the above description, reactive current command value computing circuit 20925 is a proportional-integral control circuit, but the present invention is not limited thereto. When reactive current command value computing circuit 20925 is formed of a proportional control circuit, a proportional-integral-differential control circuit, or other control circuits, the same effect can be achieved by changing the proportional gain, the integration time, the differential time, and the like to the control parameters output from sixth control circuit 2097 (eighth control circuit 4097). At this time, the register for the integration circuit and the register for the differentiation circuit are initialized by correcting the currently stored values. Specifically, each register value is initialized, for example, so as to prevent the output from the integration circuit from significantly changing due to a change in the integration time. Also when returning to normal control, each register value is initialized again, for example, so as to prevent the output from the integration circuit from significantly changing due to a change in the integration time.

Referring again to FIG. 37, a voltage change caused by tap changing in SVR 23 is detected at time t1. Then, at time t3 after a lapse of a prescribed time period, the distributed power supplies in town A 100a, town B 100b, and town D 100d, and mega-solar power conversion device 27 and distribution system storage battery power conversion device 29, each of which is connected closer to the end side than SVR 23b, return to normal control.

From times t3 to time t4, the reactive power flowing through each of SVR 23a and SVR 23b converges to zero since the system AC voltage falls within an appropriate voltage range (see (f) and (i)). On the other hand, the voltage on the secondary side of SVR 23c is maintained to fall within the appropriate voltage range only by the reactive power output from each of solar cell power conversion device 2 and storage battery power conversion device 4 installed in each of town C 100c and factory 101 (see (b)). The reactive power output from each of the distributed power supplies in town A 100a, town B 100b, and town D 100d, and mega-solar power conversion device 27, and distribution system storage battery power conversion device 29 decreases, so that the reactive power flowing through SVR 23c decreases (see (c)). Thereby, the voltage on the secondary side of SVR 23c decreases (see (b)) but is controlled to fall within the appropriate voltage range, and therefore, the tap changing in SVR 23 does not occur.

As in the first embodiment, the length of time t1 to time t3 in which the control gain of reactive current command value computing circuit 20925 is changed is set to be longer than the moving average time (for example, 1 minute) in voltage control target value generation circuit 2099 (FIG. 10) or the time constant of voltage control target value generation circuit 2099. Thereby, the voltage control target value output from voltage control target value generation circuit 2099 and the effective voltage value output from effective voltage calculation circuit 2098 become substantially equal to each other (fall within the dead zone), and the reactive power output from the distributed power supply connected closer to the end side than SVR 23b becomes close to 0 (see (f) and (i)). In the reference example in FIG. 29, the reactive power is output in the direction in which the voltage decreases, and thus, the voltage on the secondary side of SVR 23c deviates from the appropriate voltage range.

Then, at time t4, the solar radiation abruptly changes and the electric power generated by solar cell 1 in each of town A 100a and town B 100b returns to the state at and before time t0, and then, the voltages in SVR 23a to SVR 23c rise (see (b), (e) and (h)). Thus, each distributed power supply outputs reactive power to control the system voltage, but the voltage on the secondary side of SVR 23b does not fall within the appropriate range, and the tap position in SVR 23b changes at time t5 and returns to the position located at and before time t0, i.e., before solar radiation abruptly changes.

After the tap changing in SVR 23b, system voltage change factor determination circuit 2102 determines that the change in system AC voltage (effective voltage) is a voltage change caused by the tap changing in SVR 23b. Then, as described above, in the present second embodiment, the control parameters (proportional gain and integration time) in reactive current command value computing circuit 20925 (FIG. 13) are changed in the distributed power supplies in town A 100a, town B 100b, and town D 100d, and in mega-solar power conversion device 27 and distribution system storage battery power conversion device 29. Thereby, the reactive power (reactive current) flowing through each of SVR 23a and SVR 23b is controlled as shown in (f) and (i), and the voltages on the secondary sides of SVR 23a to SVR 23c are controlled to fall within their respective appropriate ranges also at and after time t5 (see (b), (e) and (h)).

By the configuration in the second embodiment as described above, occurrence of unnecessary tap changing in SVR 23 (in the above description, tap changing in SVR 23c with respect to the comparative example) can be suppressed, for example, when solar radiation abruptly changes repeatedly in a short time period. As a result, degradation in SVR 23 caused by unnecessary tap changing can be suppressed.

As described above, the present second embodiment can also achieve the same effect as that achieved by the first embodiment.

Third Embodiment

When a change in the system AC voltage (effective voltage) caused by SVR 23 is detected, it is assumed in the first embodiment that the reactive current command value adopted when this voltage change is detected (immediately before or immediately after the detection) is maintained for a prescribed time period, and it is assumed in the second embodiment that the control parameters (control gain or the like) of reactive current command value computing circuit 20925 are kept changed for a prescribed time period.

In the present third embodiment, when a change in the system AC voltage (effective voltage) caused by SVR 23 is detected, the voltage control target value is changed for a prescribed time period based on the information output from absolute value comparison circuit 21023 in each of system voltage change factor determination circuits 2102 and 4102. Specifically, based on the amount of change in the effective voltage before and after the tap changing in SVR 23, an offset is added to the voltage control target value so as to reduce the deviation between the system voltage after tap changing and the voltage control target value (such that the system voltage falls within the dead zone width of reactive power control), and then, the voltage control target value is maintained at the value added with this offset for a prescribed time period. Thereby, after the tap changing in SVR 23, the reactive power output from power conversion device 40*i* becomes zero, and thus, an abrupt change in the reactive power output after tap changing can be suppressed.

The outline of the operation of a power conversion device according to the present third embodiment will be described below with reference to FIGS. 18 and 38.

Figure 38:
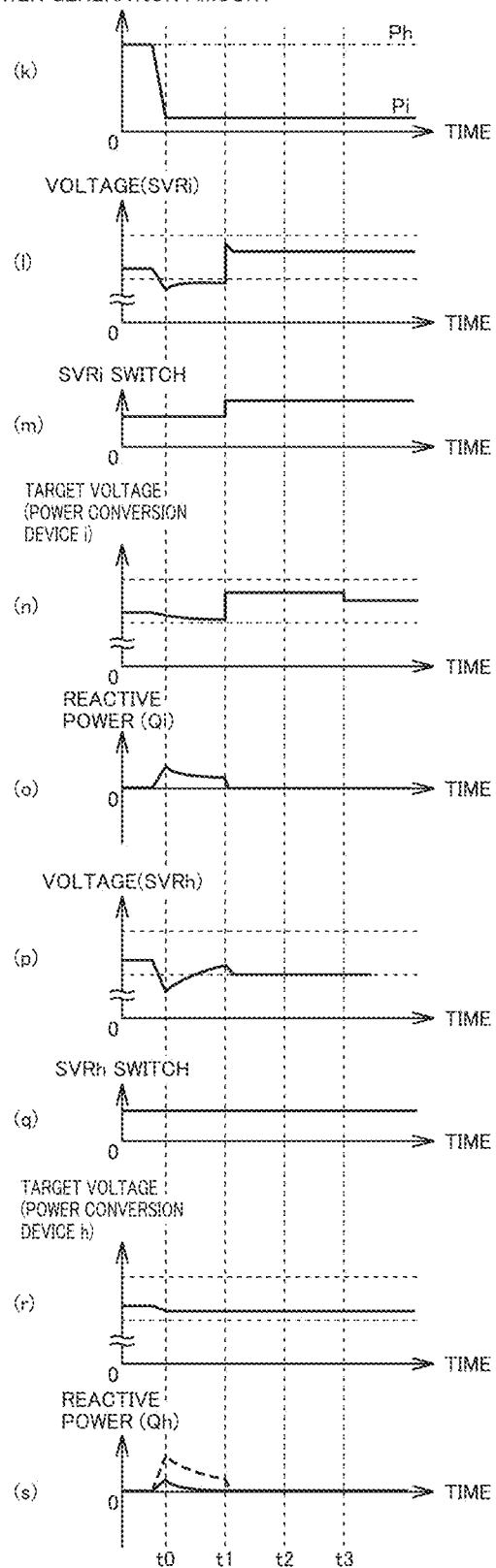
FIG. 38 is a timing chart showing operations of a distributed power supply and a distribution system facility in a third embodiment in the configuration shown in FIG. 18.

FIG. 38 is a timing chart showing operations of a distributed power supply and a distribution system facility in the third embodiment in the configuration shown in FIG. 18. FIG. 38 corresponds to FIG. 20 described in the first embodiment, and FIGS. 38(*k*) to 38(*s*) respectively correspond to FIGS. 20(*k*) to 20(*s*).

Referring to FIG. 38, also in the present example, slightly before time t0, generated electric power Pi of solar cell system 41*i* decreases, and the system voltages on the secondary sides of SVR 23*i* and SVR 23*h* decrease. Since the operation performed until time t1 is the same as that shown in FIGS. 19 and 20, the description thereof will not be repeated.

Since the system voltage on the secondary side of SVR 23*i* does not fall within the operational voltage range of SVR 23*i* at time t1 (see (l)), the tap position in SVR 23*i* changes (see (m)). When the tap position in SVR 23*i* changes, the system voltage on the secondary side of SVR 23*i* rises (see (l)).

Also in the third embodiment, as in the first embodiment, power conversion device 40 (40*i*, 40*h*) determines whether the voltage change in the distribution system is caused by a change in electric power generated by the load, the energy creation device and the like, or caused by tap changing in SVR 23. When it is determined that the voltage change in the distribution system at time t1 is caused by the tap changing in SVR 23*i*, power conversion device 40*i* adds an offset to the voltage control target value (see (n)). Specifically, the offset value of the voltage control target value is calculated from the voltage change on the secondary side of SVR 23*i* such that the system voltage falls within the dead zone width of reactive power control.

In the present example, an offset is added to the voltage control target value during a time period from time t1 to time t3. Thus, the reactive power output from power conversion device 40*i* becomes zero (see (o)). Thereby, in the comparative example in FIG. 19, power conversion device 40*i* operates so as to decrease the system voltage in response to the tap changing in SVR 23*i* at time t1 (see (f)). In contrast, in the present third embodiment, the voltage on the secondary side of SVR 23*h* can be controlled by power conversion device 40*h* without being influenced by the reactive power output from power conversion device 40*i*. In the present example, the reactive power from power conversion device 40*i* becomes zero, and thereby, the system voltage on the secondary side of SVR 23*h* decreases, but still falls within the dead zone range, and therefore, the voltage is maintained as it is (see (p) and (s)).

Also in the present example, the above-mentioned prescribed time period (time t1 to time t3) during which an offset value is added to the voltage control target value is about twice as long as the dead zone time. The prescribed time period is not limited thereto, but, for example, may be a moving average time (for example, one minute determined by a time constant) adopted when voltage control target value generation circuit 2099 generates a voltage control target value, may be the above-mentioned dead zone time, or may be a time period longer than twice as long as the dead zone time. Note that DSO 21 may notify each distributed power supply about this prescribed time period so as to be set.

In the present third embodiment, the length of the time period during which an offset value is added to the voltage control target value (time t1 to time t3) is set to be longer than the moving average time (for example, one minute) in voltage control target value generation circuits 2099 and 4099 or longer than the time constant of voltage control target value generation circuits 2099 and 4099 (see (n)). Thereby, the distribution system voltage rises close to the dead zone voltage range in which power conversion device 40*h* does not perform reactive power control. Therefore, even when the offset value is removed from the target control voltage value, the tap changing in SVR 23*h* and SVR 23*i* does not occur (see (q)), and the control is stably continued also at and after time t3.

By controlling power conversion device 40*i* as described above, the influence on other SVR 23*h* caused by the tap changing in SVR 23*i* can be suppressed, and thus, occurrence of unnecessary tap changing in SVR 23*h* can be suppressed.

The present third embodiment is different from the first embodiment only in the operation performed when a change in system AC voltage (effective voltage) caused by SVR 23 is detected, and therefore, only such a different operation will be described below. Specifically, since the operation of each circuit in each of reactive current control circuit 2092 shown in FIG. 6, reactive current control circuit 4092 shown in FIG. 8, and reactive current control circuit 2092 shown in FIG. 13, the operation in S212 shown in FIG. 26, and the operation in S312 shown in FIG. 32 are different from those in the first embodiment, these portions will be mainly described below.

Figure 39:
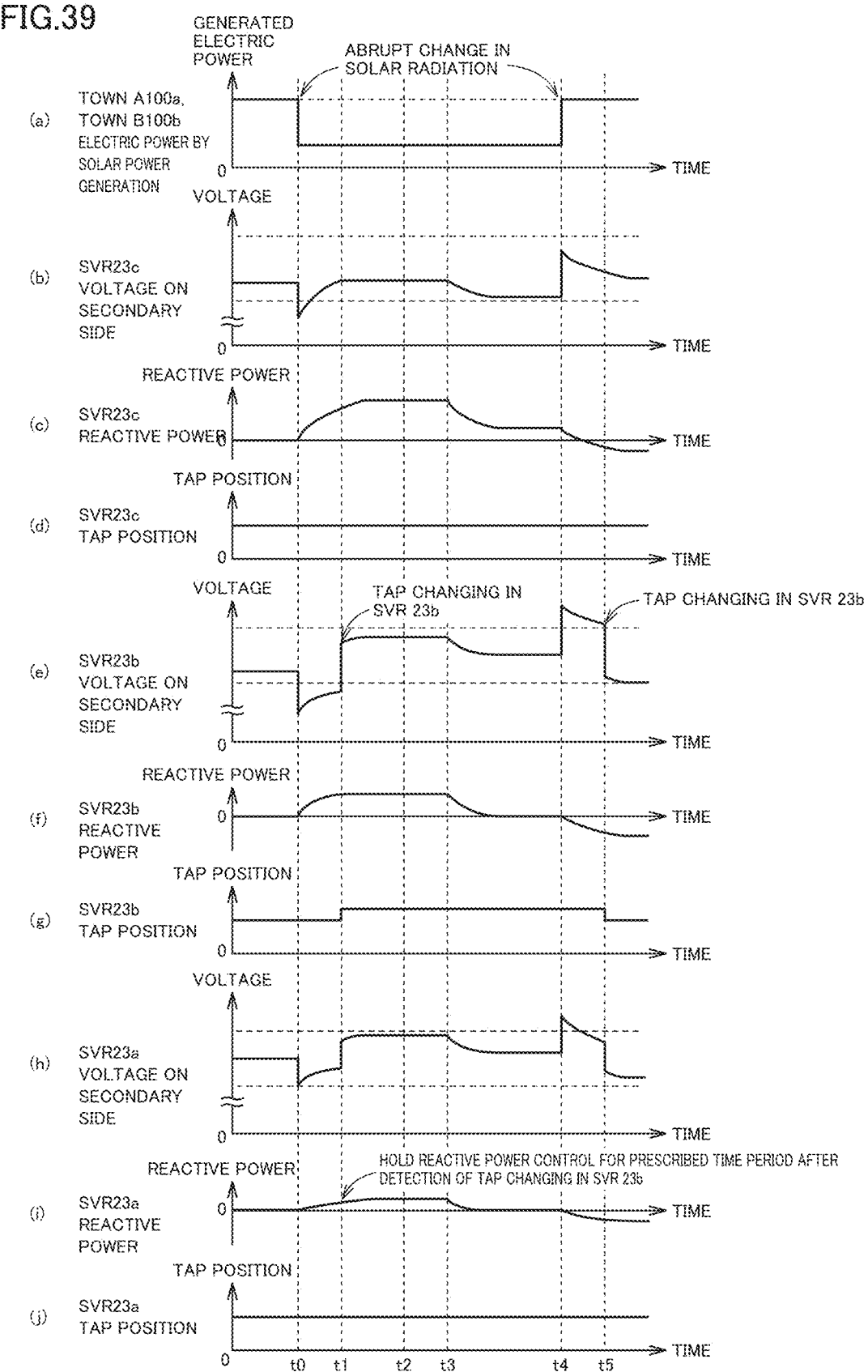
FIG. 39 is a timing chart showing the operation of a distribution system in the third embodiment in the configuration shown in FIG. 1.

FIG. 39 is a timing chart showing the operation of the distribution system in the third embodiment in the configuration shown in FIG. 1. FIG. 39 corresponds to FIG. 30 described in the first embodiment, and FIGS. 39(*a*) to 39(*j*) respectively correspond to FIGS. 30(*a*) to 30(*j*).

Referring to FIG. 39, as in FIG. 30, at time t0, the electric power generated by solar cells 1 in town A 100*a* and town B 100*b* decreases due to an abrupt change in solar radiation (see (a)). The same operation as that in the first embodiment shown in FIG. 30 is performed until time t1.

When tap changing in SVR 23*b* occurs at time t1, system voltage change factor determination circuit 2102 compares the change in effective voltage for six cycles of an alternating current (corresponding to 100 ms) with threshold value VCOM. In the present example, the change in effective voltage is determined to be equal to or greater than threshold value VCOM, the voltage change on the secondary side of SVR 23b at time t1 is determined to be a voltage change caused by the tap changing in SVR 23b, and the SVR tap changing detection flag is set at 1.

In the present third embodiment, when the SVR tap changing detection flag is set at 1, target value generation circuit 20921 in reactive current control circuit 2092 generates a voltage control target value such that the voltage control target value becomes substantially equal to the system AC effective voltage occurring immediately after the voltage change caused by the tap changing in SVR 23b.

Specifically, target value generation circuit 20921 adds the addition value of the AC effective voltage in the time period of six cycles of an alternating current, which is output from absolute value comparison circuit 21023 in system voltage change factor determination circuit 2102, to the voltage control target value adopted at the time when the voltage fluctuations caused by the tap changing in SVR 23 are detected. Then, target value generation circuit 20921 outputs the addition result as a voltage control target value for a prescribed time period.

Referring to FIG. 39, when tap changing in SVR 23b occurs at time t1, the distributed power supplies in town A 100a, town B 100b, and town D 100d, and target value generation circuits 20921 in mega-solar power conversion device 27 and distribution system storage battery power conversion device 29, each of which is connected closer to the end side than SVR 23b, each add an offset value to the voltage control target value in the above-described manner, thereby changing the voltage control target value. Thus, by adding the voltage fluctuation width caused by the tap changing in SVR 23 to the voltage control target value, the control can be continued without significantly changing the reactive current command value (the amplitude of the reactive current) output from reactive current command value computing circuit 20925.

Referring again to FIG. 13, the operation of reactive current control circuit 2092 in the present third embodiment will be hereinafter described. Also in the present third embodiment, reactive current command value computing circuit 20925 is configured of a proportional-integral control circuit.

When system voltage change factor determination circuit 2102 determines that the change in the system AC voltage (effective voltage) is a voltage change caused by tap changing in SVR 23, in the present third embodiment, target value generation circuit 20921 changes the voltage control target value in the above-described manner and outputs the changed value. LPF 20922 removes a noise component (a high frequency component) of the AC effective voltage output from effective voltage calculation circuit 2098. Subtractor 20923 subtracts the output of target value generation circuit 20921 from the output of LPF 20922. The subtraction result is substantially the same as the value occurring before the voltage change caused by the tap changing in SVR 23. This is because the voltage change caused by the tap changing in SVR 23 is compensated for by adding the output of adder 21022e that is output upon detection of the voltage change caused by the tap changing and that is output from absolute value comparison circuit 21023. The output from subtractor 20923 is input into dead zone determination circuit 20924, and the voltage deviation exceeding the dead zone width is output from dead zone determination circuit 20924. Reactive current command value computing circuit 20925 calculates a reactive current command value (the amplitude of the reactive current) such that the voltage deviation output from dead zone determination circuit 20924 becomes 0.

Referring again to FIG. 39, when tap changing in SVR 23b occurs at time t1, target value generation circuit 20921 in reactive current control circuit 2092 changes the voltage control target value in the above-described manner.

By changing the voltage control target value, the reactive current command value output from reactive current command value computing circuit 20925 is substantially the same before and after the tap changing in SVR 23b. Thus, the currents flowing through SVR 23b and SVR 23a are controlled in the same manner as in the case where the tap changing in SVR 23b does not occur during the time period from time t1 to time t3 (see (l) and (i)).

In the comparative example shown in FIG. 29, the reactive power significantly changes, and the reactive power is negative at time t2, as shown in (f) and (i) in FIG. 29. On the other hand, in the present third embodiment, since the reactive power is a positive value also at time t3 as shown in (f) and (i) in FIG. 39, the voltage on the secondary side of SVR 23c can be controlled to fall within an appropriate range by the reactive power output from solar cell power conversion device 2 and storage battery power conversion device 4 that are installed in each of town C 100c and factory 101 (see (b) in FIG. 39). The voltages on the secondary sides of SVR 23a and SVR 23b are also controlled to fall within their respective appropriate voltages (see (e) and (h)).

Further, a voltage change caused by the tap changing in SVR 23 is detected at time t1. Then, at time t3 after a lapse of a prescribed time period, the distributed power supplies in town A 100a, town B 100b, and town D 100d, and mega-solar power conversion device 27 and distribution system storage battery power conversion device 29, each of which is connected closer to the end side than SVR 23b, return to normal control.

At time t3 to time t4, the reactive power flowing through SVR 23a and SVR 23b converges to zero since the system AC voltage falls within the appropriate voltage range (see (f) and (i)). On the other hand, the voltage on the secondary side of SVR 23c is maintained to fall within the appropriate voltage range only by the reactive power output from solar cell power conversion device 2 and storage battery power conversion device 4 that are installed in each of town C 100c and factory 101 (see (b)). Since the reactive power output from the distributed power supplies in town A 100a, town B 100b, and town D 100d, and from mega-solar power conversion device 27 and distribution system storage battery power conversion device 29 decreases, the reactive power flowing through SVR 23c decreases (see (c)). Thereby, the voltage on the secondary side of SVR 23c decreases (see (b)) but is controlled to fall within the appropriate voltage range, and thus, the tap changing in SVR 23c does not occur.

As in the first embodiment, the length of time t1 to time t3 during which an offset value is added to the voltage control target value is set to be longer than the moving average time (for example, 1 minute) in voltage control target value generation circuit 2099 (FIG. 10) or the time constant of voltage control target value generation circuit 2099. Thereby, the voltage control target value output from voltage control target value generation circuit 2099 and the effective voltage value output from effective voltage calculation circuit 2098 become substantially equal to each other (fall within the dead zone), and the reactive power output from the distributed power supply connected closer to the end side than SVR 23b becomes close to 0 (see (f) and (i)). In the reference example in FIG. 29, the reactive power is output in the direction in which the voltage decreases, and thus, the voltage on the secondary side of SVR 23c deviates from the appropriate voltage range.

Then, at time t4, the solar radiation abruptly changes and the electric power generated by solar cell 1 in each of town A 100a and town B 100b returns to the state at and before time t0, and then, the voltages in SVR 23a to SVR 23c rise (see (b), (e) and (h)). Thereby, each distributed power supply outputs reactive power to control the system voltage, but the voltage on the secondary side of SVR 23b does not fall within the appropriate range, and the tap position in SVR 23b changes at time t5 and returns to the position located at and before time t0, i.e., before solar radiation abruptly changes.

After the tap changing in SVR 23b, system voltage change factor determination circuit 2102 determines that the change in the system AC voltage (effective voltage) is a voltage change caused by the tap changing in SVR 23b. Then, in the present third embodiment, the voltage control target value output from target value generation circuit 20921 is changed in each of the distributed power supplies in town A 100a, town B 100b, and town D 100d, and in each of mega-solar power conversion device 27 and distribution system storage battery power conversion device 29, as described above. Thereby, the reactive power (reactive current) flowing through each of SVR 23a and SVR 23b is controlled as shown in (f) and (i), and the voltages on the secondary sides of SVR 23a to SVR 23c are controlled to fall within their respective appropriate ranges also at and after time t5 (see (b), (e) and (h)).

By the configuration in the third embodiment as described above, occurrence of unnecessary tap changing in SVR 23 (in the above description, tap changing in SVR 23c with respect to the comparative example) can be suppressed, for example, when solar radiation abruptly changes repeatedly in a short time period. As a result, degradation in SVR 23 caused by unnecessary tap changing can be suppressed.

As described above, the present third embodiment can also achieve the same effect as those achieved by the first and second embodiments.

In the above description of the first to third embodiments, when voltage control target value generation circuit 2099 (4099) generates a voltage control target value for the AC voltage, it uses the moving average value of the AC effective voltage output from effective voltage calculation circuit 2098 (4098) or uses the value obtained by removing a high frequency component by an LPF formed of an IIR filter, but the present invention is not limited thereto. For example, the similar effect can be achieved also by using a signal with an FIR filter or a signal having passed through an analog filter. Further, the time length taken to calculate the moving average value is not limited to 1 minute, but may be any time length such as 5 minutes or 30 seconds. Further, the configuration of the FIR filter is also not limited to the configuration illustrated in FIG. 10, but may be a primary IIR filter, or may be a secondary filter or a higher order filter, for example.

Further, various types of measurement results obtained by the measurement in the distributed power supplies and output from communication interface circuit 212 (412) may be at least one of: the control target voltage of the AC voltage generated in voltage control target value generation circuit 2099 (4099); the active power amount suppressed for controlling the AC voltage; the time during which the active power is suppressed; the reactive power amount supplied from first DC/AC conversion circuit 208 or second DC/AC conversion circuit 408; and the time during which the reactive power is output. Further, the above-mentioned measurement results may also include the SOC of storage battery 3, the electric power generated by solar cell 1, and the power consumption of the load.

Further, in the above description of the first to third embodiments, a plurality of distributed power supplies such as solar cell power conversion device 2 and storage battery power conversion device 4 are connected to the distribution system. In the case where the plurality of distributed power supplies include a plurality of energy creation devices and a plurality of energy storage devices as described in the embodiments, the dead zone width information is used among the energy creation devices and the energy storage devices. Thereby, as described above, the dead zone width information is changed in the power generation state of the energy creation device, the operating state (charge or discharge) of the energy storage device, or the operating state (heat storage or standby) of the heat storage device, and thereby, unnecessary suppression of the electric power generated by the energy creation device or generation of reactive power can be avoided. For example, when the power storage device is operating while the system voltage rises, the operation of reducing discharge power, increasing charge power, starting the heat storage device, or the like can be preferentially performed. In addition, when the power storage device is operating while the system voltage decreases, the operation of decreasing charge power, increasing discharge power, or the like can be preferentially performed. Further, when the heat storage device is operating while the system voltage decreases, the operation of stopping this heat storage device, or the like can be preferentially performed.

Further, in the above description of the first to third embodiments, a plurality of distributed power supplies such as solar cell power conversion device 2 and storage battery power conversion device 4 are connected to the distribution system. Also, in the case where the plurality of distributed power supplies include a plurality of energy creation devices and a plurality of energy storage devices as described in the embodiments, the condition for ending the system voltage stabilization control applied when the AC effective voltage in the distribution system deviates from the voltage range indicated by the dead zone width information is controlled to be differently set between solar cell power conversion device 2 (first DC/AC conversion circuit 208) and storage battery power conversion device 4 (second DC/AC conversion circuit 408). Thereby, when the reactive power is output to increase the apparent power to thereby suppress power generation in the energy creation device (solar cell 1) and the like, the system voltage stabilization control on the energy creation device side (solar cell power conversion device 2) can be preferentially ended, and also, the system voltage stabilization control on the energy storage device side (storage battery power conversion device 4) can be continued. As a result, the system voltage is stabilized by the system voltage stabilization control while excessive suppression of electric power generation in the energy creation device can be prevented.

In the above description of the first to third embodiments, HEMS 7 processes the dead zone width information and the like and notifies storage battery power conversion device 4 and solar cell power conversion device 2 in consumer house 18 about the processed dead zone width information and the like. Thus, storage battery power conversion device 4 and solar cell power conversion device 2 can suppress a voltage increase in consumer premises distribution system 10 in cooperation and collaboration with each other without having to directly exchange data with each other through consumer premises communication network 11 and the like. Similarly, CEMS 15 generates dead zone width information based on the impedance information on the distribution system given from DSO 21, the prediction of the power generation amount from solar cell 1, and the result of predicting the power consumption of the load. Thus, the distributed power supplies (power conversion devices) in respective consumer houses 18 can perform system voltage stabilization control autonomously in cooperation and coordination with one another without direct communication with one another. In the above description of the first to third embodiments, the dead zone width information given from CEMS 15 is processed by HEMS 7 and given to each distributed power supply, but the present invention is not limited thereto, and the dead zone width information can also be processed within each distributed power supply, i.e., in storage battery power conversion device 4 and solar cell power conversion device 2 in each consumer house 18.

Further, in the above description of the first to third embodiments, the voltage rise in consumer premises distribution system 10 and distribution system 14 can be suppressed by the power conversion device of the distributed power supply disposed in each consumer house 18. Thus, expensive system stabilization facilities such as an SVC and a system storage battery can be reduced in capacity or the need to provide the system stabilization facilities can be eliminated, thereby allowing cost reduction. Further, in the above description of the first to third embodiments, the AC voltage as a target for system voltage stabilization control is a voltage in consumer premises distribution system 10. However, system voltage stabilization control can also target, if measurable, any AC voltage in other parts, for example, the AC voltage on the input side of smart meter 8 or directly below pole-mounted transformer 9.

Further, in the above description of the first to third embodiments, storage battery 3 is assumed to be a fixed type storage battery in consumer house 18, but storage battery 3 may be an on-vehicle storage battery in an electric vehicle (EV), a plug-in hybrid vehicle (PHEV), a fuel cell vehicle (FCV), or the like. In addition, only reactive power is generated at the time of system voltage stabilization control. Thus, even in the state where an on-vehicle storage battery for an EV, a PHEV, an FCV or the like is not electrically connected to storage battery power conversion device 4, system voltage stabilization control can be performed using storage battery power conversion device 4.

Further, in the above description of the first to third embodiments, one fixed-type battery is used as storage battery 3, but the present invention is not limited thereto, and an energy storage device can also be configured in cooperation with two or more storage batteries or other distributed power supply devices. In the case where a plurality of storage batteries are used in cooperation with one another, one storage battery or two or more storage batteries among them each can be formed of the above-mentioned on-vehicle storage battery.

Modification

In the above description of the first to third embodiments, the control circuits in solar cell power conversion device 2 and storage battery power conversion device 4 each are configured by hardware (H/W) as shown in FIGS. 4 to 15 for the sake of clarity of description. However, the similar control function can be implemented also when the function of each block or some of the blocks shown in each block is implemented by software (S/W) mounted on a central processing unit (CPU). Alternatively, for at least some of the blocks, the similar control function can also be implemented by dividing the functions of software and hardware.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 solar cell, 2 solar cell power conversion device, 3 storage battery, 4 storage battery power conversion device, 5 load, 6 power switchboard, 7 HEMS, 8 smart meter, 9 pole-mounted transformer, 10 consumer premises distribution system, 11 consumer premises communication network, 12 signal line, 13 outside premises communication network, 14, 24 distribution system, 15 CEMS, 18 consumer house, 19 section, 20 substation, 21 distribution automation system (DSO), 22, 201, 206, 210, 401, 406, 410 voltmeter, 23 automatic voltage regulator (SVR), 25 communication line, 26 mega-solar system, 27 mega-solar power conversion device, 28 distribution system storage battery, 29 distribution system storage battery power conversion device, 40 power conversion device, 41 solar cell system, 52 air conditioner, 53 refrigerator, 54 lighting device, 55 cocking heater, 61 power measurement circuit, 100 town, 101 factory, 102 building, 103 apartment, 202, 207, 211, 402, 407, 411 ammeter, 203 first DC/DC conversion circuit, 204 first control circuit, 205, 405 DC bus, 208 first DC/AC conversion circuit, 209 second control circuit, 212, 412 communication interface circuit, 403 second DC/DC conversion circuit, 404 third control circuit, 408 second DC/AC conversion circuit, 409 fourth control circuit, 2041 MPPT control circuit, 2042 voltage control circuit, 2043, 4043 switching circuit, 2044 fifth control circuit, 2091, 4091 phase detection circuit, 2092, 4092 reactive current control circuit, 2093, 4093 reactive current waveform generation circuit, 2094, 4094 active current control circuit, 2095, 4095 active current waveform generation circuit, 2096, 4096 adder, 2097 sixth control circuit, 2098, 4098 effective voltage calculation circuit, 2099, 4099 voltage control target value generation circuit, 2100, 4100 dead zone table generation circuit, 2101, 4101 system voltage monitoring circuit, 2102, 4102 system voltage change factor determination circuit, 2103, 4103 apparent current limiter circuit, 4041 charge control circuit, 4042 discharge control circuit, 4044 seventh control circuit, 4097 eighth control circuit, 20921 target value generation circuit, 20922 LPF, 20923, 20943, 21012 subtractor, 20924 dead zone determination circuit, 20925 reactive current command value computing circuit, 20931 phase shift circuit, 20932 limiter, 20933, 20981, 20991 multiplier, 20934 reactive power output time measurement circuit, 20935 reactive power measurement circuit, 20941 active current dead zone control command generation circuit, 20942 active current control command generation circuit, 20944 output suppression control circuit, 20945 active power measurement circuit, 20946 output suppression time measurement circuit, 20982 integrator, 20983 square root calculator, 20984 divider, 20992, 21011, 21021 register, 21023 absolute value comparison circuit.

The invention claimed is:

1. A power conversion device disposed between a distributed power supply and an AC distribution system, the power conversion device comprising:

an inverter to convert power output from the distributed power supply into AC power;

an effective voltage calculator to calculate an effective voltage of an AC voltage in the AC distribution system; and a controller to control active power and reactive power output from the inverter based on the effective voltage, wherein when a change in the effective voltage is caused by an operation of a system stabilization facility provided in the AC distribution system, the controller controls an operation of the inverter to suppress a change in the reactive power caused by the change in the effective voltage, wherein the controller includes a system voltage monitor to monitor the effective voltage in the AC distribution system, and when an amount of change in the effective voltage monitored by the system voltage monitor exceeds a threshold value, the controller determines that the change in the effective voltage is caused by the operation of the system stabilization facility.

2. The power conversion device according to claim 1, wherein, when the change in the effective voltage is caused by the operation of the system stabilization facility, the controller controls the operation of the inverter to output reactive power kept for a prescribed time period at a level of the reactive power that occurs when the effective voltage changes due to the operation of the system stabilization facility.

3. The power conversion device according to claim 1, wherein the controller includes a voltage control target value generator to generate a voltage control target value for the AC distribution system based on the effective voltage, and the controller executes reactive power control to control the reactive power based on a deviation between the voltage control target value generated by the voltage control target value generator and the effective voltage, and delays responsiveness of the reactive power control to be slower when the change in the effective voltage is caused by the operation of the system stabilization facility than when the change in the effective voltage is not caused by the operation of the system stabilization facility.

4. The power conversion device according to claim 1, wherein the controller includes a voltage control target value generator to generate a voltage control target value for the AC distribution system based on the effective voltage, and the controller executes reactive power control to control the reactive power based on a deviation between the voltage control target value generated by the voltage control target value generator and the effective voltage, and adds an offset amount to the voltage control target value to reduce the deviation when the change in the effective voltage is caused by the operation of the system stabilization facility.

5. The power conversion device according to claim 4, wherein the offset amount is calculated based on an amount of change in the effective voltage.

6. The power conversion device according to claim 1, further comprising a communication unit through which data is transmitted to and received from outside the power conversion device, wherein the controller includes a voltage control target value generator to generate a voltage control target value for the AC distribution system based on the effective voltage, and when the effective voltage deviates from a voltage range defined to include the voltage control target value in accordance with dead zone width information received by the communication unit, the controller controls the operation of the inverter to execute system voltage stabilization control for returning the effective voltage to fall within the voltage range.

7. The power conversion device according to claim 6, wherein the voltage control target value generator generates the voltage control target value from a moving average value of the effective voltage.

8. The power conversion device according to claim 6, wherein the voltage control target value generator generates the voltage control target value from a value obtained by removing a high frequency component of the effective voltage by a low pass filter.

\* \* \* \* \*